US010148959B2

(12) United States Patent
Sato

(10) Patent No.: US 10,148,959 B2
(45) Date of Patent: Dec. 4, 2018

(54) IMAGE CODING DEVICE AND METHOD, AND IMAGE DECODING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 115 days.

(21) Appl. No.: 15/122,739

(22) PCT Filed: Feb. 27, 2015

(86) PCT No.: PCT/JP2015/055741
§ 371 (c)(1),
(2) Date: Aug. 31, 2016

(87) PCT Pub. No.: WO2015/137145
PCT Pub. Date: Sep. 17, 2015

(65) Prior Publication Data
US 2017/0214914 A1    Jul. 27, 2017

(30) Foreign Application Priority Data

Mar. 11, 2014 (JP) ................................. 2014-047501

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/152* (2014.11); *H04N 19/176* (2014.11);
(Continued)

(58) Field of Classification Search
None
See application file for complete search history.

(56) References Cited

U.S. PATENT DOCUMENTS

2005/0089222 A1* 4/2005 Lee ...................... G06K 9/4652
382/168
2006/0221095 A1* 10/2006 Xu ......................... G09G 3/2051
345/593
(Continued)

FOREIGN PATENT DOCUMENTS

EP          2493186 A1    8/2012
JP       2004-535126 A   11/2004
(Continued)

OTHER PUBLICATIONS

Benjamin Bross et al., "High Efficiency Video Coding (HEVC) text specification draft 10 (for FDIS & Consent)", Output Document of JCT-VC, Draft of HEVC, Joint Collaborative Team on Video Coding (JCT-VC) of ITU-T SG 16 WP 3 and ISO/IEC JTC1/SC29/WG11, Document: JCTVC-L1003_v4, 12th Meeting: Geneva, CH, Jan. 14-23, 2013, pp. 324.

(Continued)

*Primary Examiner* — Reza Aghevli
(74) *Attorney, Agent, or Firm* — Chip Law Group

(57) ABSTRACT

The present disclosure relates to an image coding device and method, and an image decoding device and method for enabling the code amount of a chrominance signal in an image to be controlled. A chrominance signal quantization unit determines a luminance signal quantization parameter and a chrominance signal quantization parameter in units of CU by use of a luminance signal quantization parameter, a chrominance signal quantization parameter, and ChromaQPOffset from a rate control unit, and supplies the determined luminance signal quantization parameter and chrominance signal quantization parameter to a quantization unit. The chrominance signal quantization unit calculates a predictive quantization parameter predQP based on the quantization parameters of adjacent CUs. The chrominance signal quantization unit calculates deltaQP and $\Delta QP_C$ based (Continued)

on the determined luminance signal quantization parameter and chrominance signal quantization parameter and the calculated predictive quantization parameter predQP. The chrominance signal quantization unit supplies the calculated deltaQP, $\Delta QP_C$, and ChromaQPOffset to a lossless coding unit. The present disclosure can be applied to an image processing device, for example.

20 Claims, 38 Drawing Sheets

(51) Int. Cl.
 H04N 19/30 (2014.01)
 H04N 19/463 (2014.01)
 H04N 19/186 (2014.01)
 H04N 19/152 (2014.01)
(52) U.S. Cl.
 CPC ........... *H04N 19/186* (2014.11); *H04N 19/30* (2014.11); *H04N 19/463* (2014.11)

(56) References Cited

U.S. PATENT DOCUMENTS

| | | | | |
|---|---|---|---|---|
| 2008/0273809 | A1* | 11/2008 | Demos | G06T 3/4015 382/248 |
| 2011/0194618 | A1* | 8/2011 | Gish | G06T 5/50 375/240.25 |
| 2012/0170845 | A1* | 7/2012 | Min | H04N 1/56 382/167 |
| 2013/0343648 | A1* | 12/2013 | Sato | G06T 9/004 382/166 |
| 2014/0003497 | A1 | 1/2014 | Sullivan et al. | |
| 2014/0193089 | A1 | 7/2014 | Sato | |
| 2015/0319438 | A1* | 11/2015 | Shima | H04N 19/176 375/240.03 |
| 2017/0244971 | A1* | 8/2017 | Sekiguchi | H04N 19/154 |

FOREIGN PATENT DOCUMENTS

| | | | | |
|---|---|---|---|---|
| JP | 2013-098874 | A | 5/2013 | |
| WO | WO-2012165039 | A1 * | 12/2012 | G06T 9/004 |
| WO | 2013/003284 | A | 1/2013 | |
| WO | 2013/003284 | A1 | 1/2013 | |
| WO | 2013/065567 | A | 5/2013 | |
| WO | 2013/065567 | A1 | 5/2013 | |

OTHER PUBLICATIONS

Benjamin Bross et al., "High Efficiency Video Coding (HEVC) text specification draft 10 (for FDIS & Last Call)", Output Document of JCT-VC, Draft of HEVC, Joint Collaborative Team on Video Coding (JCT-VC) of ITU-T SG 16 WP 3 and ISO/IEC JTC1/SC29/WG11, Document: JCTVC-L1003_v34, 12th Meeting: Geneva, CH, Jan. 14-23, 2013, pp. 310.

Dzung Hoang, "Finer scaling of quantization parameter", Zenverge, Inc., Input Document to JCT-VC, Joint Collaborative Team on Video Coding (JCT-VC) of ITU-T SG 16 WP 3 and ISO/IEC JTC1/SC29/WG11, Document: JCTVC-D041, 4th Meeting: Daegu, Korea, Jan. 20-28, 2011, pp. 6.

Jianle Chen et al., "Higher granularity of quantization parameter scaling and adaptive delta QP signaling", Samsung Electronics Co., Ltd., Input Document, Joint Collaborative Team on Video Coding (JCT-VC) of ITU-T SG 16 WP 3 and ISO/IEC JTC1/SC29/WG11, Document: JCTVC-F495, 6th Meeting: Torino, IT, Jul. 14-22, 2011, pp. 6.

Gary J. Sullivan et al., "Chroma QP range extension", Microsoft Corporation, Input Document to JCT-VC, Joint collaborative Team on Video Coding (JCT-VC) of ITU-T SG 16 WP 3 and ISO/IEC JTC1/SC29/WG11, Document: JCTVC-J0342, 10th Meeting: Stockholm, SE, Jul. 11-20, 2012, pp. 8.

Extended European Search Report of EP Patent Application No. 15762250.7, dated Aug. 29, 2017, 12 pages.

Chen, et al., "Higher granularity of quantization parameter scaling and adaptive delta QP signaling", Joint Collaborative Team on Video Coding (JCT-VC) of ITU-T SG16 WP3 and ISO/IEC JTC1/SC29/WG11, 6th Meeting, Torino, IT, Jul. 14-22, 2011, pp. 1-6.

Dzung Hoang, "Finer scaling of quantization parameter", Joint Collaborative Team on Vedio Coding (JCT-VC) of ITU-T SG16 WP3 and ISO/IEC JTC1/SC29/WG11 4th Meeting: Daegu,Korea, Jan. 20-28, 2011, pp. 01-05.

Chen et al., "Higher granularity of quantization parameter scaling and adaptive delta QP signalling", Joint collaborative Team on Vedio Coding (JCT-VC) of ITU-T SG16 WP3 and ISO/IEC JTC1/SC29/WG11 6th Meeting: Torinto, IT, Jul. 14-22, 2011, pp. 01-06.

Sullivan et al., "Chroma QP range extension", Joint Collaborative Team on Vedio Coding (JCT-VC) of ITU-T SG16 WP3 and ISO/IEC JTC1/SC29/WG11 10th Meeting: Stockholm, SE, Jul. 11-20, 2012, pp. 01-08.

Bross et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 01-300.

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 01-298.

* cited by examiner

FIG. 4

| $qP_1$ | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $qP_C$ | $=qP_1$ | 29 | 30 | 31 | 32 | 33 | 33 | 34 | 34 | 35 | 35 | 36 | 36 | 37 | 37 | $=qP_1-6$ |

IMAGE CODING DEVICE AND METHOD, AND IMAGE DECODING DEVICE AND METHOD

CROSS REFERENCE TO RELATED APPLICATIONS

This application is a U.S. National Phase of International Patent Application No. PCT/JP2015/055741 filed on Feb. 27, 2015, which claims priority benefit of Japanese Patent Application No. JP 2014-047501filed in the Japan Patent Office on Mar. 11, 2014. Each of the above-referenced applications is hereby incorporated herein by reference in its entirety.

TECHNICAL FIELD

The present disclosure relates to an image coding device and method, and an image decoding device and method, and particularly to an image coding device and method for enabling the code amount of a chrominance signal in an image to be controlled, and an image decoding device and method.

BACKGROUND ART

In recent years, there have been widely used devices for compressing and coding an image in a coding system for handling image information as digital information and compressing the same by orthogonal transform such as discrete cosine transform and motion compensation by use of redundancy specific to the image information in order to efficiently transmit and accumulate information. The coding system may be moving picture experts group (MPEG), H. 264, MPEG-4 Part 10 (Advanced Video Coding, denoted as AVC below), and the like, for example.

At present, in order to further enhance the coding efficiency by H. 264/AVC, a coding system called high efficiency video coding (HEVC) is being standardized by joint collaboration team-video coding (JCTVC) which is a common standard-setting organization with ITU-T and ISO/IEC (Non-Patent Document 1).

BT. 709 color gamut is employed for HD (1920×1080 pixels), but the use of BT. 2020 color gamut for UHD (4000×2000 pixels, 8000 ×4000 pixels) is being discussed. Further, 10-bit or 12-bit bit depth, not 8-bit, is being discussed.

CITATION LIST

Non-Patent Document

Non-Patent Document 1: Benjamin Bross, Woo-Jin Han, Gary J. Sullivan, Jens-Rainer Ohm, Gary J. Sullivan, Ye-Kui Wang, Thomas Wiegand, "High Efficiency Video Coding (HEVC) text specification draft 10 (for FDIS & Consent)", JCTVC-L1003_v4, Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013

SUMMARY OF THE INVENTION

Problems to be Solved by the Invention

However, when image information with wide color gamut is compressed as described above, a larger amount of information is required to code a chrominance signal, and the code amount is difficult to sufficiently control with an accuracy of quantization parameter defined in HEVC.

The present disclosure is made in terms of the situation, and is directed for controlling the code amount of a chrominance signal in an image.

Solutions to Problems

An image coding device of one aspect of the present disclosure includes: a chrominance signal quantization determination unit for determining a chrominance signal quantization parameter with a higher quantization accuracy than a luminance signal quantization parameter in an image; a quantization unit for quantizing the image by use of the luminance signal quantization parameter and the chrominance signal quantization parameter determined by the chrominance signal quantization determination unit; and a coding unit for coding the image quantized by the quantization unit thereby to generate a coding stream.

The chrominance signal quantization determination unit can determine the chrominance signal quantization parameter such that when the chrominance signal quantization parameter increases by 12, it is quantized twice as coarsely as the luminance signal quantization parameter.

A transmission unit for transmitting the coding stream generated by the coding unit, a parameter deltaQP for the luminance signal, and a parameter $\Delta QP_C$ for the chrominance signal in a coding unit with predefined magnitude can further be included.

$\Delta QP_C$ is calculated in coding unit.

The value of $\Delta QP_C$ is 0 or 1.

A color space is YCbCr, and the transmission unit can transmit the independent values of $\Delta QP_C$ for the Cb signal and the Cr signal.

Assuming a quantization parameter $QP_Y$ for the luminance signal, a quantization parameter $QP_C$ for the chrominance signal, a quantization parameter offset offset for the chrominance signal, and a defined relational equation YtoC between the luminance signal quantization parameter and the chrominance signal quantization parameter, $QP_C$ is calculated as:

$$QP_C = 2*YtoC(QP_Y + \text{offset}) + \Delta QP_C \quad \text{[Mathematical Formula 1]}$$

Assuming a quantization parameter $QP_Y$ for the luminance signal, a quantization parameter $QP_C$ for the chrominance signal, a quantization parameter offset offset for the chrominance signal, a defined relational equation YtoC between the luminance signal quantization parameter and the chrominance signal quantization parameter, and an integer n of 2 or more, $QP_C$ is calculated as:

$$QP_C = n*YtoC(QP_Y + \text{offset}) + \Delta QP_C \quad \text{[Mathematical Formula 2]}$$

where the value of $\Delta QPC$ is 0, 1, 2 . . . , n−1.

A color space is YDzDx.

The chrominance signal quantization determination unit can determine a chrominance signal quantization parameter separately from a luminance signal quantization parameter in an image of an enhancement layer with an input signal with wide color gamut when performing a scalability coding processing based on color gamut scalability.

A chrominance signal quantization parameter offset transmitted together with a coding stream as coded image in the enhancement layer takes a negative value.

When a predetermined flag is 0 in syntax transmitted together with a coding stream as coded image, the chrominance signal quantization parameter determined by the chrominance signal quantization determination unit is transmitted together with a coded coding stream.

In an image coding method of one aspect of the present disclosure, an image coding device: determines a chrominance signal quantization parameter with a higher quantization accuracy than a luminance signal quantization parameter in an image, quantizes the image by use of the luminance signal quantization parameter and the determined chrominance signal quantization parameter, and codes the quantized image thereby to generate a coding stream.

An image decoding device of one aspect of the present disclosure includes: a decoding unit for decoding a coding stream thereby to generate an image a chrominance signal quantization determination unit for determining a chrominance signal quantization parameter with a higher quantization accuracy than a luminance signal quantization parameter in the image generated by the decoding unit; and an inverse quantization unit for inversely quantizing the image generated by the decoding unit by use of the luminance signal quantization parameter and the chrominance signal quantization parameter determined by the chrominance signal quantization determination unit.

The chrominance signal quantization determination unit can determine the chrominance signal quantization parameter such that when the chrominance signal quantization parameter increases by 12, it is quantized twice as coarsely as the luminance signal quantization parameter.

A reception unit for receiving the coding stream, a parameter deltaQP for the luminance signal, and a parameter $\Delta QP_C$ for the chrominance signal in coding unit with predefined magnitude can further be included.

$\Delta QP_C$ is calculated in coding unit.

The value of $\Delta QP_C$ is 0 or 1.

A color space is YCbCr, and the reception unit can receive the independent values of $\Delta QP_C$ for the Cb signal and the Cr signal.

In an image decoding method of other aspect of the present disclosure, an image decoding device: decodes a coding stream thereby to generate an image, determines a chrominance signal quantization parameter with a higher quantization accuracy than a luminance signal quantization parameter in the generated image, and inversely quantizes the generated image by use of the luminance signal quantization parameter and the determined chrominance signal quantization parameter.

According to one aspect of the present disclosure, a chrominance signal quantization parameter is determined with a higher quantization accuracy than a luminance signal quantization parameter in an image. Then, the image is quantized by use of the luminance signal quantization parameter and the determined chrominance signal quantization parameter, and the quantized image is coded thereby to generate a coding stream.

According to other aspect of the present disclosure, a coding stream is decoded thereby to generate an image, and a chrominance signal quantization parameter is determined with a higher quantization accuracy than a luminance signal quantization parameter in the generated image. Then, the generated image is inversely quantized by use of the luminance signal quantization parameter and the determined chrominance signal quantization parameter.

The image coding device and the image decoding device described above may be independent image processing devices, or may be internal blocks each configuring one image coding device or image decoding device.

Effects of the Invention

According to one aspect of the present disclosure, it is possible to code an image. In particular, it is possible to control the code amount of a chrominance signal in an image.

According to other aspect of the present disclosure, it is possible to decode an image. In particular, it is possible to control the code amount of a chrominance signal in an image.

The effects described herein are not necessarily limited, and any of the effects described in the present disclosure may be obtained.

BRIEF DESCRIPTION OF DRAWINGS

FIG. 4 is a diagram illustrating a relationship between quantization parameters for a luminance signal and a chrominance signal.

MODE FOR CARRYING OUT THE INVENTION

The modes for carrying out the present disclosure (which will be denoted as exemplary embodiments) will be described below. The description will be made in the following order.

0. Outline
1. First exemplary embodiment (coding device, decoding device)
2. Second exemplary embodiment (computer)
3. Third exemplary embodiment (multi-view image coding device, multi-view image decoding device)
4. Fourth exemplary embodiment (hierarchy image coding device, hierarchy image decoding device)
5. Fifth exemplary embodiment (TV set)
6. Sixth exemplary embodiment (cell phone)
7. Seventh exemplary embodiment (recording/reproducing device)
8. Eighth exemplary embodiment (imaging device)
9. Exemplary applications of scalable coding
10. Other exemplary embodiment <0. Outline>
(Coding System)

The present technique will be described below assuming that the high efficiency video coding (HEVC) system is applied to image coding/decoding.

(Description of Coding Unit)

Figure 1:
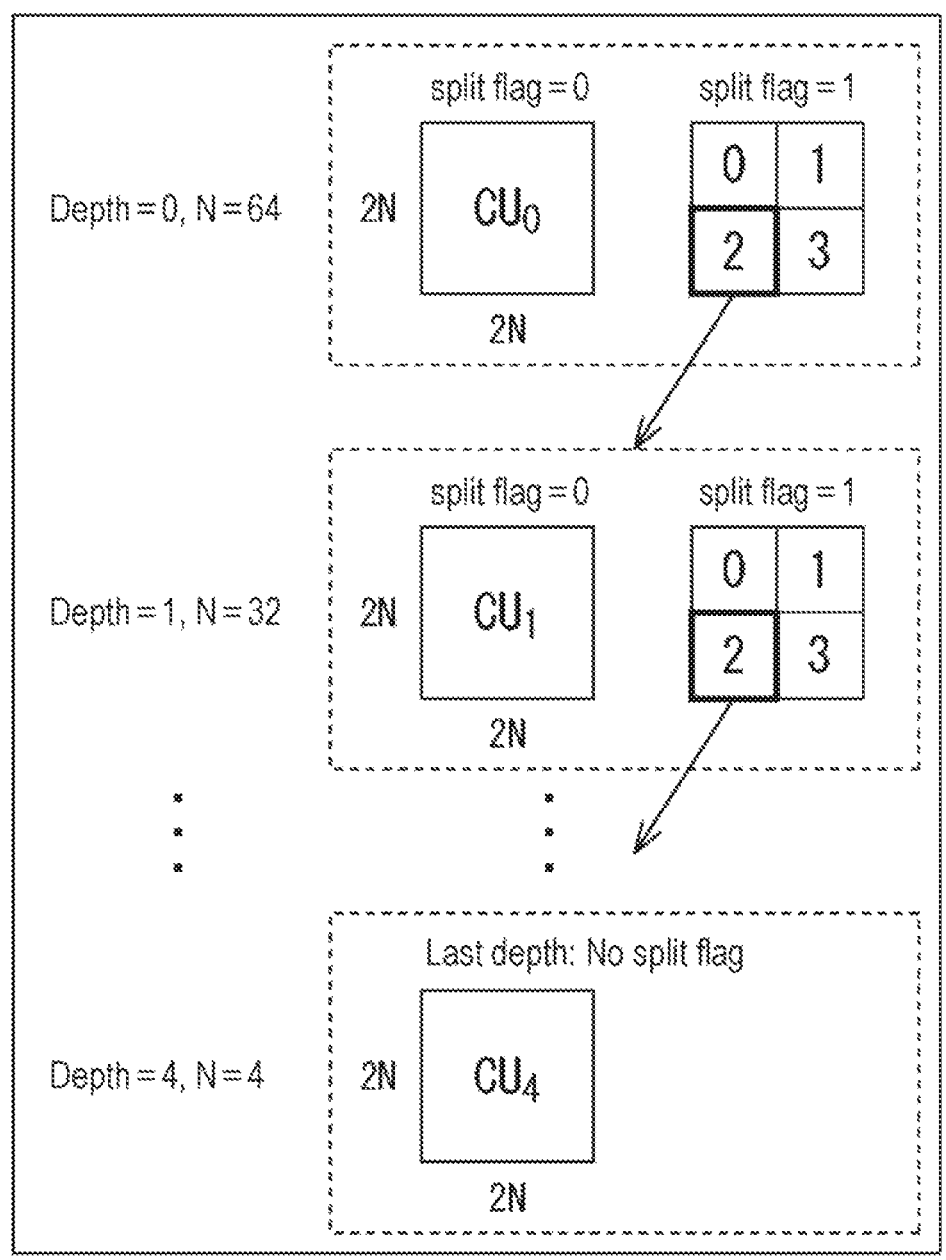
FIG. 1 is a diagram for explaining an exemplary structure of a coding unit.

FIG. 1 is a diagram for explaining Coding UNIT (CU) which is a unit of coding in the HEVC system.

The HEVC system is directed for large-size images such as ultra high definition (UHD) with 4000 pixels×2000 pixels, and thus it is not optimum to fix a size of the unit of coding at 16 pixels×16 pixels. Therefore, CU is defined as unit of coding in the HEVC system.

CU plays a similar role to macroblock in the AVC system. Specifically, CU may be divided into PU or divided into TU.

The size of CU is square indicated by as many pixels as a power of 2 which is variable per sequence. Specifically, CU is horizontally and vertically divided into two, respectively, arbitrary times to be set such that LCU as the maximum size of CU is not smaller than smallest coding unit (SCU) as the minimum size of CU. That is, the size of any hierarchy, when LCU is made into hierarchy to be SCU such that the size of an upper hierarchy is ¼ times as large as the size of its lower hierarchy, is the size of CU.

For example, in FIG. 1, the size of LCU is 128 and the size of SCU is 8. Therefore, the hierarchy depth (Depth) of LCU is 0 to 4 and the number of hierarchy depths is 5. That is, the number of divisions corresponding to CU is any of 0 to 4.

Information for designating the sizes of LCU and SCU is included in SPS. The number of divisions corresponding to CU is designated by split_flag indicating whether to further divide each hierarchy. CU is described in Non-Patent Document 1 in detail.

The size of TU can be designated by use of split_transform_flag similarly to split_flag of CU. The maximum numbers of divisions of TU during inter-prediction and intra-prediction are designated as max_transform_hierarchy_depth_inter and max_transform_hierarchy_depth_intra, respectively, by SPS.

The present specification assumes that coding tree unit (CTU) is a unit including parameters at the time of a series of processing by coding tree block (CTB) of LCU and its LCU base (level). Further, CU configuring CTU is assumed as a unit including parameters at the time of a series of processing by coding block (CB) and its CU base (level).

(Mode Selection)

In order to achieve a higher coding efficiency, it is important to select an appropriate prediction mode in the AVC and HEVC coding systems.

As an example of the selection system, a method mounted on reference software of H. 264/MPEG-4 AVC (published in http://iphome.hhi.de/suehring/tml/index.htm), which is called joint model (JM), may be listed.

With JM, a mode determination method for High Complexity Mode and Low Complexity Mode described below can be selected. In either mode, a cost function value for a respective prediction mode Mode is calculated and a prediction mode for minimizing the value is selected as the optimum mode for the block to macroblock.

The cost function in High Complexity Mode is expressed as in the following Equation (1).

$$\text{Cost}(\text{Mode} \in \Omega) = D + \lambda * R \quad (1)$$

Herein, $\Omega$ indicates a universal set of candidate modes for coding the block to macroblock, and D indicates differential energy between a decoded image and an input image when coding is performed in the prediction mode. $\lambda$ indicates a Lagrange undetermined multiplier given as a function of quantization parameter. R indicates the total code amount when coding is performed in the mode, which includes an orthogonal transform coefficient.

That is, the parameters D and R are calculated in order to perform coding in High Complexity Mode, and thus a temporary encode processing needs to be performed in all the candidate modes once, which requires more computations.

The cost function in Low Complexity Mode is expressed as in the following Equation (2).

$$\text{Cost}(\text{Mode} \in \Omega) = D + QP2\text{Quant}(QP) * \text{HeaderBit} \tag{2}$$

Herein, D indicates differential energy between a predictive image and an input image unlike in High Complexity Mode. QP2Quant (QP) is given as a function of quantization parameter QP, and HeaderBit indicates the code amount for information belonging to Header, such as motion vector and mode, which does not include an orthogonal transform coefficient.

That is, the prediction processing needs to be performed in each candidate mode in Low Complexity Mode, but the coding processing does not need to be performed since a decoded image is not required. Therefore, it can be realized with less computations than in High Complexity Mode.

(Quantization Parameter Coding System)

A quantization parameter coding system defined in HEVC will be described below.

Figure 2:
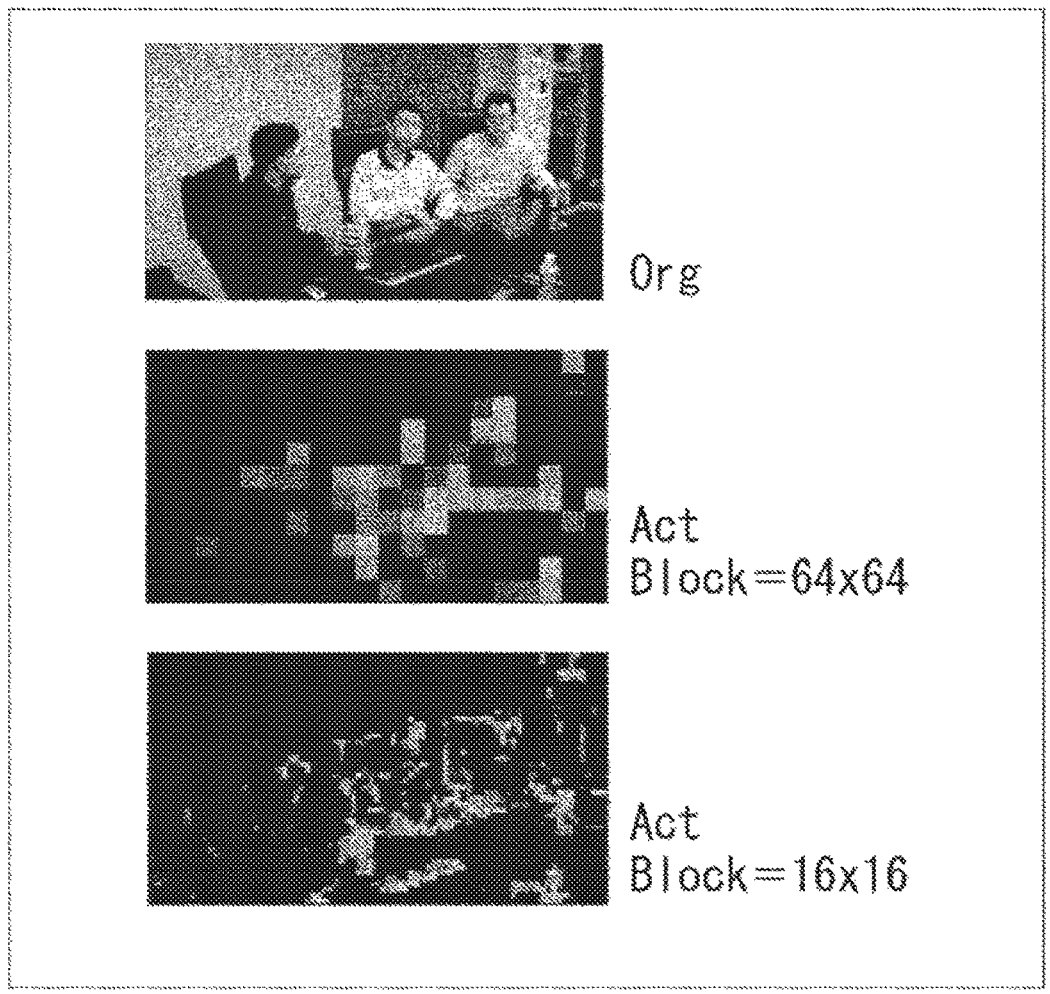
FIG. 2 is a diagram for explaining how to code a quantization parameter.

"Org" illustrated in FIG. 2 indicates a test image of TV conference contents of 1280×720 pixels. Quantization control is conducted within a picture by "activity" based on a pixel variance value per macroblock under rate control such as MPEG-2TestModel5.

Assuming that a quantization parameter can be transmitted only in LCU unit in H. 265/HEVC, a distribution of "activity" of 64×64 unit is "Act Block=64×64" illustrated in FIG. 2. As can be seen from FIG. 2, a single Block includes both a flat region and a region containing texture or edge, and inplane image quality is difficult to control at sufficient granularity. Similarly to "Act Block=16×16" illustrated in FIG. 2, only when a quantization parameter can be set in Sub-LCU unit, inplane image quality can be controlled at a similar granularity as in MPEG-2 or AVC.

In HEVC, diff_cu_qp_delta_depth is set in picture parameter set (PPS), and a designation is made as to what depth of coding unit at granularity a quantization parameter can be transmitted for the magnitude of LCU. A coding unit of the magnitude is called coding unit quantization group (CUQG). The quantization parameter is transmitted in the first transform unit with coded block flag (CBF, which has a non-zero orthogonal transform coefficient at the value of 1)=1 in CUQG.

A quantization parameter for each coding unit is calculated as in the following Equation (3).

[Mathematical Formula 3]

$$QP = QP_{PRED} + \Delta QP \tag{3}$$

ΔQP indicates a differential value relative to a predictive value, which is transmitted per CUQG. Herein, the quantization parameter predictive value $QP_{PRED}$ is calculated as in the following Equation (4).

[Mathematical Formula 4]

$$QP_{PRED} = (qP_{Y\_A} + qP_{Y\_B} + 1) \gg 1 \tag{4}$$

Figure 3:
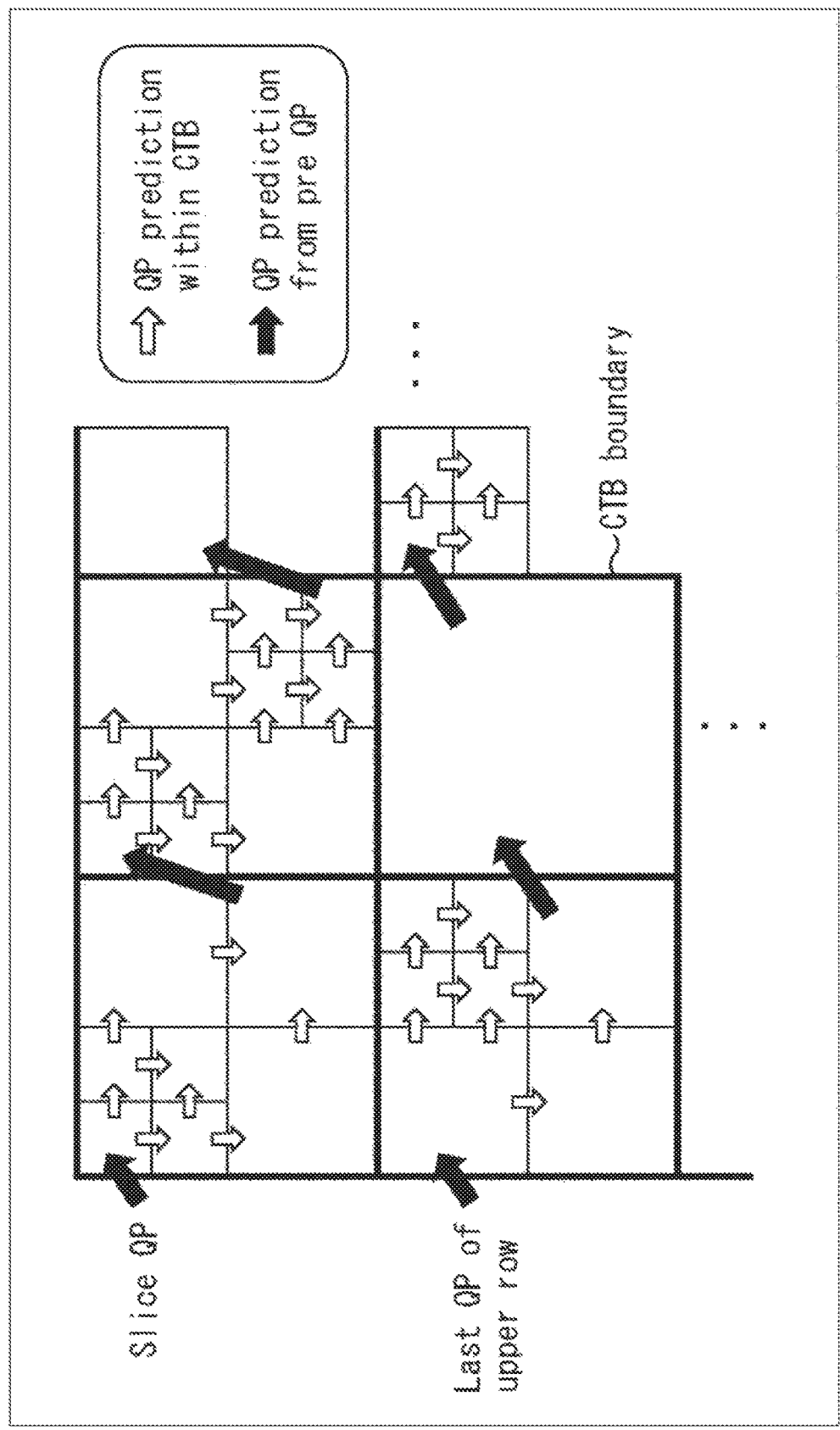
FIG. 3 is a diagram for explaining how to code a quantization parameter.

Herein, $qP_{Y\_A}$ and $qP_{Y\_B}$ are the quantization parameters for CUs positioned at the upper side and the left side to the CU. When the CUs positioned at the upper side and the left side are outside the LCU, a value of the quantization parameter used for the previous coding or decoding processing is used as $qP_{Y\_A}$ or $qP_{Y\_B}$. A diagram for the processing is illustrated in FIG. 3

(Chrominance Signal Quantization Processing)

The chrominance signal quantization processing defined in HEVC will be described below.

Figure 5:
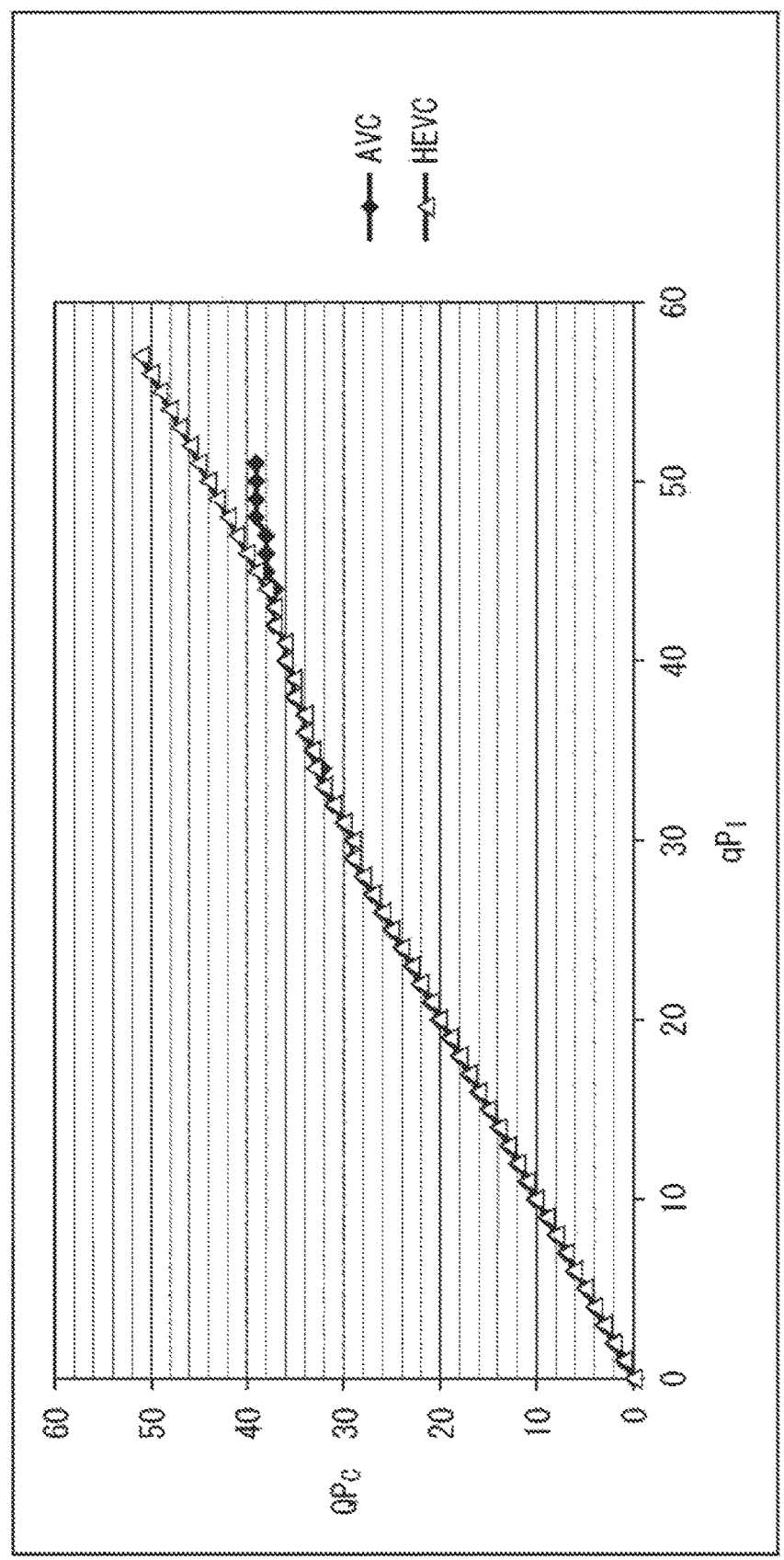
FIG. 5 is a diagram illustrating a relationship between quantization parameters for a luminance signal and a chrominance signal.

A relationship between defaults for a luminance signal and a chrominance signal is defined as in FIG. 4 or FIG. 5 also in HEVC similarly as in AVC, and a user can adjust it by choma_qp_offset. In the example of FIG. 5, a black circle indicates AVC and a triangle indicates HEVC.

In AVC, when only choma_qp_offset is present, it is applied to both of the Cb/Cr signals, and when choma_qp_offset and 2nd_choma_qp_offset are present, they are applied to Cb and Cr, respectively. To the contrary, in HEVC, cb_qp_offset and cr_qp_offset are applied to Cb and Cr, respectively.

When the maximum value of the luminance signal quantization parameter can take 51 in AVC, while the bits are to be reduced since the chrominance signal quantization parameter is limited to 39 and strict limitations are imposed by CPB even when an adjustment by chroma_qp_offset is made, desired rate control may be difficult to conduct due to the hindering condition.

In order to solve it, the chrominance signal quantization parameter can take the maximum value of 51 in HEVC as illustrated in FIG. 4 and FIG. 5.

Figure 6:
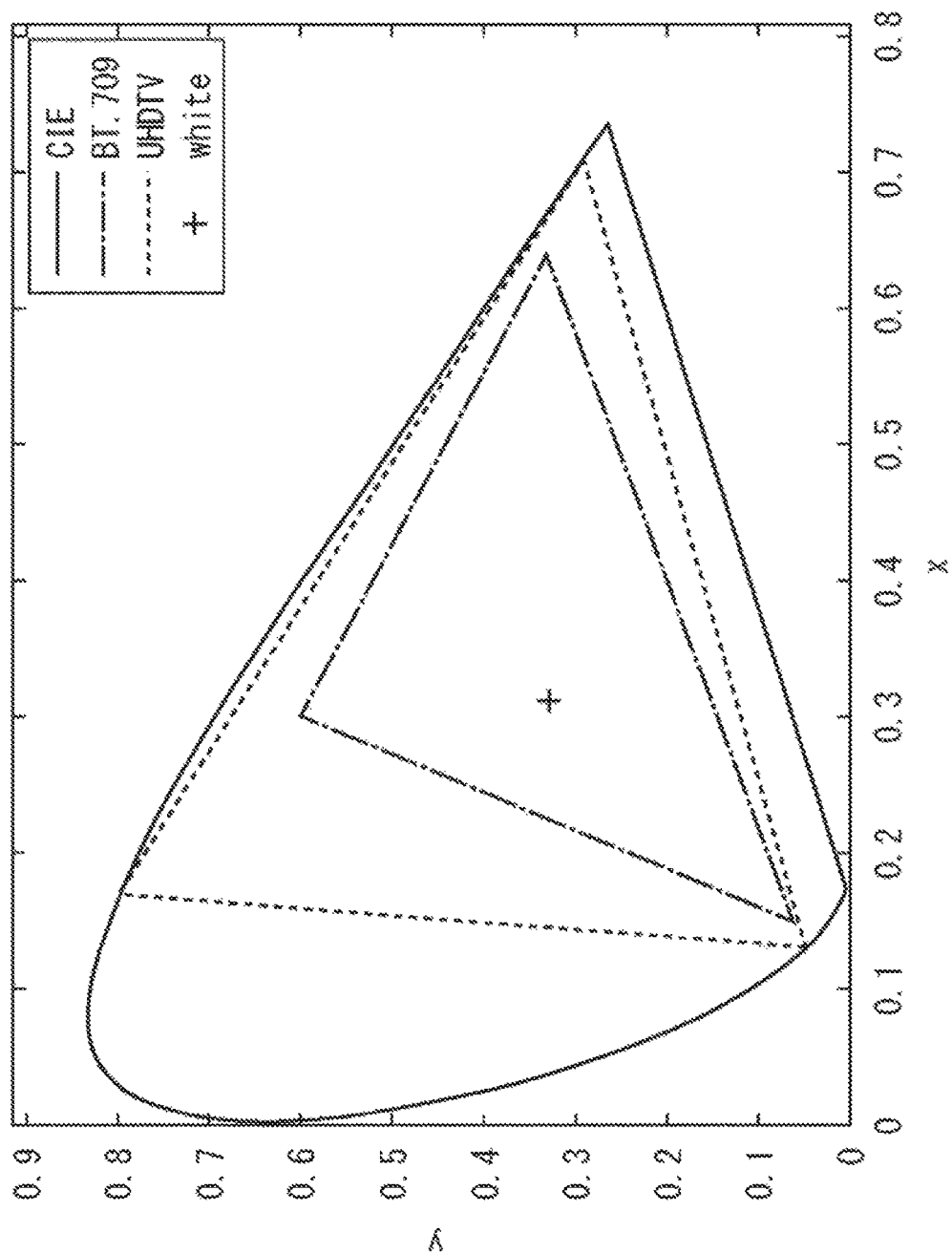
FIG. 6 is a diagram illustrating color gamut.
Figure 7:
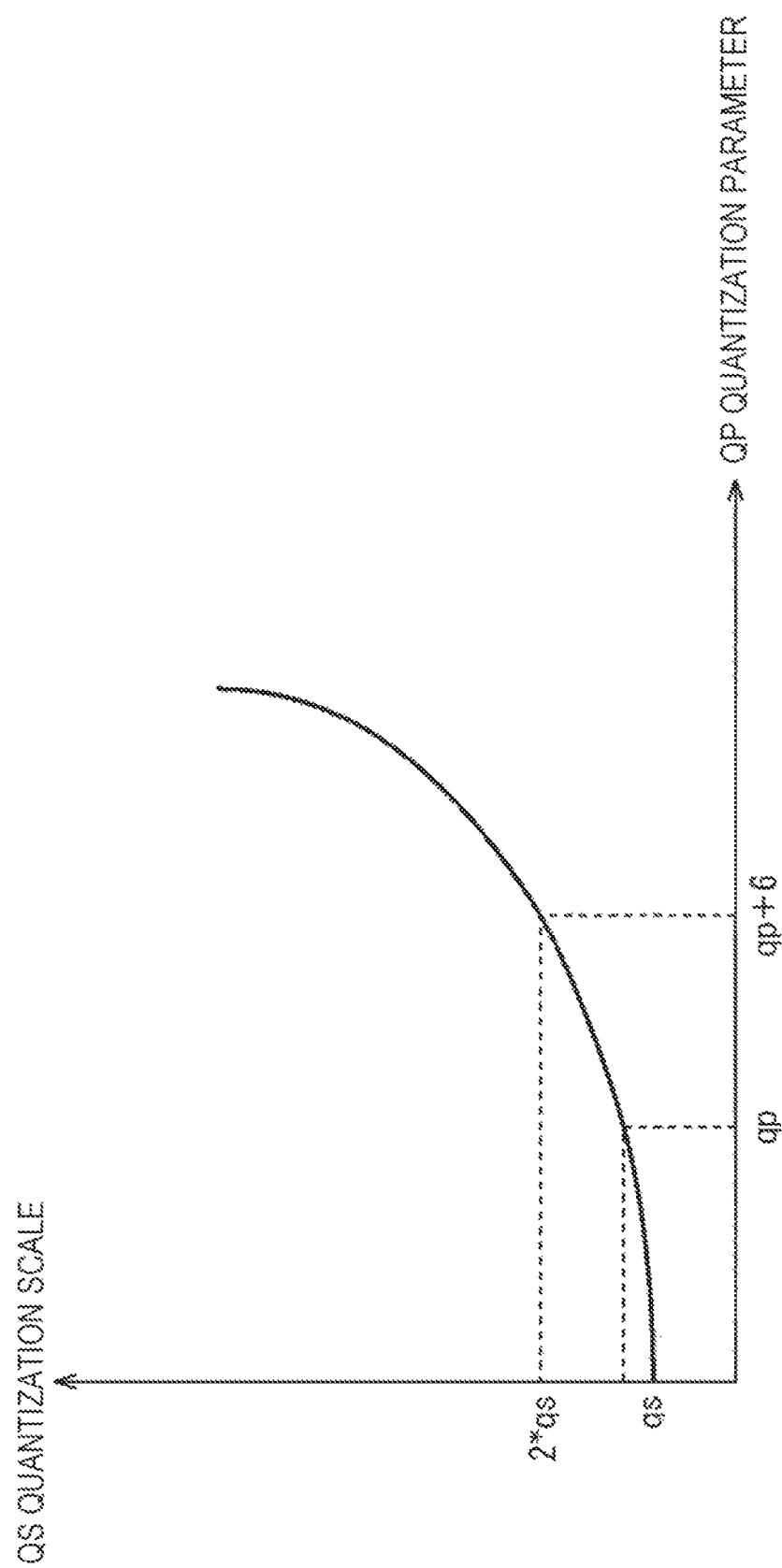
FIG. 7 is a diagram illustrating a relationship between a quantization parameter and a quantization scale.

BT. 709 color gamut is employed in HD (1920×1080 pixels) as illustrated in FIG. 6, but the use of BT. 2020 color gamut is being discussed for UHD (4000×2000 pixels, 8000×4000 pixels), and 10-bit or 12-bit bit depth, not 8-bit, is being discussed.

However, when image information with wide color gamut is compressed as described above, a larger amount of information is required for coding a chrominance signal, and the code amount is difficult to sufficiently control with an accuracy of quantization parameter defined in HEVC.

(Operation Principle of Present Technique)

In HEVC, when image information with wide color gamut as illustrated in FIG. 6 is compressed, a larger amount of information is required for coding a chrominance signal, and the code amount is difficult to sufficiently control with an accuracy of quantization parameter defined in HEVC.

Thus, according to the present technique, as described below, the chrominance signal quantization processing is performed with a higher accuracy than the luminance signal thereby to enhance rate controllability for chrominance signal.

That is, at first, the present technique assumes that the chrominance signal has a higher accuracy than the luminance signal. Specifically, when the value of the quantization parameter QP exceeds 12, for example, quantization is performed on the chrominance signal at the twice-coarser quantization scale.

Specifically, in AVC and HEVC, the chrominance signal quantization parameter $QP_C$ is calculated as in the following Equation (5) by the luminance signal quantization parameter $QP_Y$, the offset, and the relationship YtoC illustrated in FIG. 4 or FIG. 5.

[Mathematical Formula 5]

$$QP_C = YtoC(QP_Y + \text{offset}) \tag{5}$$

To the contrary, according to the present technique, $\Delta QP_C$ is transmitted in Coding Unit and $QP_C$ is calculated as in the following Equation (6).

[Mathematical Formula 6]

$$QP_C = 2 * YtoC(QP_Y + \text{offset}) + \Delta QP_C \tag{6}$$

In HEVC, deltaQP is transmitted for Cording Unit with defined magnitude, the quantization parameter for the CodingUnit is calculated based on deltaQP and the predictive quantization parameter value predQP calculated per CodingUnit, and $\Delta QP_C$ is assumed to be transmitted at the same time with deltaQP. The value is assumed to be 0 or 1.

Further, the above processing is generalized, and any value of 0, 1, . . . , n−1 may be taken in the following Equation (7), where n is an integer of 2 or more.

[Mathematical Formula 7]

$$QP_C = n*YtoC(QP_Y+\text{offset}) + \Delta QP_C \qquad (7)$$

The value of n may be transmitted in sequence parameter set (SPS) or the like in the image compression information to be output. The value may be different between the Cb component and the Cr component.

The value of $\Delta QP_C$ may be other than 0 and 1. Thereby, according to the present techniques, the chrominance signal quantization parameter value can be set independent of the luminance signal per Coring Unit.

The series of processing according to the present technique can be applied to a color space other than YCbCr, such as YDzDx color space.

Further, flag indicating compatibility with HEVC is transmitted in syntax such as SPS or Picture Parameter Set (PPS) of image compression information to be output, and when the value is 0, the accuracy of the chrominance signal quantization parameter may be extended according to the present technique.

When the method according to the present technique is realized for color gamut scalability, it may be applied to an enhancement layer with an input image signal with wide color gamut. At this time, ChromaQpOffset in the enhancement layer is set at a negative value on the coding side, thereby enhancing the coding efficiency.

The above series of processing are performed thereby to sufficiently control the code amount. In particular, when a signal with wide color gamut as illustrated in FIG. 6 is input, rate controllability for chrominance signal can be enhanced.

Exemplary applications of the present technique to specific devices will be described below.

<First Exemplary Embodiment>

(Exemplary Structure of Exemplary Embodiment of Coding Device)

Figure 8:
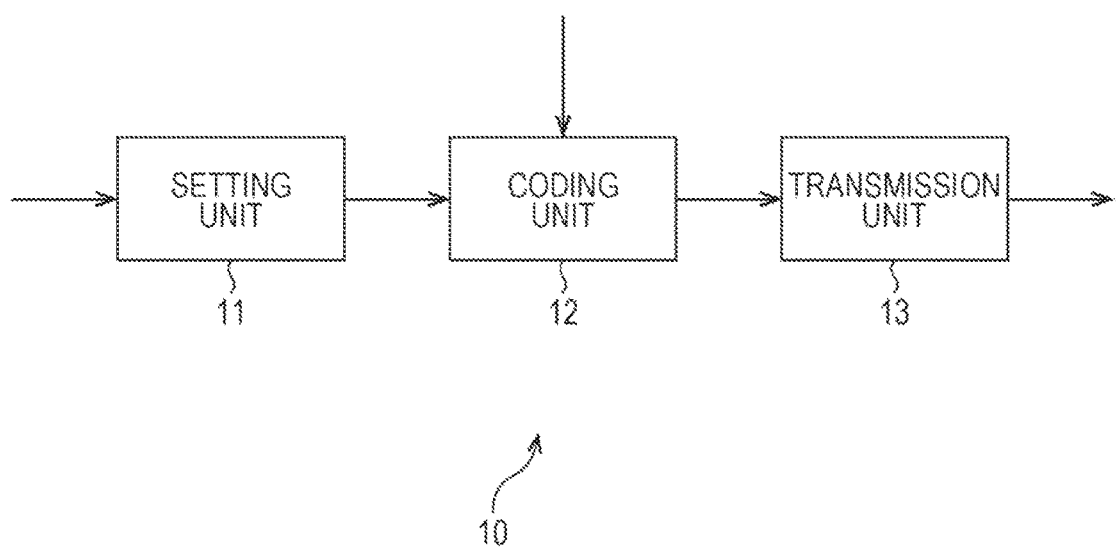
FIG. 8 is a block diagram illustrating an exemplary structure of a first exemplary embodiment of a coding device to which the present disclosure is applied.

FIG. 8 is a block diagram illustrating an exemplary structure of an exemplary embodiment of a coding device to which the present disclosure is applied.

A coding device 10 in FIG. 8 is configured of a setting unit 11, a coding unit 12, and a transmission unit 13, and codes an image in a system conforming to the HEVC system.

Specifically, the setting unit 11 in the coding device 10 sets video usability information (VUI), supplemental enhancement information (SEI), and the like. The setting unit 11 supplies a parameter set such as the set SPS, PPS, VUI and SEI to the coding unit 12.

The coding unit 12 is input with images in units of frame. The coding unit 12 codes an input image in a system conforming to the HEVC system with reference to a parameter set supplied from the setting unit 11. The coding unit 12 generates a coding stream based on the coding data obtained by the coding and the parameter set, and supplies it to the transmission unit 13.

The transmission unit 13 transmits the coding stream supplied from the coding unit 12 to a decoding device described below.

(Exemplary Structure of Coding Unit)

Figure 9:
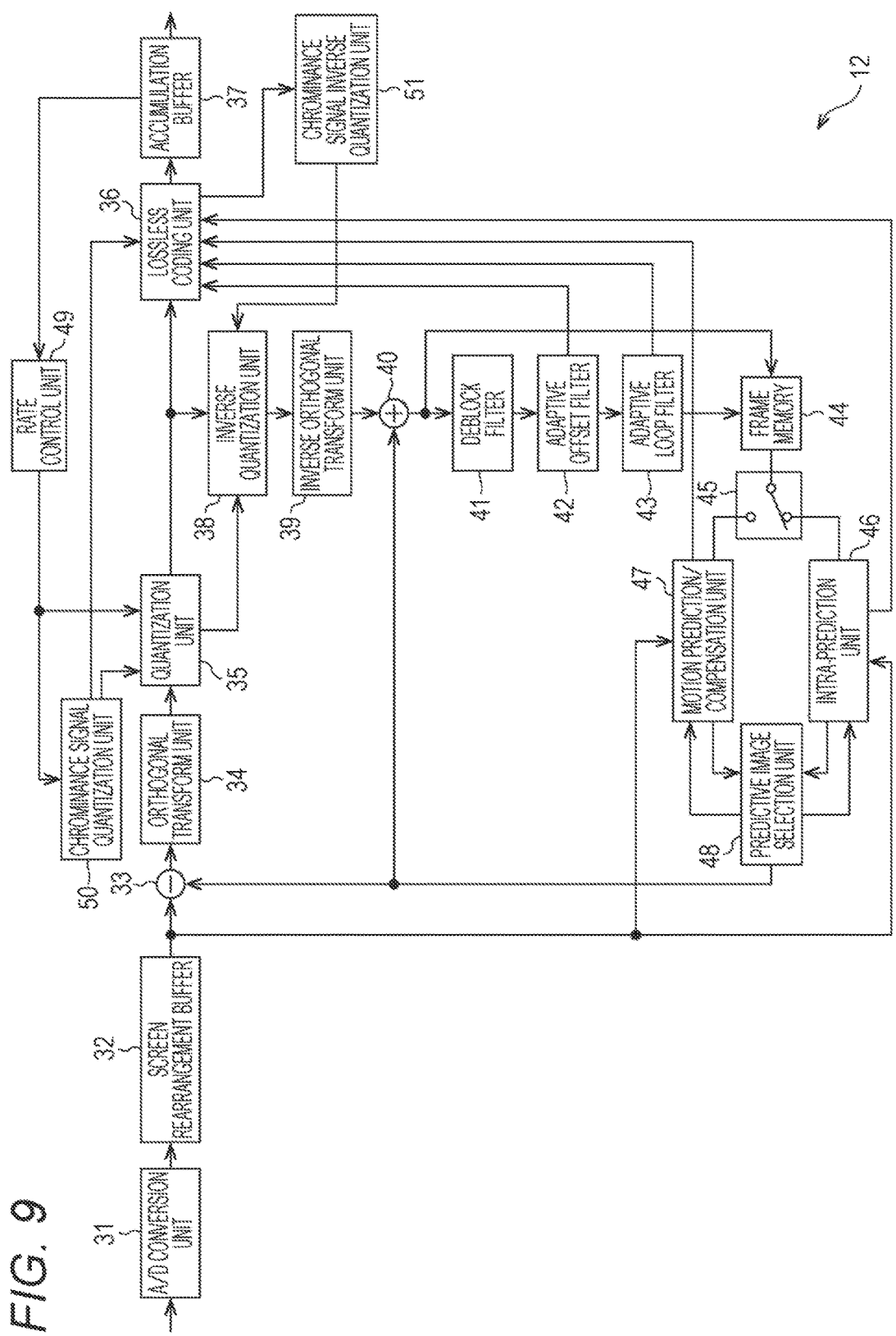
FIG. 9 is a block diagram illustrating an exemplary structure of the coding unit of FIG. 1.

FIG. 9 is a block diagram illustrating an exemplary structure of the coding unit 12 of FIG. 8.

The coding unit 12 of FIG. 9 has an A/D conversion unit 31, a screen rearrangement buffer 32, a computation unit 33, an orthogonal transform unit 34, a quantization unit 35, a lossless coding unit 36, an accumulation buffer 37, an inverse quantization unit 38, an inverse orthogonal transform unit 39, and an addition unit 40. The coding unit 12 further has a deblock filter 41, an adaptive offset filter 42, an adaptive loop filter 43, a frame memory 44, a switch 45, an intra-prediction unit 46, a motion prediction/compensation unit 47, a predictive image selection unit 48, and a rate control unit 49. The coding unit 12 further has a chrominance signal quantization unit 50 and a chrominance signal inverse quantization unit 51.

The A/D conversion unit 31 in the coding unit 12 A/D converts an input image to be coded in units of frame. The A/D conversion unit 31 outputs and stores the image as converted digital signal into the screen rearrangement buffer 32.

The screen rearrangement buffer 32 rearranges, in the coding order, the stored image in units of frame in the display order depending on the GOP structure. The screen rearrangement buffer 32 outputs the rearranged image to the computation unit 33, the intra-prediction unit 46, and the motion prediction/compensation unit 47.

The computation unit 33 performs coding by subtracting a predictive image supplied from the predictive image selection unit 48 from the image supplied from the screen rearrangement buffer 32. The computation unit 33 outputs the resultant image as residue information (differential) to the orthogonal transform unit 34. When a predictive image is not supplied from the predictive image selection unit 48, the computation unit 33 outputs the image read from the screen rearrangement buffer 32 as residue image to the orthogonal transform unit 34.

The orthogonal transform unit 34 performs an orthogonal transform processing on the residue information from the computation unit 33 in units of TU. The orthogonal transform unit 34 supplies an orthogonal transform processing result after the orthogonal transform processing to the quantization unit 35.

The size of TU may be 4×4 pixels, 8×8 pixels, 16×16 pixels, and 32×32 pixels. The orthogonal transform system may be discrete cosine transform (DCT), for example. A DCT orthogonal transform matrix when TU is 4×4 pixels, 8×8 pixels, or 16×16 pixels is obtained by thinning the DCT orthogonal transform matrix with TU of 32×32 pixels to ⅛, ¼ or ½. Therefore, the orthogonal transform unit 34 has only to provide a common computation unit for all the sizes of TU, and does not need to provide a computation unit per size of TU.

When the optimum prediction mode is an intra-prediction mode and TU has 4×4 pixels, Discrete Sine Transform (DST) is employed for the orthogonal transform system. In this way, when the optimum prediction mode is an intra-prediction mode and TU has 4×4 pixels, or when it is conspicuous that the residue information is smaller toward the coded surrounding image, the DST is employed as the orthogonal transform system, and thus the coding efficiency is enhanced.

The quantization unit 35 quantizes the orthogonal transform processing result supplied from the orthogonal transform unit 34 by use of a luminance signal quantization parameter and a chrominance signal quantization parameter from the chrominance signal quantization unit 50. The quantization unit 35 supplies the quantization value obtained as a result of the quantization to the lossless coding unit 36.

The lossless coding unit 36 obtains deltaQP, ΔQPC, and ChromaQPOffset. The lossless coding unit 36 obtains information on the optimum intra-prediction mode (which will be denoted as intra-prediction mode information) from the intra-prediction unit 46. Further, the lossless coding unit 36 obtains information on the optimum inter-prediction mode (which will be denoted as inter-prediction mode information), motion vectors, reference image specification information, and the like from the motion prediction/compensation unit 47.

Further, the lossless coding unit 36 obtains offset filter information on an offset filter from the adaptive offset filter 42, and obtains a filter coefficient from the adaptive loop filter 43.

The lossless coding unit 36 performs lossless coding such as variable length coding (Context-adaptive variable length coding (CAVLC), for example) or arithmetic coding (Context-adaptive binary arithmetic coding (CABAC), for example) on the quantization value supplied from the quantization unit 35.

Further, the lossless coding unit 36 losslessly codes as the coding information for coding, deltaQP, ΔQPC, ChromaQPOffset, the intra-prediction mode information or the inter-prediction mode information, the motion vectors, the reference image specification information, the offset filter information, and the filter coefficients. The lossless coding unit 36 supplies and accumulates the losslessly-coded coding information and the quantization value as coding data into the accumulation buffer 37. deltaQP, ΔQPC, and ChromaQPOffset are losslessly coded and supplied to the chrominance signal inverse quantization unit 51.

The losslessly coded coding information may be header information of a losslessly-coded quantization value (such as slice header).

The accumulation buffer 37 temporarily stores the coding data supplied from the lossless coding unit 36. Further, the accumulation buffer 37 supplies the stored coding data as a coding stream to the transmission unit 13 together with the parameter set supplied from the setting unit 11 in FIG. 1.

The quantization value output by the quantization unit 35 is input also into the inverse quantization unit 38. The inverse quantization unit 38 inversely quantizes the quantization value by use of the luminance signal quantization parameter and the chrominance signal quantization parameter from the chrominance signal inverse quantization unit 51. The inverse quantization unit 38 supplies the orthogonal transform processing result obtained as a result of the inverse quantization to the inverse orthogonal transform unit 39.

The inverse orthogonal transform unit 39 performs an inverse orthogonal transform processing on the orthogonal transform processing result supplied from the inverse quantization unit 38 in units of TU. The inverse orthogonal transform system may be inverse discrete cosine transform (IDCT) and inverse discrete sine transform (IDST), for example. The inverse orthogonal transform unit 39 supplies the residue information obtained as a result of the inverse orthogonal transform processing to the addition unit 40.

The addition unit 40 adds the residue information supplied from the inverse orthogonal transform unit 39 and the predictive image supplied from the predictive image selection unit 48 thereby to perform decoding. The addition unit 40 supplies the decoded image to the deblock filter 41 and the frame memory 44.

The deblock filter 41 performs an adaptive deblock filter processing of removing a block distortion on the decoded image supplied by the addition unit 40, and supplies the resultant image to the adaptive offset filter 42.

The adaptive offset filter 42 performs an adaptive offset filter (Sample adaptive offset (SAO)) processing of mainly removing ringing on the image subjected to the adaptive deblock filter processing by the deblock filter 41.

Specifically, the adaptive offset filter 42 determines a type of the adaptive offset filter processing per largest coding unit (LCU) as the maximum unit of coding, and finds an offset used for the adaptive offset filter processing. The adaptive offset filter 42 uses the found offset to perform the adaptive offset filter processing of the determined type on the image subjected to the adaptive deblock filter processing.

The adaptive offset filter 42 supplies the image subjected to the adaptive offset filter processing to the adaptive loop filter 43. Further, the adaptive offset filter 42 supplies the information on the type of the performed adaptive offset filter processing and the offset as offset filter information to the lossless coding unit 36.

The adaptive loop filter 43 is configured of a 2D Wiener filter, for example. The adaptive loop filter 43 performs an adaptive loop filter (ALF) processing on the image subjected to the adaptive offset filter processing supplied from the adaptive offset filter 42 per LCU, for example.

Specifically, the adaptive loop filter 43 calculates a filter coefficient used for the adaptive loop filter processing per LCU such that the residue of the original image output from the screen rearrangement buffer 32 and the image subjected to the adaptive loop filter processing is minimum. The adaptive loop filter 43 then performs the adaptive loop filter processing on the image subjected to the adaptive offset filter processing per LCU by use of the calculated filter coefficient.

The adaptive loop filter 43 supplies the image subjected to the adaptive loop filter processing to the frame memory 44. Further, the adaptive loop filter 43 supplies the filter coefficient used for the adaptive loop filter processing to the lossless coding unit 36.

Herein, the adaptive loop filter processing is assumed to be performed per LCU, but the processing unit of the adaptive loop filter processing is not limited to LCU. The processing units of the adaptive offset filter 42 and the adaptive loop filter 43 are matched, thereby efficiently performing the series of processing.

The frame memory 44 accumulates the image supplied from the adaptive loop filter 43 and the image supplied from the addition unit 40. The images adjacent to prediction unit (PU), among the images which are accumulated in the frame memory 44 and are not subjected to the filter processing, are supplied as surrounding images to the intra-prediction unit 46 via the switch 45. On the other hand, the images accumulated in the frame memory 44 and subjected to the filter processing are output as reference images to the motion prediction/compensation unit 47 via the switch 45.

The intra-prediction unit 46 performs an intra-prediction processing in all the candidate intra-prediction modes by use of the surrounding images read from the frame memory 44 via the switch 45 in units of PU.

Further, the intra-prediction unit 46 calculates the cost function values (described below in detail) for all the candidate intra-prediction modes based on the image read from the screen rearrangement buffer 32 and the predictive image generated as a result of the intra-prediction processing. The intra-prediction unit 46 then determines an intra-prediction mode for which the cost function value is minimum as the optimum intra-prediction mode.

The intra-prediction unit 46 supplies the predictive image generated in the optimum intra-prediction mode and the corresponding cost function value to the predictive image selection unit 48. When notified of the selection of the predictive image generated in the optimum intra-prediction mode from the predictive image selection unit 48, the intra-prediction unit 46 supplies intra-prediction mode information to the lossless coding unit 36. The intra-prediction mode is a mode indicating a size of PU, a prediction direction, and the like.

The motion prediction/compensation unit 47 performs a motion prediction/compensation processing in all the candidate inter-prediction modes in units of PU. Specifically, the motion prediction/compensation unit 47 detects motion vectors in all the candidate inter-prediction modes in units of PU based on the image supplied from the screen rearrangement buffer 32 and the reference image read from the frame memory 44 via the switch 45. The motion prediction/compensation unit 47 then performs a compensation processing on the reference image in units of PU based on the motion vectors, thereby to generate a predictive image.

At this time, the motion prediction/compensation unit 47 calculates the cost function values for all the candidate inter-prediction modes based on the image supplied from the screen rearrangement buffer 32 and the predictive image, and determines an inter-prediction mode for which the cost function value is minimum as the optimum inter-prediction mode. The motion prediction/compensation unit 47 then supplies the cost function value in the optimum inter-prediction mode and the corresponding predictive image to the predictive image selection unit 48. Further, the motion prediction/compensation unit 47 outputs the inter-prediction mode information generated in the optimum inter-prediction mode, the corresponding motion vectors, the reference image specification information, and the like from the predictive image selection unit 48 to the lossless coding unit 36. The inter-prediction mode is a mode indicating a size of PU and the like.

The predictive image selection unit 48 determines either the optimum intra-prediction mode or the optimum inter-prediction mode, for which the corresponding cost function value is smaller, as the optimum prediction mode based on the cost function values supplied from the intra-prediction unit 46 and the motion prediction/compensation unit 47. The predictive image selection unit 48 then supplies the predictive image in the optimum prediction mode to the computation unit 33 and the addition unit 40. Further, the predictive image selection unit 48 notifies the selection of the predictive image in the optimum prediction mode to the intra-prediction unit 46 or the motion prediction/compensation unit 47.

The rate control unit 49 controls a rate of the quantization operation of the quantization unit 35 based on the coding data accumulated in the accumulation buffer 37 in order to prevent overflow or underflow from occurring. Further, the rate control unit 49 supplies the luminance signal quantization parameter, the chrominance signal quantization parameter, and ChromaQPOffset to the chrominance signal quantization unit 50.

The chrominance signal quantization unit 50 determines a luminance signal quantization parameter and a chrominance signal quantization parameter in units of CU by use of the luminance signal quantization parameter, the chrominance signal quantization parameter, and ChromaQPOffset from the rate control unit 49. The chrominance signal quantization unit 50 supplies the determined luminance signal quantization parameter and chrominance signal quantization parameter to the quantization unit 35.

Further, the chrominance signal quantization unit 50 calculates a predictive quantization parameter predQP from the quantization parameters of the adjacent CUs. The chrominance signal quantization unit 50 calculates deltaQP and $\Delta QP_C$ from the determined luminance signal quantization parameter and chrominance signal quantization parameter and the calculated predictive quantization parameter predQP. The chrominance signal quantization unit 50 supplies the calculated deltaQP, $\Delta QP_C$, and ChromaQPOffset to the lossless coding unit 36.

The chrominance signal inverse quantization unit 51 receives deltaQP, $\Delta QP_C$, and ChromaQPOffset from the lossless coding unit 36. The chrominance signal inverse quantization unit 51 calculates the predictive quantization parameter predQP from the quantization parameters in the adjacent CUs. The chrominance signal inverse quantization unit 51 reconstructs the luminance signal quantization parameter by deltaQP and predQP thereby to determine the luminance signal quantization parameter. The chrominance signal inverse quantization unit 51 then supplies the determined luminance signal quantization parameter to the inverse quantization unit 38.

The chrominance signal inverse quantization unit 51 reconstructs the chrominance signal quantization parameter by the reconstructed luminance signal quantization parameter, $\Delta QP_C$, and ChromaQPOffset thereby to determine the chrominance signal quantization parameter. The chrominance signal inverse quantization unit 51 supplies the determined chrominance signal quantization parameter to the inverse quantization unit 38.

(Exemplary Structure of Chrominance Signal Quantization Unit)

Figure 10:
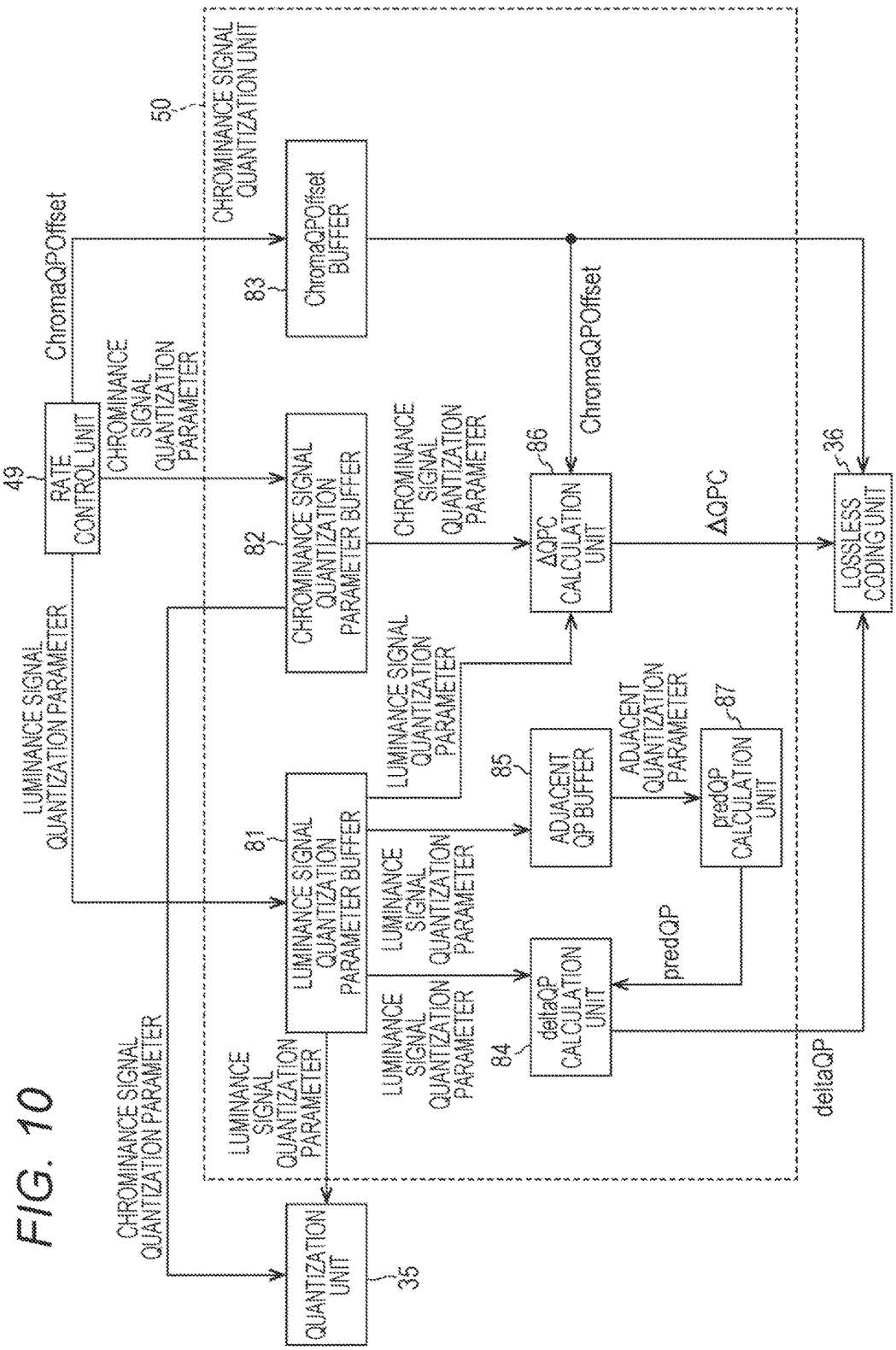
FIG. 10 is a block diagram illustrating an exemplary structure of a chrominance signal quantization unit.

FIG. 10 is a block diagram illustrating an exemplary structure of the chrominance signal quantization unit 50 of FIG. 9.

The chrominance signal quantization unit 50 in FIG. 10 is configured to include a luminance signal quantization parameter buffer 81, a chrominance signal quantization parameter buffer 82, a ChromaQPOffset buffer 83, a deltaQP calculation unit 84, an adjacent QP buffer 85, a ΔQPC calculation unit 86, and a predQP calculation unit 87.

The luminance signal quantization parameter, the chrominance signal quantization parameter and ChromaQPOffset are supplied from the rate control unit 49 to the luminance signal quantization parameter buffer 81, the chrominance signal quantization parameter buffer 82, and the ChromaQPOffset buffer 83, respectively.

The luminance signal quantization parameter buffer 81 accumulates the luminance signal quantization parameter from the rate control unit 49, and determines it as a luminance signal quantization parameter for the CU. The luminance signal quantization parameter buffer 81 supplies the determined luminance signal quantization parameter to the quantization unit 35, the deltaQP calculation unit 84, the adjacent QP buffer 85, and the ΔQPC calculation unit 86.

The chrominance signal quantization parameter buffer 82 accumulates the chrominance signal quantization parameter from the rate control unit 49, and determines it as a chrominance signal quantization parameter for the CU. The chrominance signal quantization parameter buffer 82 supplies the determined chrominance signal quantization parameter to the quantization unit 35 and the ΔQPC calculation unit 86.

The ChromaQPOffset buffer 83 accumulates ChromaQPOffset from the rate control unit 49, and supplies it to the ΔQPC calculation unit 86 and the lossless coding unit 36.

The deltaQP calculation unit 84 calculates deltaQP by use of the luminance signal quantization parameter for the CU from the luminance signal quantization parameter buffer 81 and predQP from the predQP calculation unit 87. The deltaQP calculation unit 84 supplies the calculated deltaQP to the lossless coding unit 36.

The adjacent QP buffer 85 accumulates the luminance signal quantization parameter from the luminance signal quantization parameter buffer 81, and supplies it as a luminance quantization parameter for adjacent CU (which will be denoted as adjacent quantization parameter) to the predQP calculation unit 87.

The ΔQPC calculation unit 86 calculates ΔQPC by use of the luminance signal quantization parameter from the luminance signal quantization parameter buffer 81, the chrominance signal quantization parameter from the chrominance signal quantization parameter buffer 82, and ChromaQPOffset from the ChromaQPOffset buffer 83. The ΔQPC calculation unit 86 supplies the calculated ΔQPC to the lossless coding unit 36.

The predQP calculation unit 87 calculates predQP in a method defined in HEVC or the like by use of the adjacent quantization parameter from the adjacent QP buffer 85. The predQP calculation unit 87 supplies the calculated predQP to the deltaQP calculation unit 84.

(Exemplary Structure of Chrominance Signal Inverse Quantization Unit)

Figure 11:
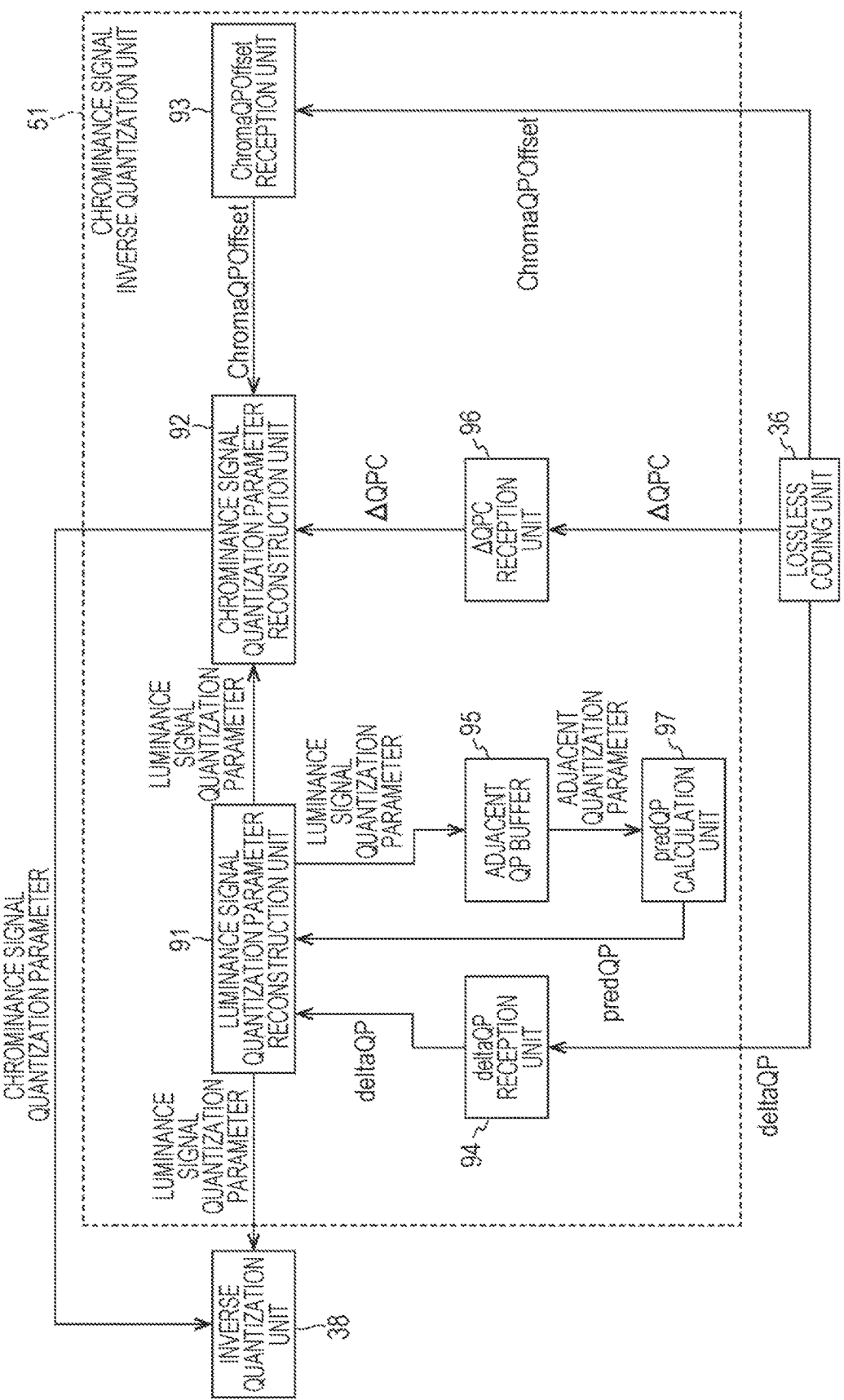
FIG. 11 is a block diagram illustrating an exemplary structure of a chrominance signal inverse quantization unit.

FIG. 11 is a block diagram illustrating an exemplary structure of the chrominance signal inverse quantization unit 51 of FIG. 9.

The chrominance signal inverse quantization unit 51 in FIG. 11 is configured to include a luminance signal quantization parameter reconstruction unit 91, a chrominance signal quantization parameter reconstruction unit 92, a ChromaQPOffset reception unit 93, a deltaQP reception unit 94, an adjacent QP buffer 95, a ΔQPC reception unit 96, and a predQP calculation unit 97.

deltaQP, ΔQPC, and ChromaQPOffset are supplied from the lossless coding unit 36 to the deltaQP reception unit 94, the ΔQPC reception unit 96, and the ChromaQPOffset reception unit 93, respectively.

The luminance signal quantization parameter reconstruction unit 91 reconstructs the luminance signal quantization parameter by use of deltaQP from the deltaQP reception unit 94 and predQP from the predQP calculation unit 97. The luminance signal quantization parameter reconstruction unit 91 supplies the reconstructed luminance signal quantization parameter to the inverse quantization unit 38, the chrominance signal quantization parameter reconstruction unit 92, and the adjacent QP buffer 95.

The chrominance signal quantization parameter reconstruction unit 92 reconstructs the chrominance signal quantization parameter by use of ΔQPC from the ΔQPC reception unit 96, ChromaQPOffset from the ChromaQPOffset reception unit 93, and the luminance signal quantization parameter from the luminance signal quantization parameter reconstruction unit 91. The chrominance signal quantization parameter reconstruction unit 92 supplies the reconstructed chrominance signal quantization parameter to the inverse quantization unit 38.

The ChromaQPOffset reception unit 93 receives ChromaQPOffset from the lossless coding unit 36, and supplies it to the chrominance signal quantization parameter reconstruction unit 92.

The deltaQP reception unit 94 receives deltaQP from the lossless coding unit 36, and supplies it to the luminance signal quantization parameter reconstruction unit 91.

The adjacent QP buffer 95 accumulates the luminance signal quantization parameter from the luminance signal quantization parameter reconstruction unit 91, and supplies it as adjacent quantization parameter to the predQP calculation unit 97.

The ΔQPC reception unit 96 receives ΔQPC from the lossless coding unit 36, and supplies it to the chrominance signal quantization parameter reconstruction unit 92.

The predQP calculation unit 97 calculates predQP in a method defined in HEVC or the like by use of the adjacent quantization parameter from the adjacent QP buffer 95. The predQP calculation unit 97 supplies the calculated predQP to the luminance signal quantization parameter reconstruction unit 91.

(Description of Series of Processing in Coding Device)

Figure 12:
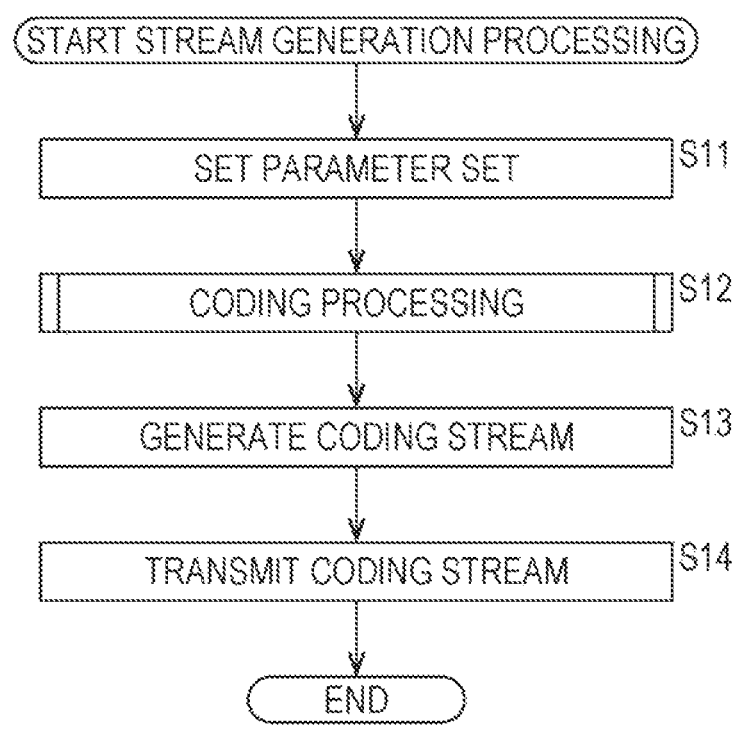
FIG. 12 is a flowchart for explaining a stream generation processing.

FIG. 12 is a flowchart for explaining a stream generation processing in the coding device 10 of FIG. 8.

In step S11 in FIG. 12, the setting unit 11 in the coding device 10 sets a parameter set. The setting unit 11 supplies the set parameter set to the coding unit 12.

In step S12, the coding unit 12 performs the coding processing of coding an externally-input image in units of frame in a system conforming to the HEVC system. The coding processing will be described below in detail with reference to FIG. 13 and FIG. 14.

In step S13, the accumulation buffer 37 (FIG. 9) in the coding unit 12 generates a coding stream based on the parameter set supplied from the setting unit 11 and the accumulated coding data, and supplies it to the transmission unit 13.

In step S14, the transmission unit 13 transmits the coding stream supplied from the setting unit 11 to a decoding device 110 described below, and terminates the processing.

Figure 13:
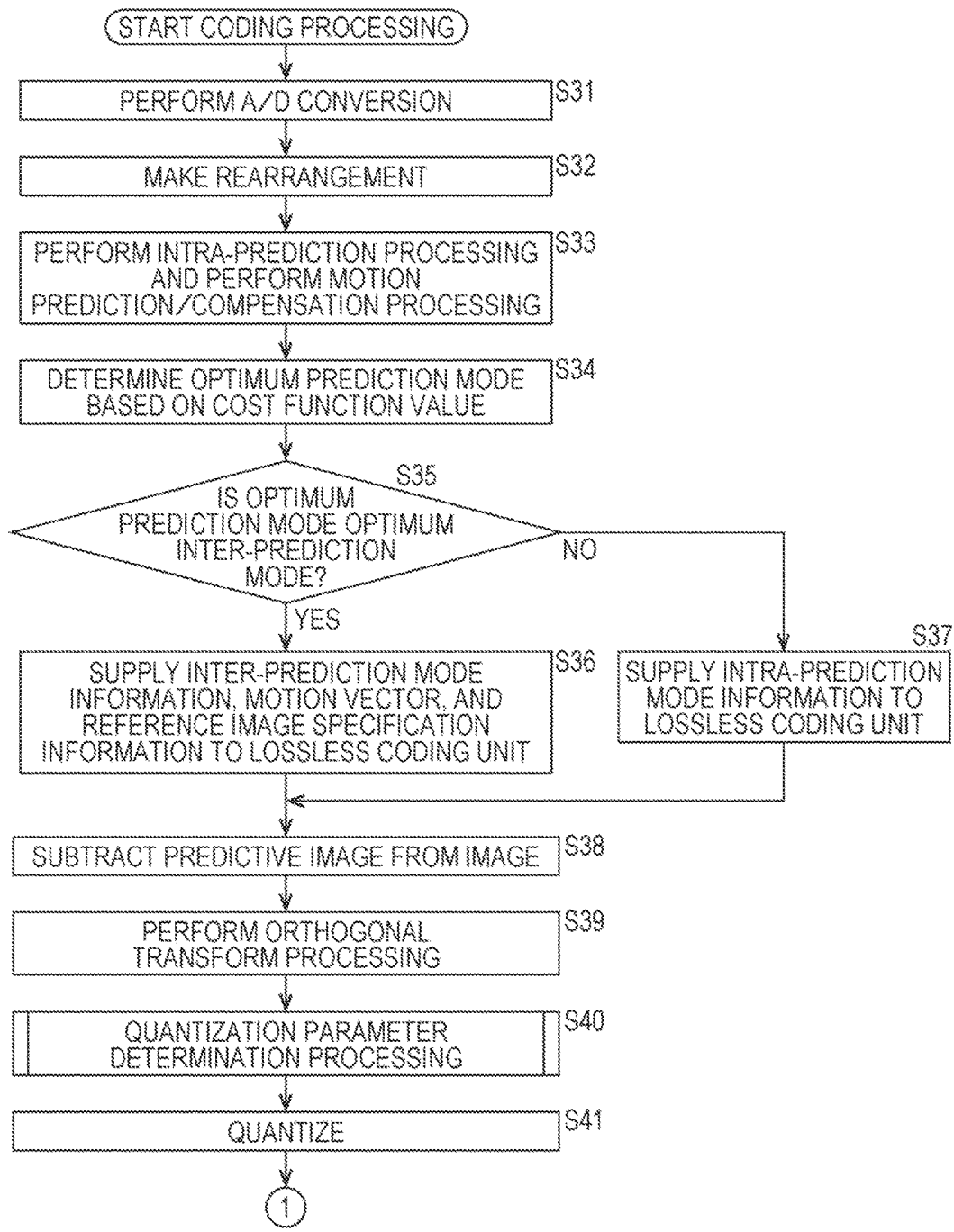
FIG. 13 is a flowchart for explaining a coding processing of FIG. 12 in detail.
Figure 14:
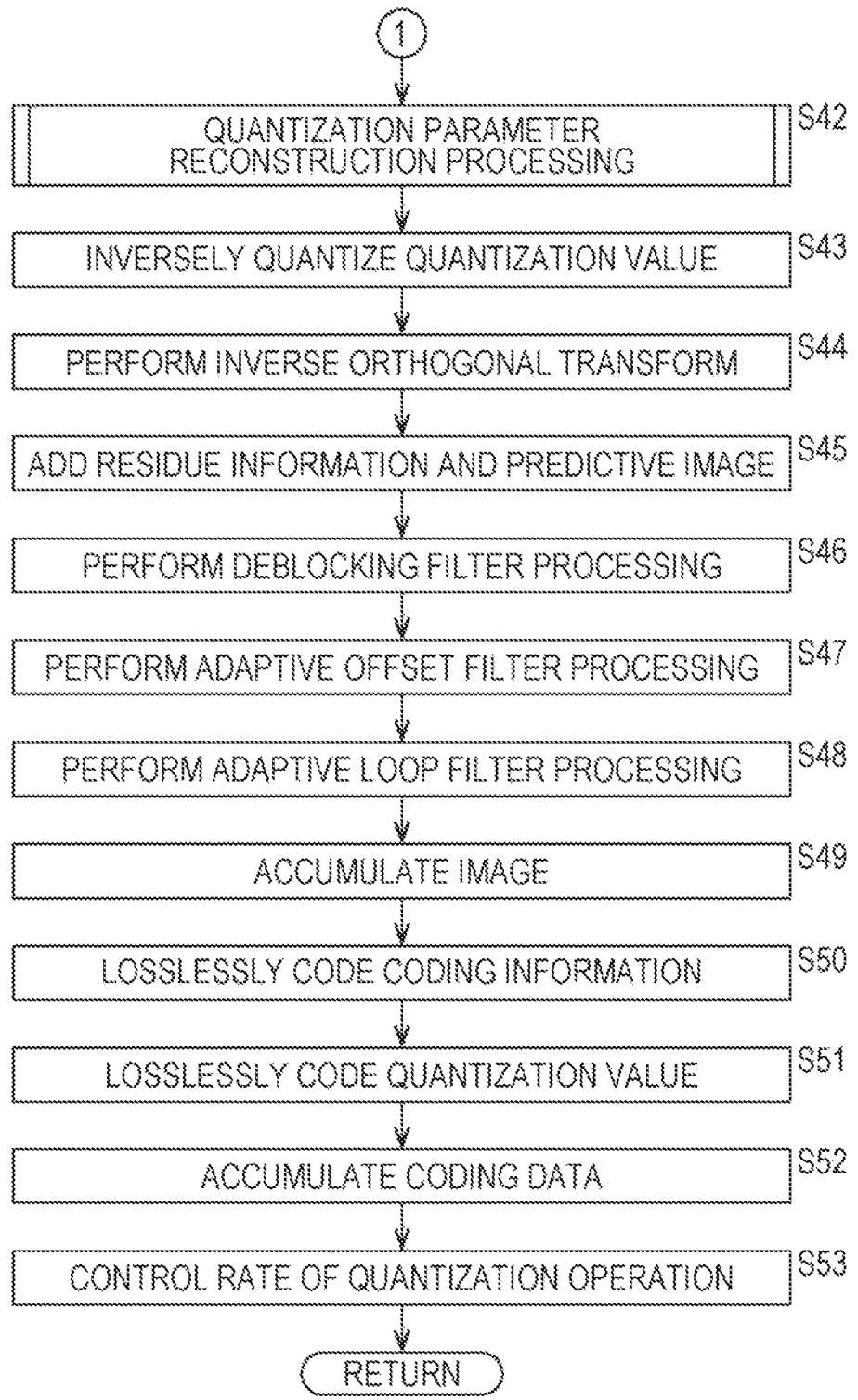
FIG. 14 is a flowchart for explaining the coding processing of FIG. 12 in detail.

FIG. 13 and FIG. 14 are the flowcharts for explaining the coding processing in step S12 in FIG. 12 in detail.

In step S31 in FIG. 13, the A/D conversion unit 31 (FIG. 9) in the coding unit 12 A/D converts the input image to be coded in units of frame. The A/D conversion unit 31 outputs and stores the converted image as digital signal into the screen rearrangement buffer 32.

In step S32, the screen rearrangement buffer 32 rearranges, in the coding order, the stored images of the frames in the display order depending on the GOP structure. The screen rearrangement buffer 32 supplies the rearranged images in units of frame to the computation unit 33, the intra-prediction unit 46, and the motion prediction/compensation unit 47.

In step S33, the intra-prediction unit 46 performs the intra-prediction processing in all the candidate intra-prediction modes in units of PU. Further, the intra-prediction unit 46 calculates the cost function values for all the candidate intra-prediction modes based on the image read from the screen rearrangement buffer 32 and the predictive image generated as a result of the intra-prediction processing. The intra-prediction unit 46 then determines an intra-prediction mode for which the cost function value is minimum as the optimum intra-prediction mode. The intra-prediction unit 46 supplies the predictive image generated in the optimum intra-prediction mode and the corresponding cost function value to the predictive image selection unit 48.

Further, the motion prediction/compensation unit 47 performs the motion prediction/compensation processing in all the candidate inter-prediction modes in units of PU. Further, the motion prediction/compensation unit 47 calculates the cost function values for all the candidate inter-prediction modes based on the image supplied from the screen rearrangement buffer 32 and the predictive image, and determines an inter-prediction mode for which the cost function value is minimum as the optimum inter-prediction mode. The motion prediction/compensation unit 47 then supplies the cost function value in the optimum inter-prediction mode and the corresponding predictive image to the predictive image selection unit 48.

In step S34, the predictive image selection unit 48 determines either the optimum intra-prediction mode or the optimum inter-prediction mode for which the cost function value is minimum as the optimum prediction mode based on the cost function values supplied from the intra-prediction unit 46 and the motion prediction/compensation unit 47 in the processing in step S33. The predictive image selection unit 48 then supplies the predictive image in the optimum prediction mode to the computation unit 33 and the addition unit 40.

In step S35, the predictive image selection unit 48 determines whether the optimum prediction mode is the optimum inter-prediction mode. When it is determined in step S35 that the optimum prediction mode is the optimum inter-prediction mode, the predictive image selection unit 48 notifies the selection of the predictive image generated in the optimum inter-prediction mode to the motion prediction/compensation unit 47.

Then, in step S36, the motion prediction/compensation unit 47 supplies the inter-prediction mode information, the motion vectors, and the reference image specification information to the lossless coding unit 36, and the processing proceeds to step S38.

On the other hand, when it is determined in step S35 that the optimum prediction mode is not the optimum inter-prediction mode, or when the optimum prediction mode is the optimum intra-prediction mode, the predictive image selection unit 48 notifies the selection of the predictive image generated in the optimum intra-prediction mode to the intra-prediction unit 46. Then, in step S37, the intra-prediction unit 46 supplies the intra-prediction mode information to the lossless coding unit 36, and the processing proceeds to step S38.

In step S38, the computation unit 33 performs coding by subtracting the predictive image supplied from the predictive image selection unit 48 from the image supplied from the screen rearrangement buffer 32. The computation unit 33 outputs the resultant image as residue information to the orthogonal transform unit 34.

In step S39, the orthogonal transform unit 34 performs the orthogonal transform processing on the residue information in units of TU. The orthogonal transform unit 34 supplies the orthogonal transform processing result after the orthogonal transform processing to the quantization unit 35.

In step S40, the chrominance signal quantization unit 50 performs a quantization parameter determination processing. The quantization parameter determination processing will be described below in detail with reference to FIG. 15.

In the processing in step S40, the determined luminance signal and chrominance signal, and their respective quantization parameters are supplied to the quantization unit 35. Further, the calculated deltaQP, ΔQPC, and ChromaQPOffset are supplied to the lossless coding unit 36.

In step S41, the quantization unit 35 quantizes the orthogonal transform processing result supplied from the orthogonal transform unit 34 by use of the luminance signal quantization parameter and the chrominance signal quantization parameter from the chrominance signal quantization unit 50. The quantization unit 35 supplies the quantization value obtained as a result of the quantization to the lossless coding unit 36 and the inverse quantization unit 38.

The lossless coding unit 36 supplies deltaQP, ΔQPC, and ChromaQPOffset from the quantization unit 35 to the chrominance signal inverse quantization unit 51.

In step S42 in FIG. 14, the chrominance signal inverse quantization unit 51 performs a quantization parameter reconstruction processing. The quantization parameter reconstruction processing will be described below in detail with reference to FIG. 16.

In the processing in step S42, there constructed luminance signal and chrominance signal, and their respective quantization parameters are supplied to the inverse quantization unit 38.

In step S43, the inverse quantization unit 38 inversely quantizes the quantization value from the quantization unit 35 by use of the luminance signal quantization parameter and the chrominance signal quantization parameter from the chrominance signal inverse quantization unit 51. The inverse quantization unit 38 supplies the orthogonal transform processing result obtained as a result of the inverse quantization to the inverse orthogonal transform unit 39.

In step S44, the inverse orthogonal transform unit 39 performs the inverse orthogonal transform processing on the orthogonal transform processing result supplied from the inverse quantization unit 38 in units of TU. The inverse orthogonal transform unit 39 supplies the residue information obtained as a result of the inverse orthogonal transform processing to the addition unit 40.

In step S45, the addition unit 40 adds the residue information supplied from the inverse orthogonal transform unit 39 and the predictive image supplied from the predictive image selection unit 48 thereby to perform decoding. The addition unit 40 supplies the decoded image to the deblock filter 41 and the frame memory 44.

In step S46, the deblock filter 41 performs a deblocking filter processing on the decoded image supplied from the addition unit 40. The deblock filter 41 supplies the resultant image to the adaptive offset filter 42.

In step S47, the adaptive offset filter 42 performs the adaptive offset filter processing on the image supplied from the deblock filter 41 per LCU. The adaptive offset filter 42 supplies the resultant image to the adaptive loop filter 43. Further, the adaptive offset filter 42 supplies the offset filter information to the lossless coding unit 36 per LCU.

In step S48, the adaptive loop filter 43 performs the adaptive loop filter processing on the image supplied from the adaptive offset filter 42 per LCU. The adaptive loop filter 43 supplies the resultant image to the frame memory 44. Further, the adaptive loop filter 43 supplies the filter coefficient used in the adaptive loop filter processing to the lossless coding unit 36.

In step S49, the frame memory 44 accumulates the image supplied from the adaptive loop filter 43 and the image supplied from the addition unit 40. The images adjacent to PU, among the images which are accumulated in the frame memory 44 and are not subjected to the filter processing, are supplied as surrounding images to the intra-prediction unit 46 via the switch 45. On the other hand, the images accumulated in the frame memory 44 and subjected to the filter processing are output as reference images to the motion prediction/compensation unit 47 via the switch 45.

In step S50, the lossless coding unit 36 losslessly codes the intra-prediction mode information or the inter-prediction mode information, the motion vectors, the reference image specification information, deltaQP, ΔQPC, ChromaQPOffset, the offset filter information, and the filter coefficient as the coding information.

In step S51, the lossless coding unit 36 losslessly codes the quantization value supplied from the quantization unit 35. The lossless coding unit 36 then generates coding data based on the coding information losslessly coded in the processing in step S50 and the losslessly-coded quantization value, and supplies it to the accumulation buffer 37.

In step S52, the accumulation buffer 37 temporarily accumulates the coding data supplied from the lossless coding unit 36.

In step S53, the rate control unit 49 controls a rate of the quantization operation of the quantization unit 35 based on the coding data accumulated in the accumulation buffer 37 in order to prevent overflow or underflow from occurring. Further, the rate control unit 49 supplies the luminance signal quantization parameter, the chrominance signal quantization parameter, and ChromaQPOffset to the chrominance signal quantization unit 50. The processing then returns to step S12 in FIG. 12 and proceeds to step S13.

The intra-prediction processing and the motion prediction/compensation processing are assumed to be always performed in the coding processing in FIG. 13 and FIG. 14 for simplified description, but actually either one of them may be performed depending on picture type or the like.

Figure 15:
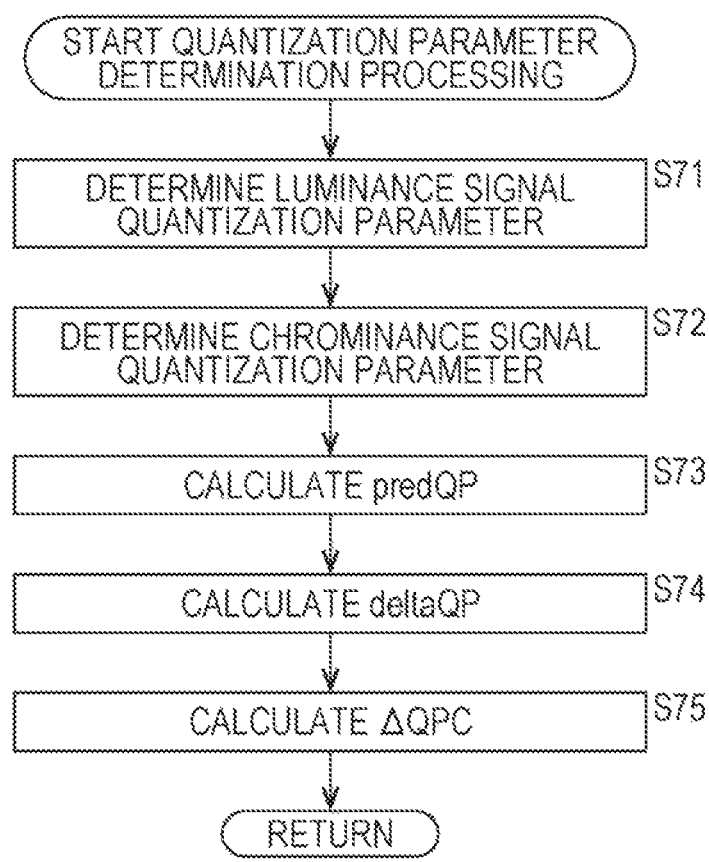
FIG. 15 is a flowchart for explaining a flow of a quantization parameter determination processing of FIG. 13 by way of example.

FIG. 15 is a flowchart for explaining the quantization parameter determination processing in step S40 in FIG. 13.

The luminance signal quantization parameter, the chrominance signal quantization parameter, and ChromaQPOffset are supplied and accumulated from the rate control unit 49 into the luminance signal quantization parameter buffer 81, the chrominance signal quantization parameter buffer 82, and the ChromaQPOffset buffer 83, respectively.

In step S71, the luminance signal quantization parameter buffer 81 determines the luminance signal quantization parameter from the rate control unit 49 as luminance signal quantization parameter for the CU, for example. The luminance signal quantization parameter buffer 81 supplies the determined luminance signal quantization parameter to the quantization unit 35, the deltaQP calculation unit 84, the adjacent QP buffer 85, and the ΔQPC calculation unit 86.

In step S72, the chrominance signal quantization parameter buffer 82 determines the chrominance signal quantization parameter from the rate control unit 49 as chrominance signal quantization parameter for the CU, for example. The chrominance signal quantization parameter buffer 82 supplies the determined chrominance signal quantization parameter to the quantization unit 35 and the ΔQPC calculation unit 86.

The adjacent QP buffer 85 accumulates the luminance signal quantization parameter from the luminance signal quantization parameter buffer 81, and supplies it as luminance quantization parameter for adjacent CU (which will be denoted as adjacent quantization parameter below) to the predQP calculation unit 87.

In step S73, the predQP calculation unit 87 calculates predQP in a method defined in HEVC or the like by use of the adjacent quantization parameter from the adjacent QP buffer 85. The predQP calculation unit 87 supplies the calculated predQP to the deltaQP calculation unit 84.

In step S74, the deltaQP calculation unit 84 calculates deltaQP by use of the luminance signal quantization parameter for the CU from the luminance signal quantization parameter buffer 81 and predQP from the predQP calculation unit 87. The deltaQP calculation unit 84 supplies the calculated deltaQP to the lossless coding unit 36.

In step S75, the ΔQPC calculation unit 86 calculates ΔQPC by use of the luminance signal quantization parameter from the luminance signal quantization parameter buffer 81, the chrominance signal quantization parameter from the chrominance signal quantization parameter buffer 82, and ChromaQPOffset from the ChromaQPOffset buffer 83. The ΔQPC calculation unit 86 supplies the calculated ΔQPC to the lossless coding unit 36.

Figure 16:
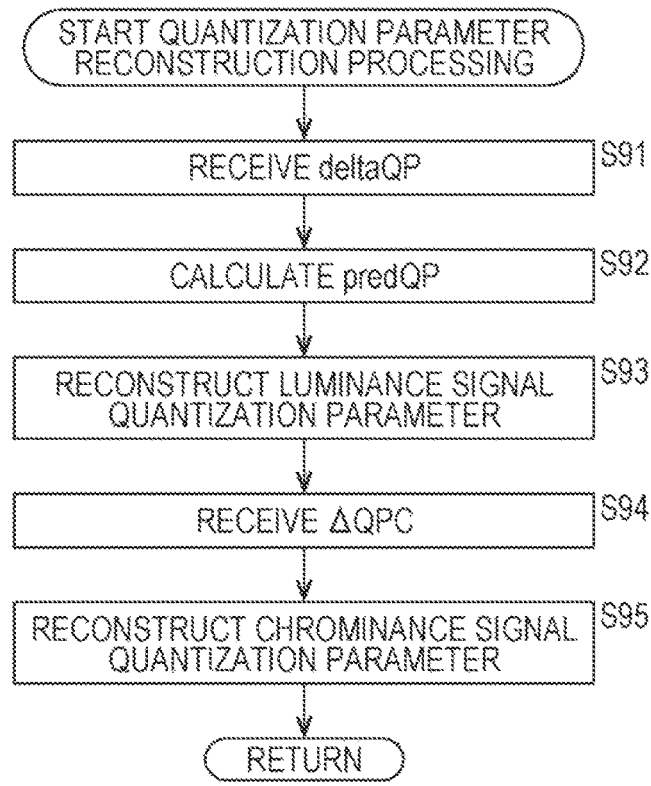
FIG. 16 is a flowchart for explaining a flow of a quantization parameter reconstruction processing of FIG. 14 by way of example.

FIG. 16 is a flowchart for explaining the quantization parameter reconstruction processing in step S42 in FIG. 14.

deltaQP, ΔQPC, and ChromaQPOffset are supplied from the lossless coding unit 36 to the deltaQP reception unit 94, the ΔQPC reception unit 96, and the ChromaQPOffset reception unit 93, respectively. The ChromaQPOffset reception unit 93 receives ChromaQPOffset from the lossless coding unit 36 at a predetermined timing, and supplies it to the chrominance signal quantization parameter reconstruction unit 92.

In step S91, the deltaQP reception unit 94 receives deltaQP from the lossless coding unit 36. The deltaQP reception unit 94 supplies the received deltaQP to the luminance signal quantization parameter reconstruction unit 91.

In step S92, the predQP calculation unit 97 calculates predQP in a method defined in HEVC or the like by use of the adjacent quantization parameter from the adjacent QP buffer 95. The predQP calculation unit 97 supplies the calculated predQP to the luminance signal quantization parameter reconstruction unit 91.

In step S93, the luminance signal quantization parameter reconstruction unit 91 reconstructs the luminance signal quantization parameter by use of deltaQP from the deltaQP reception unit 94 and predQP from the predQP calculation unit 97. The luminance signal quantization parameter reconstruction unit 91 supplies the reconstructed luminance signal quantization parameter to the inverse quantization unit 38, the chrominance signal quantization parameter reconstruction unit 92, and the adjacent QP buffer 95.

In step S94, the ΔQPC reception unit 96 receives ΔQPC from the lossless coding unit 36. The ΔQPC reception unit 96 supplies the received ΔQPC to the chrominance signal quantization parameter reconstruction unit 92.

In step S95, the chrominance signal quantization parameter reconstruction unit 92 reconstructs the chrominance signal quantization parameter by use of ΔQPC from the ΔQPC reception unit 96, ChromaQPOffset from the ChromaQPOffset reception unit 93, and the luminance signal quantization parameter from the luminance signal quantization parameter reconstruction unit 91. The chrominance signal quantization parameter reconstruction unit 92 supplies the reconstructed chrominance signal quantization parameter to the inverse quantization unit 38.

As described above, ΔQPC is calculated and is sent to the decoding side at the same time with deltaQP, and thus the code amount of the chrominance signal in an image can be controlled. In particular, when a signal with wide color gamut is input, rate controllability for chrominance signal can be enhanced.

(Exemplary Structure of Exemplary Embodiment of Decoding Device)

Figure 17:
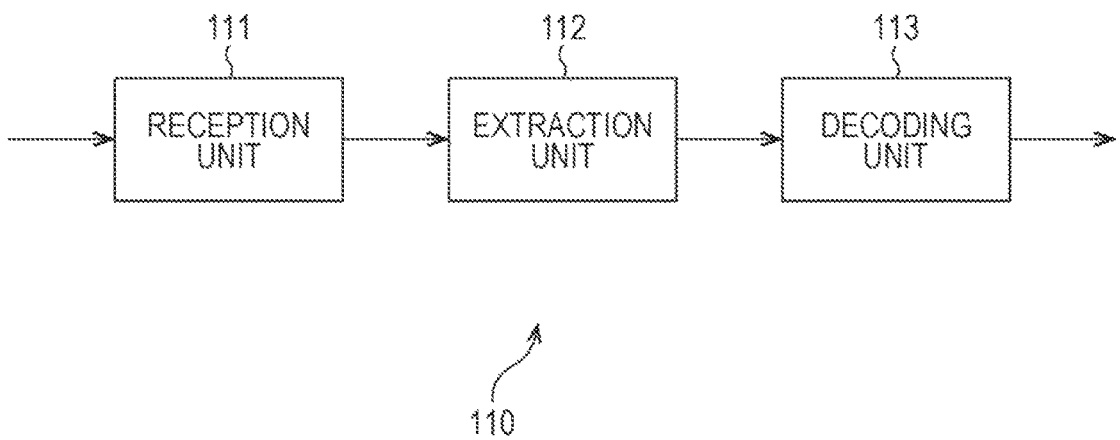
FIG. 17 is a block diagram illustrating an exemplary structure of the first exemplary embodiment of a decoding device to which the present disclosure is applied.

FIG. 17 is a block diagram illustrating an exemplary structure of an exemplary embodiment of the decoding device, to which the present disclosure is applied, for decoding a coding stream transmitted from the coding device 10 in FIG. 8.

The decoding device 110 in FIG. 17 is configured of a reception unit 111, an extraction unit 112, and a decoding unit 113.

The reception unit 111 in the decoding device 110 receives a coding stream transmitted from the coding device 10 in FIG. 8, and supplies it to the extraction unit 112.

The extraction unit 112 extracts the parameter set and the coding data from the coding stream supplied from the reception unit 111, and supplies them to the decoding unit 113.

The decoding unit 113 decodes the coding data supplied from the extraction unit 112 in a system conforming to the HEVC system. At this time, the decoding unit 113 refers to the parameter set supplied from the extraction unit 112 as needed. The decoding unit 113 outputs the image obtained as a result of the decoding.

(Exemplary Structure of Decoding Unit)

Figure 18:
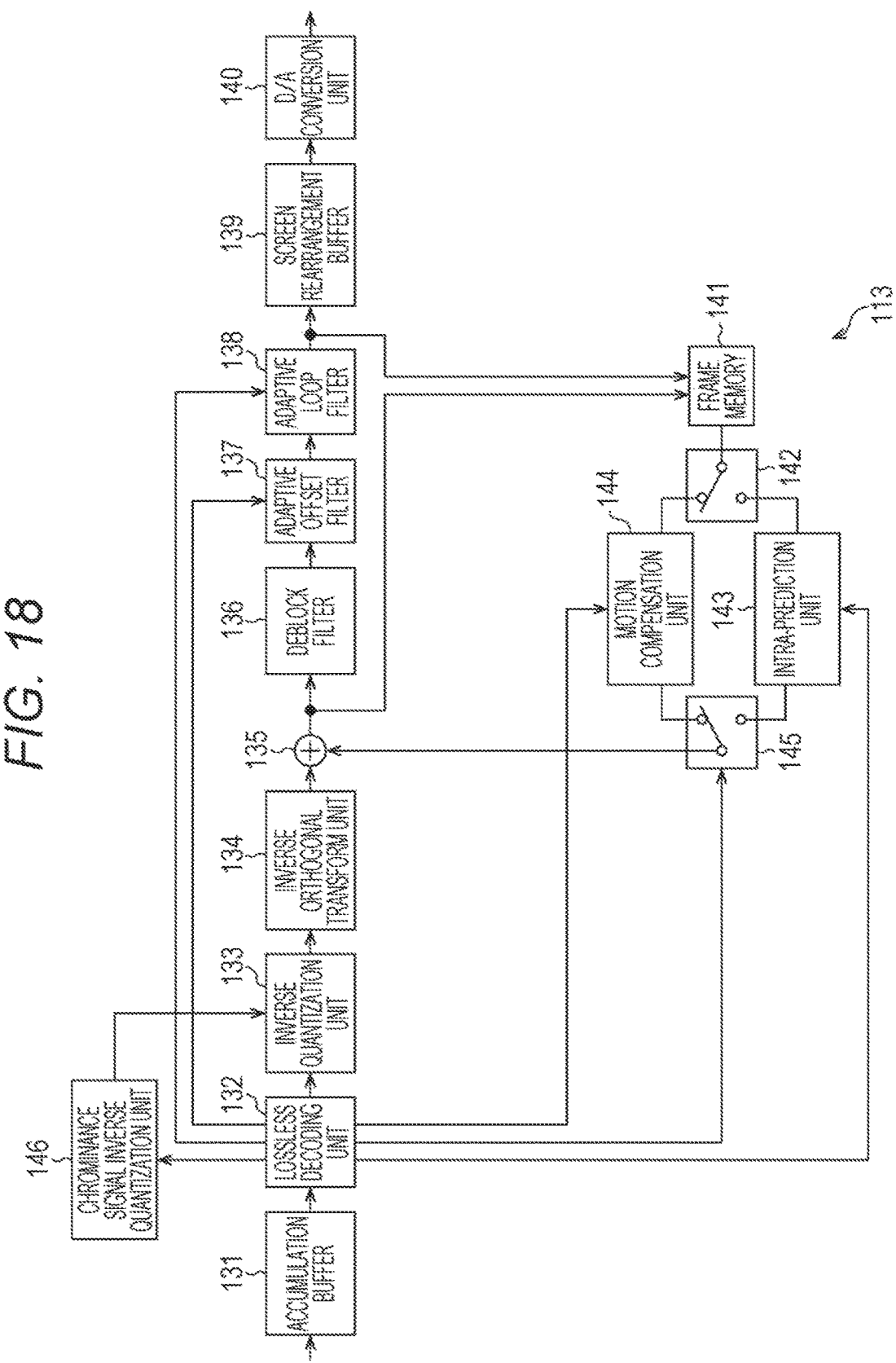
FIG. 18 is a block diagram illustrating an exemplary structure of a decoding unit of FIG. 17.

FIG. 18 is a block diagram illustrating an exemplary structure of the decoding unit 113 of FIG. 17.

The decoding unit 113 in FIG. 18 has an accumulation buffer 131, a lossless decoding unit 132, an inverse quantization unit 133, an inverse orthogonal transform unit 134, an addition unit 135, a deblock filter 136, an adaptive offset filter 137, an adaptive loop filter 138, and a screen rearrangement buffer 139. The decoding unit 113 further has a D/A conversion unit 140, a frame memory 141, a switch 142, an intra-prediction unit 143, a motion compensation unit 144, a switch 145, and a chrominance signal inverse quantization unit 146.

The accumulation buffer 131 in the decoding unit 113 receives and accumulates the coding data from the extraction unit 112 in FIG. 17. The accumulation buffer 131 supplies the accumulated coding data to the lossless decoding unit 132.

The lossless decoding unit 132 performs lossless decoding such as variable length decoding or arithmetic decoding on the coding data from the accumulation buffer 131 thereby to obtain the quantization value and the coding information. The lossless decoding unit 132 supplies the quantization value to the inverse quantization unit 133. Further, the lossless decoding unit 132 supplies the intra-prediction mode information as the coding information to the intra-prediction unit 143. The lossless decoding unit 132 supplies the motion vectors, the inter-prediction mode information, the reference image specification information, and the like to the motion compensation unit 144.

Further, the lossless decoding unit 132 supplies the intra-prediction mode information or the inter-prediction mode information as the coding information to the switch 145. The lossless decoding unit 132 supplies the offset filter information as the coding information to the adaptive offset filter 137. The lossless decoding unit 132 supplies the filter coefficient as the coding information to the adaptive loop filter 138.

Further, the lossless decoding unit 132 supplies deltaQP, ΔQPC, and ChromaQPOffset as the coding information to the chrominance signal inverse quantization unit 146.

The inverse quantization unit 133, the inverse orthogonal transform unit 134, the addition unit 135, the deblock filter 136, the adaptive offset filter 137, the adaptive loop filter 138, the frame memory 141, the switch 142, the intra-prediction unit 143, the motion compensation unit 144, and the chrominance signal inverse quantization unit 146 perform the same series of processing as the inverse quantization unit 38, the inverse orthogonal transform unit 39, the addition unit 40, the deblock filter 41, the adaptive offset filter 42, the adaptive loop filter 43, the frame memory 44, the switch 45, the intra-prediction unit 46, the motion prediction/compensation unit 47, and the chrominance signal inverse quantization unit 51 in FIG. 9, respectively, thereby to decode an image.

Specifically, the inverse quantization unit 133 is configured in the same way as the inverse quantization unit 38 in FIG. 9. The inverse quantization unit 133 inversely quantizes the quantization value from the lossless decoding unit 132 in units of TU. The inverse quantization unit 133 supplies the resultant orthogonal transform processing result to the inverse orthogonal transform unit 134.

The inverse orthogonal transform unit 134 is configured in the same way as the inverse orthogonal transform unit 39 in FIG. 9. The inverse orthogonal transform unit 134 performs the inverse orthogonal transform processing on the orthogonal transform processing result supplied from the inverse quantization unit 133 by use of the luminance signal quantization parameter and the chrominance signal quantization parameter supplied from the chrominance signal inverse quantization unit 146. The inverse orthogonal transform unit 134 supplies the residue information obtained as a result of the inverse orthogonal transform processing to the addition unit 135.

The addition unit 135 adds the residue information supplied from the inverse orthogonal transform unit 134 and the predictive image supplied from the switch 145 thereby to perform decoding. The addition unit 135 supplies the decoded image to the deblock filter 136 and the frame memory 141.

The deblock filter 136 performs the adaptive deblock filter processing on the image supplied from the addition unit 135, and supplies the resultant image to the adaptive offset filter 137.

The adaptive offset filter 137 performs the adaptive offset filter processing of the type indicated by the offset filter information per LCU on the image subjected to the adaptive deblock filter processing by use of the offset indicated by the offset filter information from the lossless decoding unit 132. The adaptive offset filter 137 supplies the image subjected to the adaptive offset filter processing to the adaptive loop filter 138.

The adaptive loop filter 138 performs the adaptive loop filter processing on the image supplied from the adaptive offset filter 137 per LCU by use of the filter coefficient supplied from the lossless decoding unit 132. The adaptive loop filter 138 supplies the resultant image to the frame memory 141 and the screen rearrangement buffer 139.

The screen rearrangement buffer 139 stores the image supplied from the adaptive loop filter 138 in units of frame. The screen rearrangement buffer 139 rearranges, in the original display order, the stored image in units of frame in the coding order, and supplies it to the D/A conversion unit 140.

The D/A conversion unit 140 D/A converts and outputs the image in units of frame supplied from the screen rearrangement buffer 139.

The frame memory 141 accumulates the image supplied from the adaptive loop filter 138 and the image supplied from the addition unit 135. The images adjacent to PU, among the images which are accumulated in the frame memory 141 and are not subjected to the filter processing, are supplied as surrounding images to the intra-prediction unit 143 via the switch 142. On the other hand, the images accumulated in the frame memory 141 and subjected to the filter processing are supplied as reference images to the motion compensation unit 144 via the switch 142.

The intra-prediction unit 143 performs the intra-prediction processing in the optimum intra-prediction mode indicated by the intra-prediction mode information supplied from the lossless decoding unit 132 by use of the surrounding images read from the frame memory 141 via the switch 142. The intra-prediction unit 143 supplies the resultant predictive image to the switch 145.

The motion compensation unit 144 reads the reference image specified by the reference image specification information supplied from the lossless decoding unit 132 from the frame memory 141 via the switch 142. The motion compensation unit 144 performs the motion compensation processing in the optimum inter-prediction mode indicated by the inter-prediction mode information supplied from the lossless decoding unit 132 by use of the motion vectors and the reference image supplied from the lossless decoding unit 132. The motion compensation unit 144 supplies the resultant predictive image to the switch 145.

When supplied with the intra-prediction mode information from the lossless decoding unit 132, the switch 145 supplies the predictive image supplied from the intra-prediction unit 143 to the addition unit 135. On the other hand, when supplied with the inter-prediction mode information from the lossless decoding unit 132, the switch 145 supplies the predictive image supplied from the motion compensation unit 144 to the addition unit 135.

The chrominance signal inverse quantization unit 146 is configured basically in the same way as the chrominance signal inverse quantization unit 51 in FIG. 9. The chrominance signal inverse quantization unit 146 receives deltaQP, $\Delta QP_C$ and ChromaQPOffset from the lossless decoding unit 132. The chrominance signal inverse quantization unit 146 calculates the predictive quantization parameter predQP from the quantization parameters of the adjacent CUs. The chrominance signal inverse quantization unit 146 reconstructs the luminance signal quantization parameter from deltaQP and predQP, and supplies the reconstructed luminance signal quantization parameter to the inverse quantization unit 133.

The chrominance signal inverse quantization unit 146 reconstructs the chrominance signal quantization parameter from the reconstructed luminance signal quantization parameter, $\Delta QP_C$, and ChromaQPOffset, and supplies the reconstructed chrominance signal quantization parameter to the inverse quantization unit 133.

(Description of Series of Processing in Decoding Device)

Figure 19:
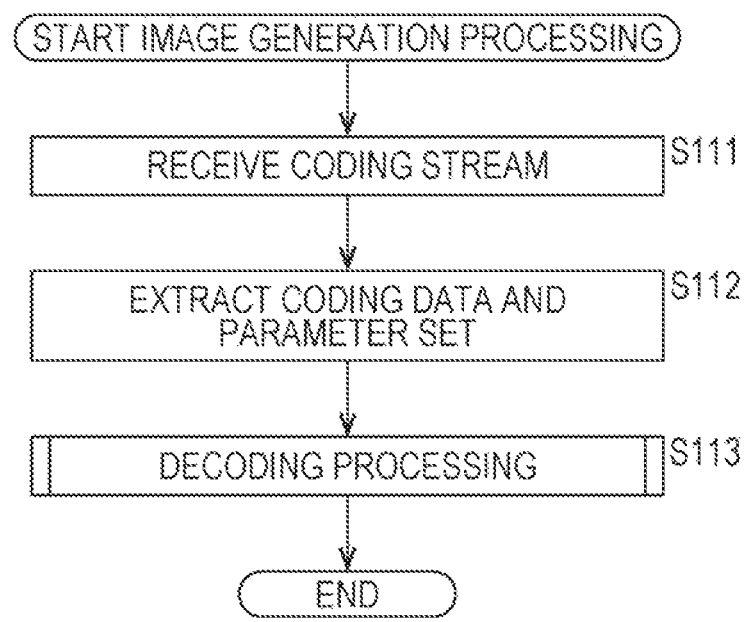
FIG. 19 is a flowchart for explaining an image generation processing of the decoding device of FIG. 17.

FIG. 19 is a flowchart for explaining an image generation processing in the decoding device 110 of FIG. 17.

In step S111 in FIG. 19, the reception unit 111 in the decoding device 110 receives the coding stream transmitted from the coding device 10 of FIG. 8, and supplies it to the extraction unit 112.

In step S112, the extraction unit 112 extracts the coding data and the parameter set from the coding stream supplied from the reception unit 111, and supplies them to the decoding unit 113.

In step S113, the decoding unit 113 performs the decoding processing of decoding the coding data supplied from the extraction unit 112 in a system conforming to the HEVC system by use of the parameter set supplied from the extraction unit 112 as needed. The decoding processing will be described below in detail with reference to FIG. 20. The processing then ends.

Figure 20:
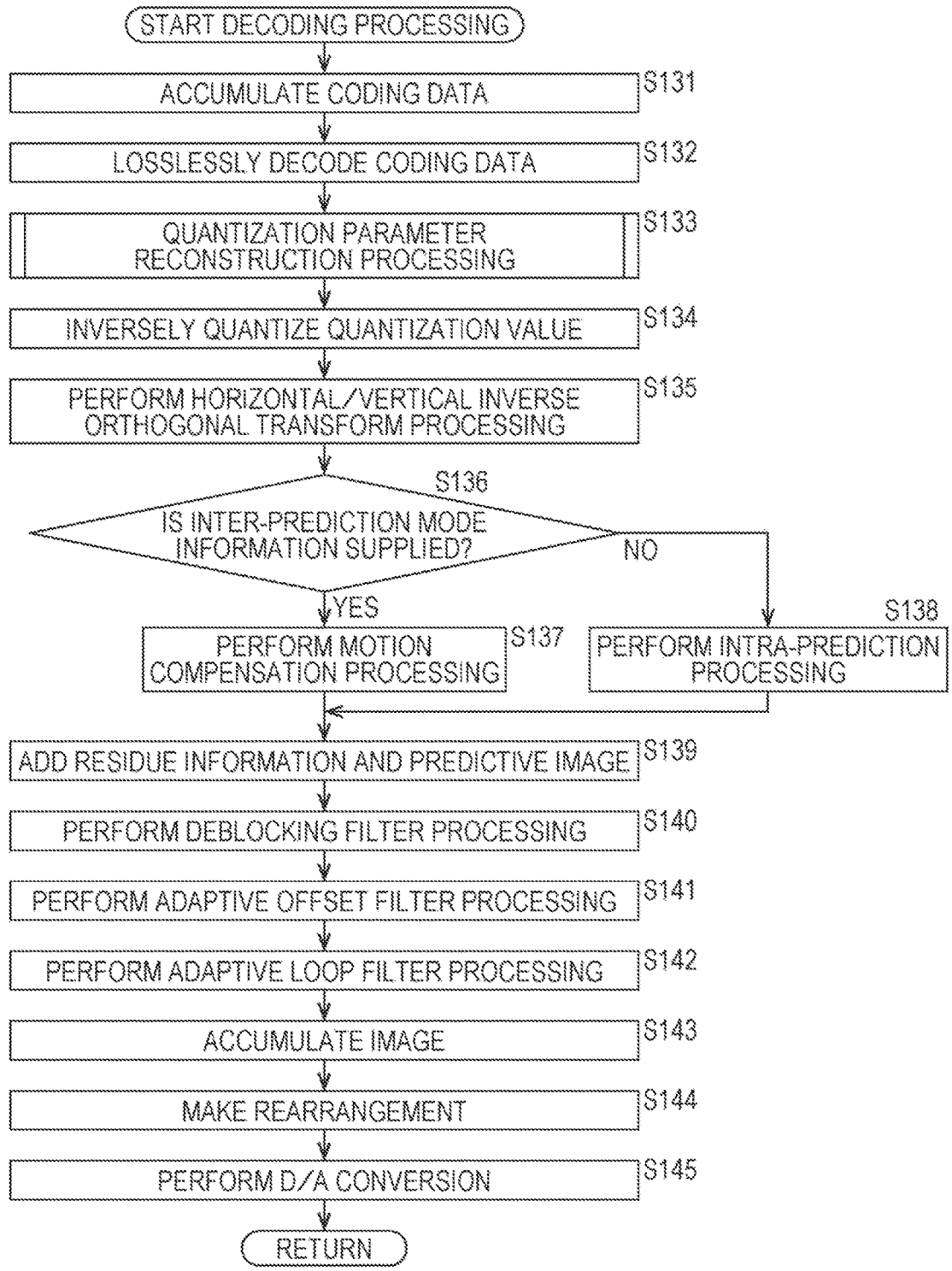
FIG. 20 is a flowchart for explaining a decoding processing of FIG. 19 in detail.

FIG. 20 is a flowchart for explaining the decoding processing in step S113 in FIG. 19 in detail.

In step S131 in FIG. 20, the accumulation buffer 131 (FIG. 18) in the decoding unit 113 receives and accumulates the coding data in units of frame from the extraction unit 112 in FIG. 17. The accumulation buffer 131 supplies the accumulated coding data to the lossless decoding unit 132.

In step S132, the lossless decoding unit 132 losslessly decodes the coding data from the accumulation buffer 131, and obtains the quantization value and the coding information. The lossless decoding unit 132 supplies the quantization value to the inverse quantization unit 133. The lossless decoding unit 132 supplies deltaQP, $\Delta QP_C$, and ChromaQPOffset as the coding information to the chrominance signal inverse quantization unit 146.

Further, the lossless decoding unit 132 supplies the intra-prediction mode information as the coding information to the intra-prediction unit 143. The lossless decoding unit 132 supplies the motion vectors, the inter-prediction mode information, the reference image specification information, and the like to the motion compensation unit 144.

Further, the lossless decoding unit 132 supplies the intra-prediction mode information or the inter-prediction mode information as the coding information to the switch 145. The lossless decoding unit 132 supplies the offset filter information as the coding information to the adaptive offset filter 137, and supplies the filter coefficient to the adaptive loop filter 138.

In step S133, the chrominance signal inverse quantization unit 146 performs the same quantization parameter reconstruction processing as in FIG. 16.

In the processing in step S133, the reconstructed luminance signal quantization parameter and chrominance signal quantization parameter are supplied to the inverse quantization unit 133.

In step S134, the inverse quantization unit 133 inversely quantizes the quantization value supplied from the lossless decoding unit 132 by use of the luminance signal quantization parameter and the chrominance signal quantization parameter from the chrominance signal inverse quantization unit 146. The inverse quantization unit 133 supplies the orthogonal transform processing result obtained as a result of the inverse quantization to the inverse orthogonal transform unit 134.

In step S135, the inverse orthogonal transform unit 134 performs the orthogonal transform processing on the orthogonal transform processing result from the inverse quantization unit 133.

In step S136, the motion compensation unit 144 determines whether the inter-prediction mode information is supplied from the lossless decoding unit 132. When it is determined in step S136 that the inter-prediction mode information is supplied, the processing proceeds to step S137.

In step S137, the motion compensation unit 144 reads the reference image based on the reference image specification information supplied from the lossless decoding unit 132, and performs the motion compensation processing in the optimum inter-prediction mode indicated by the inter-prediction mode information by use of the motion vectors and the reference image. The motion compensation unit 144 supplies the resultant predictive image to the addition unit 135 via the switch 145, and the processing proceeds to step S139.

On the other hand, when it is determined in step S136 that the inter-prediction mode information is not supplied, or when the intra-prediction mode information is supplied to the intra-prediction unit 143, the processing proceeds to step S138.

In step S138, the intra-prediction unit 143 performs the intra-prediction processing in the intra-prediction mode indicated by the intra-prediction mode information by use of the surrounding images read from the frame memory 141 via the switch 142. The intra-prediction unit 143 supplies the predictive image generated as a result of the intra-prediction processing to the addition unit 135 via the switch 145, and the processing proceeds to step S139.

In step S139, the addition unit 135 adds the residue information supplied from the inverse orthogonal transform unit 134 and the predictive image supplied from the switch 145 thereby to perform decoding. The addition unit 135 supplies the decoded image to the deblock filter 136 and the frame memory 141.

In step S140, the deblock filter 136 performs the deblocking filter processing on the image supplied from the addition unit 135 thereby to remove a block distortion. The deblock filter 136 supplies the resultant image to the adaptive offset filter 137.

In step S141, the adaptive offset filter 137 performs the adaptive offset filter processing on the image subjected to the deblock filter processing by the deblock filter 136 per LCU based on the offset filter information supplied from the lossless decoding unit 132. The adaptive offset filter 137 supplies the image subjected to the adaptive offset filter processing to the adaptive loop filter 138.

In step S142, the adaptive loop filter 138 performs the adaptive loop filter processing on the image supplied from the adaptive offset filter 137 per LCU by use of the filter coefficient supplied from the lossless decoding unit 132. The adaptive loop filter 138 supplies the resultant image to the frame memory 141 and the screen rearrangement buffer 139.

In step S143, the frame memory 141 accumulates the image supplied from the addition unit 135 and the image supplied from the adaptive loop filter 138. The images adjacent to PU, among the images which are accumulated in the frame memory 141 and are not subjected to the filter processing, are supplied as surrounding images to the intra-prediction unit 143 via the switch 142. On the other hand, the images accumulated in the frame memory 141 and subjected to the filter processing are supplied as reference images to the motion compensation unit 144 via the switch 142.

In step S144, the screen rearrangement buffer 139 stores the image supplied from the adaptive loop filter 138 in units of frame, and rearranges, in the original display order, the stored image in units of frame in the coding order, and supplies it to the D/A conversion unit 140.

In step S145, the D/A conversion unit 140 D/A converts and outputs the image in units of frame supplied from the screen rearrangement buffer 139. The processing then returns to step S113 in FIG. 19, and ends.

As described above, ΔQPC is sent to the decoding side at the same time with deltaQP, and thus the code amount of the chrominance signal in an image can be controlled also in the decoding device 110. In particular, even when a signal with wide color gamut is input, rate controllability for chrominance signal can be enhanced.

As described above, the coding system employs a system conforming to HEVC. The present technique is not limited thereto, and can apply other coding system/decoding system.

The present disclosure can be applied to an image coding device and an image decoding device used for receiving image information (bit stream) compressed by orthogonal transform such as discrete cosine transform and motion compensation via a network medium such as satellite broadcasting, cable TV, Internet, or cell phone as in the HEVC system. Further, the present disclosure can be applied to an image coding device and an image decoding device used for the series of processing in a storage medium such as optical disk, magnetic disk and flash memory.

<Second Exemplary Embodiment>
(Description of Computer to which the Present Disclosure is Applied)

The above series of processing can be realized in hardware or realized in software. When the series of processing are realized in software, a program configuring the software is installed in the computer. Herein, the computer may be a computer incorporated in dedicated hardware, or a general-purpose personal computer capable of executing various functions by installing various programs.

Figure 21:
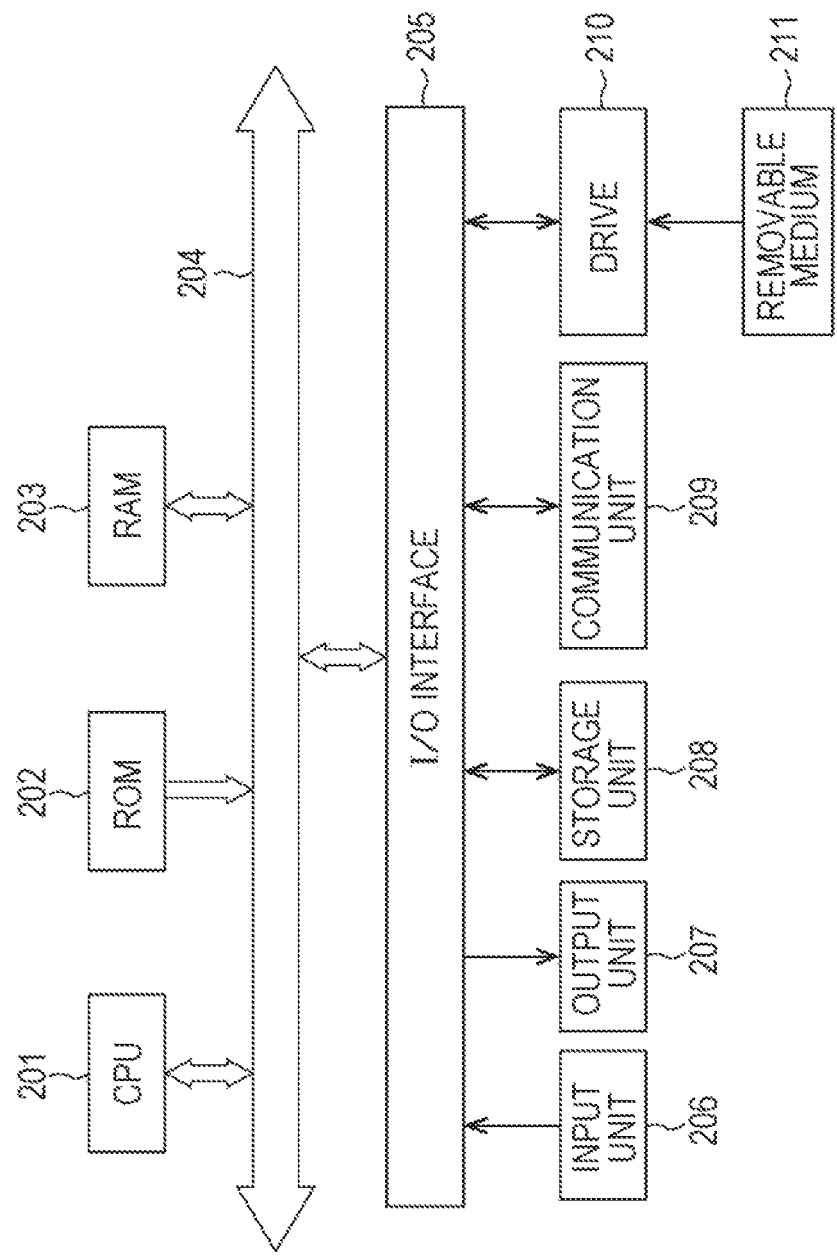
FIG. 21 is a block diagram illustrating an exemplary hardware structure of a computer.

FIG. 21 is a block diagram illustrating an exemplary hardware structure of a computer for performing the series of processing by a program.

In the computer, central processing unit (CPU) 201, read only memory (ROM) 202, and random access memory (RAM) 203 are mutually connected via a bus 204.

An I/O interface 205 is further connected to the bus 204. An input unit 206, an output unit 207, a storage unit 208, a communication unit 209, and a drive 210 are connected to the I/O interface 205.

The input unit 206 is configured of keyboard, mouse, microphone, or the like. The output unit 207 is configured of display, speaker, or the like. The storage unit 208 is configured of a hard disk, a nonvolatile memory, or the like. The communication unit 209 is configured of a network interface or the like. The drive 210 drives a removable medium 211 such as magnetic disk, optical disk, magnetooptical disk, or semiconductor memory.

In the thus-configured computer, the CPU 201 loads and executes the program stored in the storage unit 208 into the RAM 203 via the I/O interface 205 and the bus 204 so that the series of processing are performed.

The program executed by the computer (the CPU 201) can be recorded in the removable medium 211 such as package medium to be provided. Further, the program can be provided via a wired or wireless transmission medium such as local area network, Internet, or digital satellite broadcasting.

In the computer, the removable medium 211 is mounted on the drive 210 so that the program can be installed in the storage unit 208 via the I/O interface 205. Further, the program can be received by the communication unit 209 and installed in the storage unit 208 via a wired or wireless transmission medium. Additionally, the program can be previously installed in the ROM 202 or the storage unit 208.

The program executed by the computer may be a program in which the series of processing are performed in time series in the order described in the present specification, or a program in which the series of processing are performed in parallel or at required timings such as calling.

<Third Exemplary Embodiment>
(Application to Multi-View Image Coding and Multi-View Image Decoding)

Figure 22:
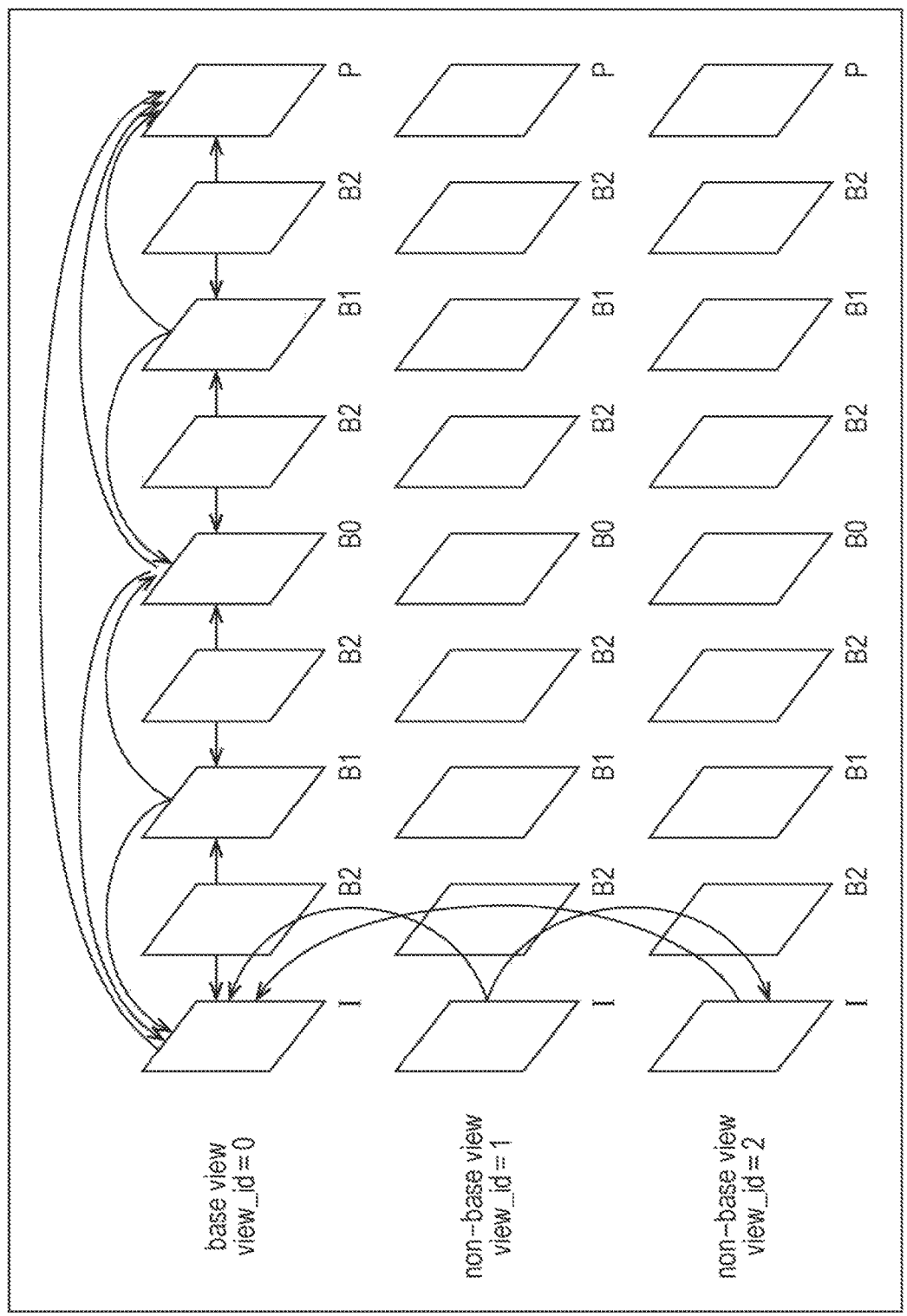
FIG. 22 is a diagram illustrating an exemplary multi-view image coding system.

The series of processing can be applied to multi-view image coding and multi-view image decoding. FIG. 22 illustrates a multi-view image coding system by way of example.

As illustrated in FIG. 22, a multi-view image includes an image with a plurality of views. The views in the multi-view image are made of a base view for coding and decoding by use of not the image of other view but only the image of its own view and a non-base view for coding and decoding by use of the image of other view. The non-base view may use the image of a base view or may use the image of other non-base view.

When a multi-view image as illustrated in FIG. 22 is to be coded or decoded, the image of each view is coded and decoded, but the method according to the first exemplary embodiment may be applied to code or decode each view. By doing so, the code amount of the chrominance signal in an image can be controlled. In particular, when a signal with wide color gamut is input, rate controllability for chrominance signal can be enhanced.

Further, the parameters used in the method according to the first exemplary embodiment may be shared for coding and decoding each view. More specifically, for example, the coding information such as deltaQP, ΔQPC, and ChromaQPOffset may be shared for coding and decoding each view. Of course, other necessary information may be shared for coding and decoding each view.

By doing so, it is possible to prevent redundant information from being transmitted and to reduce the amount of information to be transmitted (the code amount) (or it is possible to prevent a reduction in coding efficiency).

(Multi-View Image Coding Device)

Figure 23:
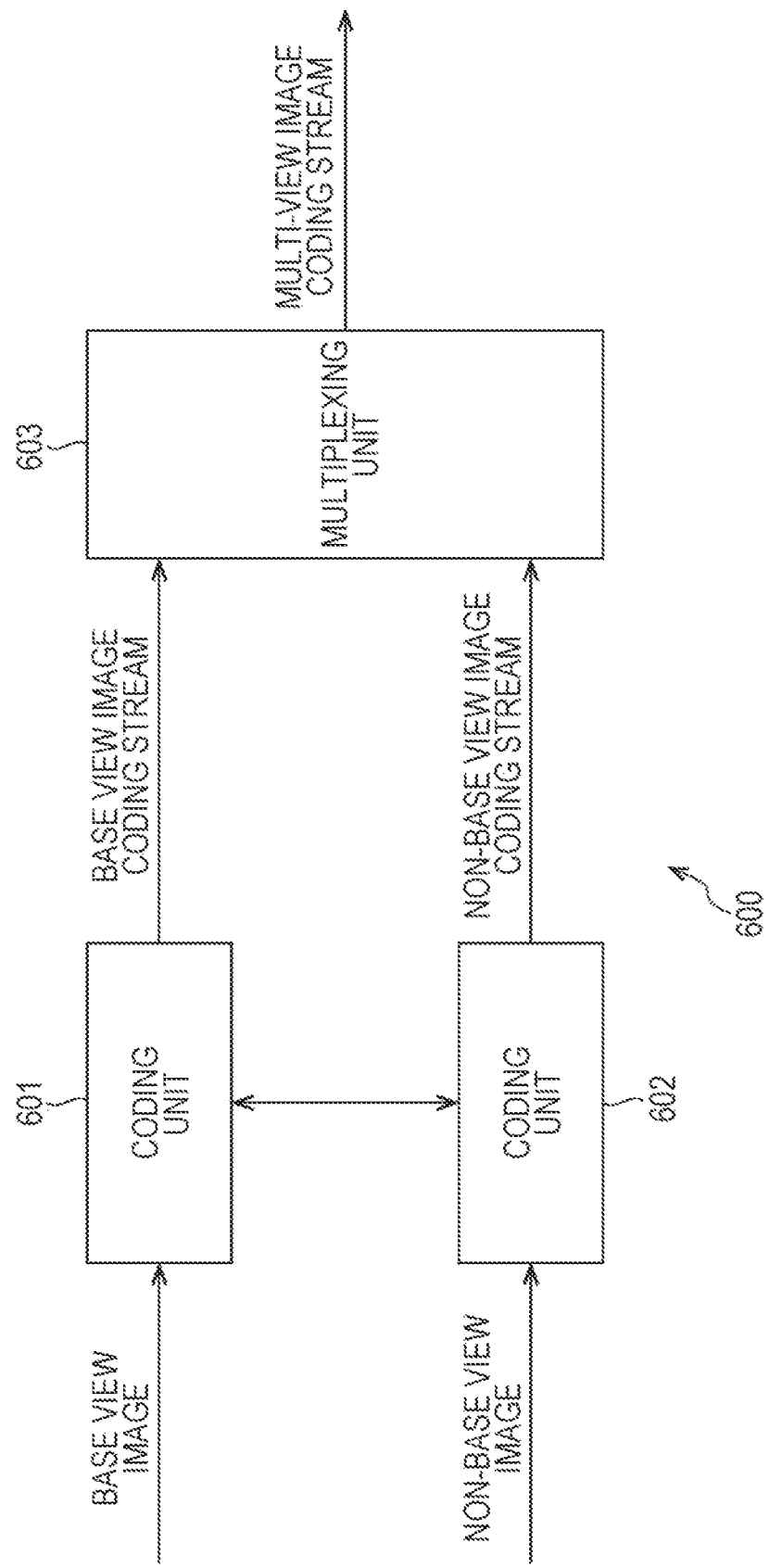
FIG. 23 is a diagram illustrating an exemplary structure of a multi-view image coding device to which the present disclosure is applied.

FIG. 23 is a diagram illustrating a multi-view image coding device for performing the multi-view image coding. As illustrated in FIG. 23, a multi-view image coding device 600 has a coding unit 601, a coding unit 602, and a multiplexing unit 603.

The coding unit 601 codes a base view image thereby to generate a base view image coding stream. The coding unit 602 codes a non-base view image thereby to generate a non-base view image coding stream. The multiplexing unit 603 multiplexes the base view image coding stream generated by the coding unit 601 and the non-base view image coding stream generated by the coding unit 602 thereby to generate a multi-view image coding stream.

The coding device 10 (FIG. 8) can be applied to the coding unit 601 and the coding unit 602 in the multi-view image coding device 600. That is, the code amount of the chrominance signal in an image can be controlled for coding each view. In particular, when a signal with wide color gamut is input, rate controllability for chrominance signal can be enhanced. Further, the coding unit 601 and the coding unit 602 can perform coding by use of the same flags or parameters (such as syntax elements for inter-image processing) (that is, can share the flags or parameters), thereby preventing a reduction in coding efficiency.

(Multi-View Image Decoding Device)

Figure 24:
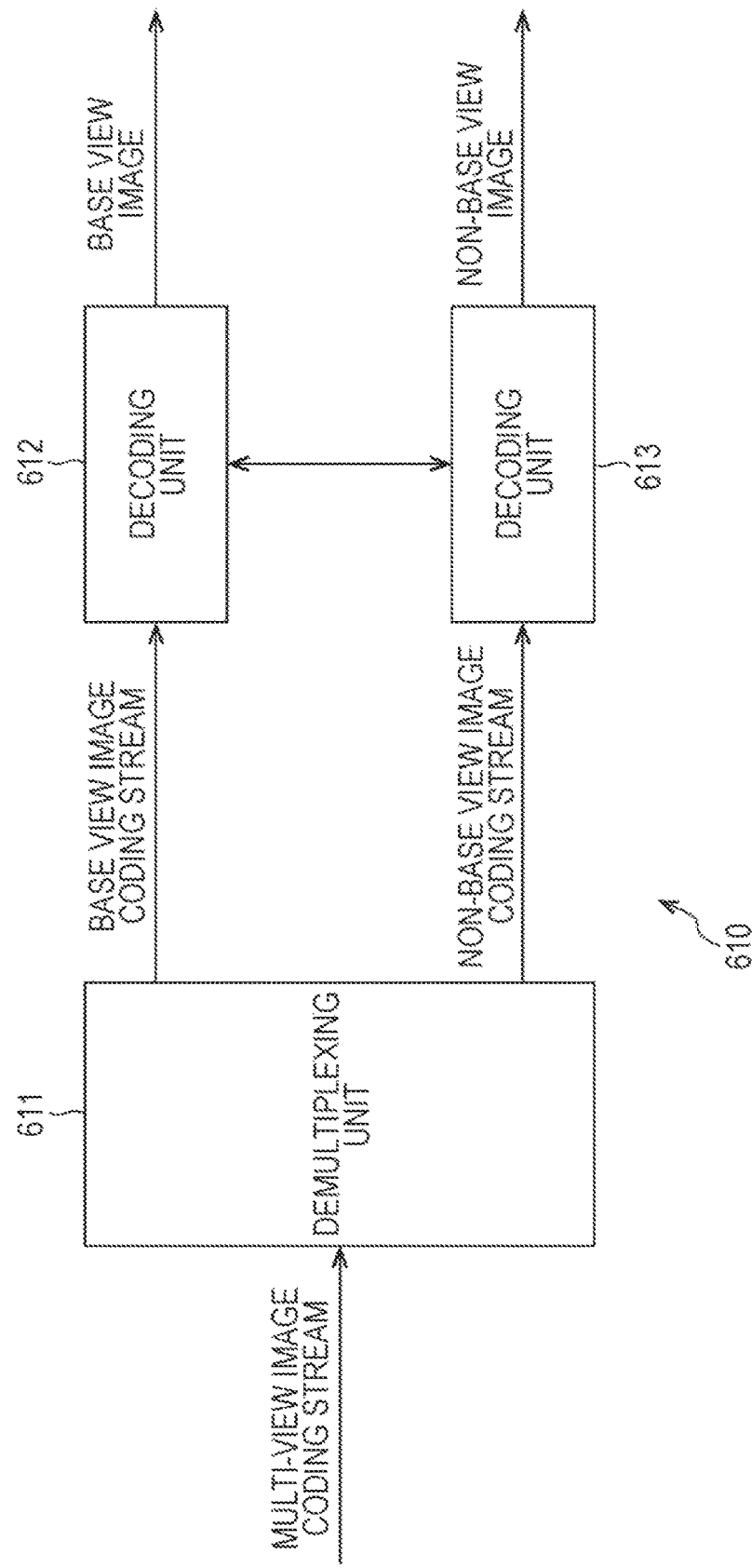
FIG. 24 is a diagram illustrating an exemplary structure of a multi-view image decoding device to which the present disclosure is applied.

FIG. 24 is a diagram illustrating a multi-view image decoding device for performing the multi-view image decoding. As illustrated in FIG. 24, a multi-view image decoding device 610 has a demultiplexing unit 611, a decoding unit 612, and a decoding unit 613.

The demultiplexing unit 611 demultiplexes the multi-view image coding stream in which the base view image coding stream and the non-base view image coding stream are multiplexed thereby to extract the base view image coding stream and the non-base view image coding stream. The decoding unit 612 decodes the base view image coding stream extracted by the demultiplexing unit 611 thereby to obtain the base view image. The decoding unit 613 decodes the non-base view image coding stream extracted by the demultiplexing unit 611 to obtain the non-base view image.

The decoding device 110 (FIG. 17) can be applied to the decoding unit 612 and the decoding unit 613 in the multi-view image decoding device 610. That is, the code amount of the chrominance signal in an image can be controlled for decoding each view. In particular, when a signal with wide color gamut is input, rate controllability for chrominance signal is enhanced thereby to decode a coding stream with enhanced coding efficiency. Further, the decoding unit 612 and the decoding unit 613 can perform decoding by use of the same flags or parameters (such as syntax elements for inter-image processing) (or can share the flags or parameters), thereby preventing a reduction in coding efficiency.

<Fourth Exemplary Embodiment>

(Application to Hierarchy Image Coding and Hierarchy Image Decoding)

Figure 25:
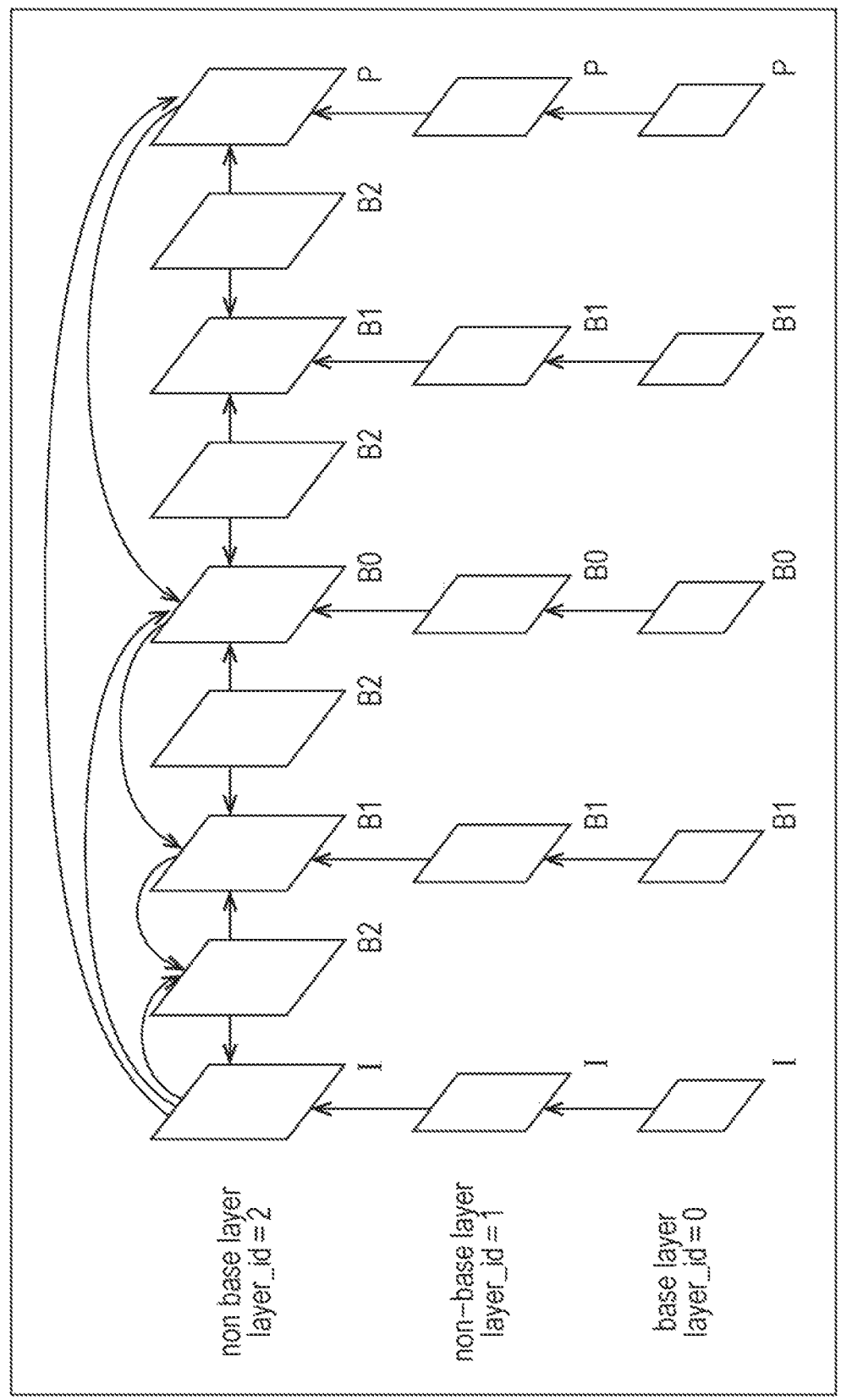
FIG. 25 is a diagram illustrating an exemplary hierarchy image coding system.

The series of processing can be applied for hierarchy image coding and hierarchy image decoding (scalable coding and scalable decoding). FIG. 25 illustrates a hierarchy image coding system by way of example.

The hierarchy image coding (scalable coding) is directed for making image data into a plurality of layers (hierarchies) of images and coding each layer in order to have a scalable function for predetermined parameters. The hierarchy image decoding (scalable decoding) corresponds to the hierarchy image coding.

As illustrated in FIG. 25, for hierarchized image, one image is divided into a plurality of images (layers) with reference to a predetermined parameter having the scalable function. That is, a hierarchized image includes a plurality of hierarchies (layers) of images having mutually-different values of the predetermined parameter. The layers of the hierarchized images are made of a base layer for coding and decoding by use of not the images of other layers but only the image of its own layer and a non-base layer (also called enhancement layer) for coding and decoding by use of the image of other layer. The non-base layer may use the image of a base layer or may use the image of other non-base layer.

Generally, the non-base layer is configured of differential image data (differential data) between its own image and the image of other layer in order to reduce redundancy. For example, when one image is made into two hierarchies of base layer and non-base layer (also called enhancement layer), a lower-quality image than the original image is obtained by only the base layer data, and the original image (or higher-quality image) is obtained by combining the base layer data and the non-base layer data.

The image is made into hierarchies in this way thereby to easily obtain images with various quality depending on a situation. Image compression information of only the base layer is transmitted and animation with low spatiotemporal resolution or low image quality is reproduced for terminals with low processing capability such as cell phone, and image compression information of the base layer and the enhancement layer is transmitted and animation with high spatiotemporal resolution or high image quality is reproduced for terminals with high processing capability such as TV or personal computer so that the image compression information depending on the capability of a terminal or network can be transmitted from a server without the transcode processing.

When a hierarchy image as illustrated in the example of FIG. 25 is coded or decoded, the image of each layer is coded or decoded, and the method according to the first exemplary embodiment may be applied for coding and decoding each layer. By doing so, the code amount of the chrominance signal in an image can be controlled. In particular, when a signal with wide color gamut is input, rate controllability for chrominance signal can be enhanced.

Further, the flags or parameters used in the method according to the first exemplary embodiment may be shared for coding and decoding each layer. More specifically, the coding information such as deltaQP, ΔQPC, and ChromaQPOffset may be shared for coding and decoding each layer. Of course, other necessary information may be shared for coding and decoding each layer.

By doing so, it is possible to prevent redundant information from being transmitted and to reduce the amount of information to be transmitted (the code amount) (or it is possible to prevent a reduction in coding efficiency).

(Scalable Parameters)

Figure 26:
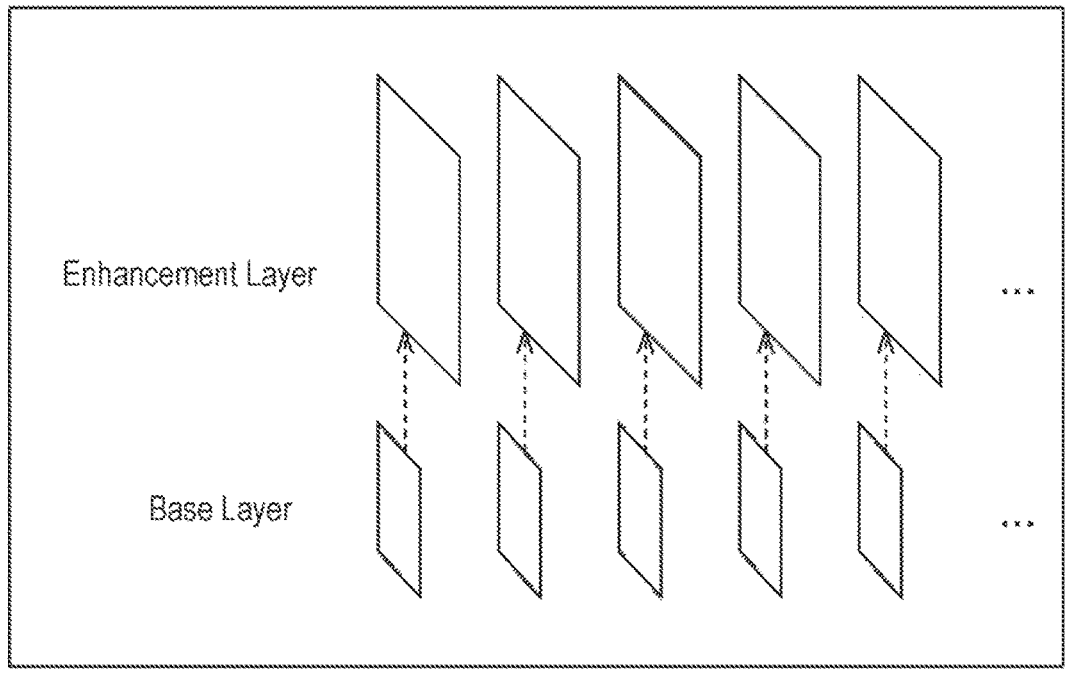
FIG. 26 is a diagram for explaining spatial scalable coding by way of example.

A parameter having the scalable function is optional for the hierarchy image coding and the hierarchy image decoding (the scalable coding and the scalable decoding). For example, a spatial resolution as illustrated in FIG. 26 may be assumed as a parameter (spatial scalability). In the case of the spatial scalability, the resolution of an image is different per layer. That is, in this case, as illustrated in FIG. 26, each picture is made into two hierarchies of the base layer with spatially lower resolution than the original image and the enhancement layer with the original spatial resolution in combination with the base layer. Of course, the number of hierarchies is exemplary, and any number of hierarchies may be possible.

Figure 27:
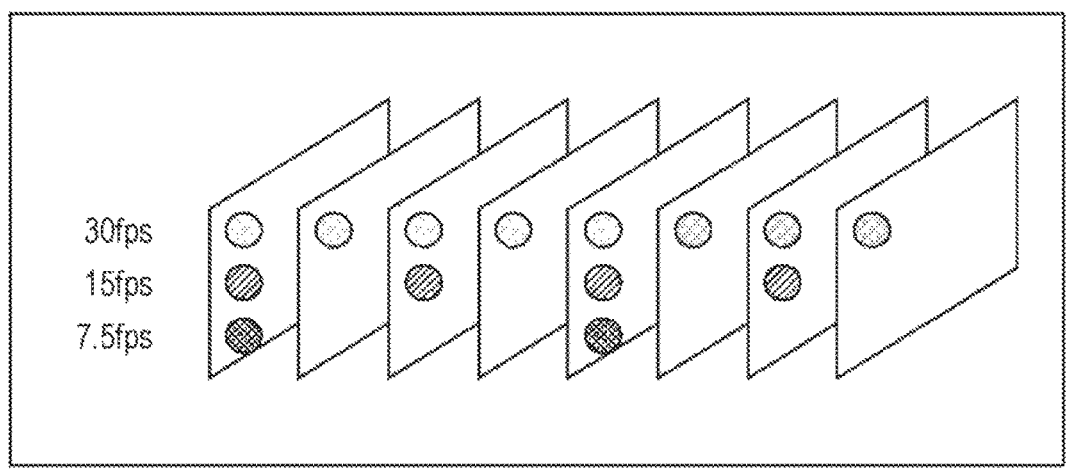
FIG. 27 is a diagram for explaining temporal scalable coding by way of example.

A temporal resolution as illustrated in FIG. 27, for example, may be applied (temporal scalability) as a parameter with the scalability. In the case of the temporal scalability, the frame rate is different per layer. That is, in this case, as illustrated in FIG. 27, each picture is made into two hierarchies of the base layer with a lower frame rate than the original animation and the enhancement layer with the original frame rate in combination with the base layer. Of course, the number of hierarchies is exemplary, and any number of hierarchies may be possible.

Figure 28:
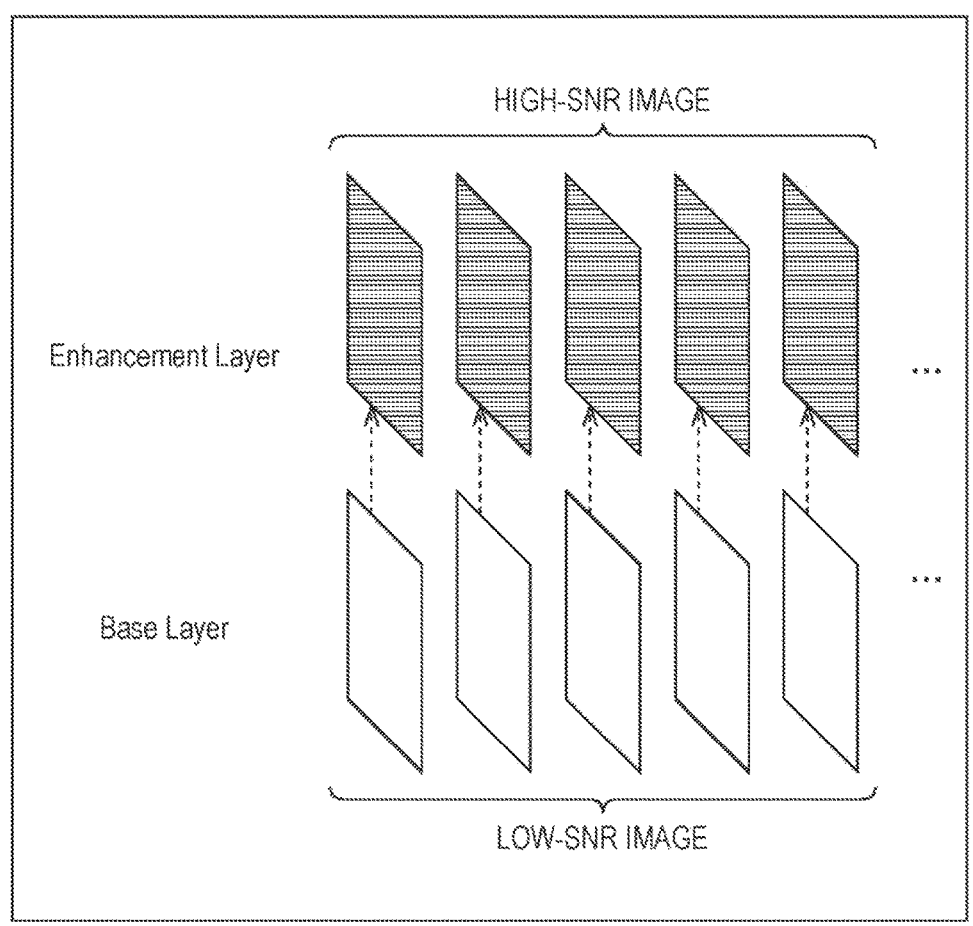
FIG. 28 is a diagram for explaining signal-to-noise ratio scalable coding by way of example.

Further, signal to noise ratio (SNR) may be applied (SNR scalability), for example, as a parameter with the scalability. In the case of the SNR scalability, the SN ratio is different per layer. That is, in this case, as illustrated in FIG. 28, each picture is made into two hierarchies of the base layer with a lower SNR than the original image and the enhancement layer with the original SNR in combination with the base layer. Of course, the number of hierarchies is exemplary, and any number of hierarchies may be possible.

Parameters with the scalability other than the above examples may be possible. For example, a bit depth can be employed (bit-depth scalability), for example, as a parameter with the scalability. In the case of the bit-depth scalability, the bit depth is different per layer. In this case, for example, the base layer is made of an 8-bit image, and is added with the enhancement layer to be a 10-bit image.

A chroma format may be employed (chroma scalability) as a parameter with the scalability. In the case of the chroma scalability, the chroma format is different per layer. In this case, for example, the base layer is made of a component image with the 4:2:0 format, and is added with the enhancement layer to be a component image with the 4:2:2 format.

(Hierarchy Image Coding Device)

Figure 29:
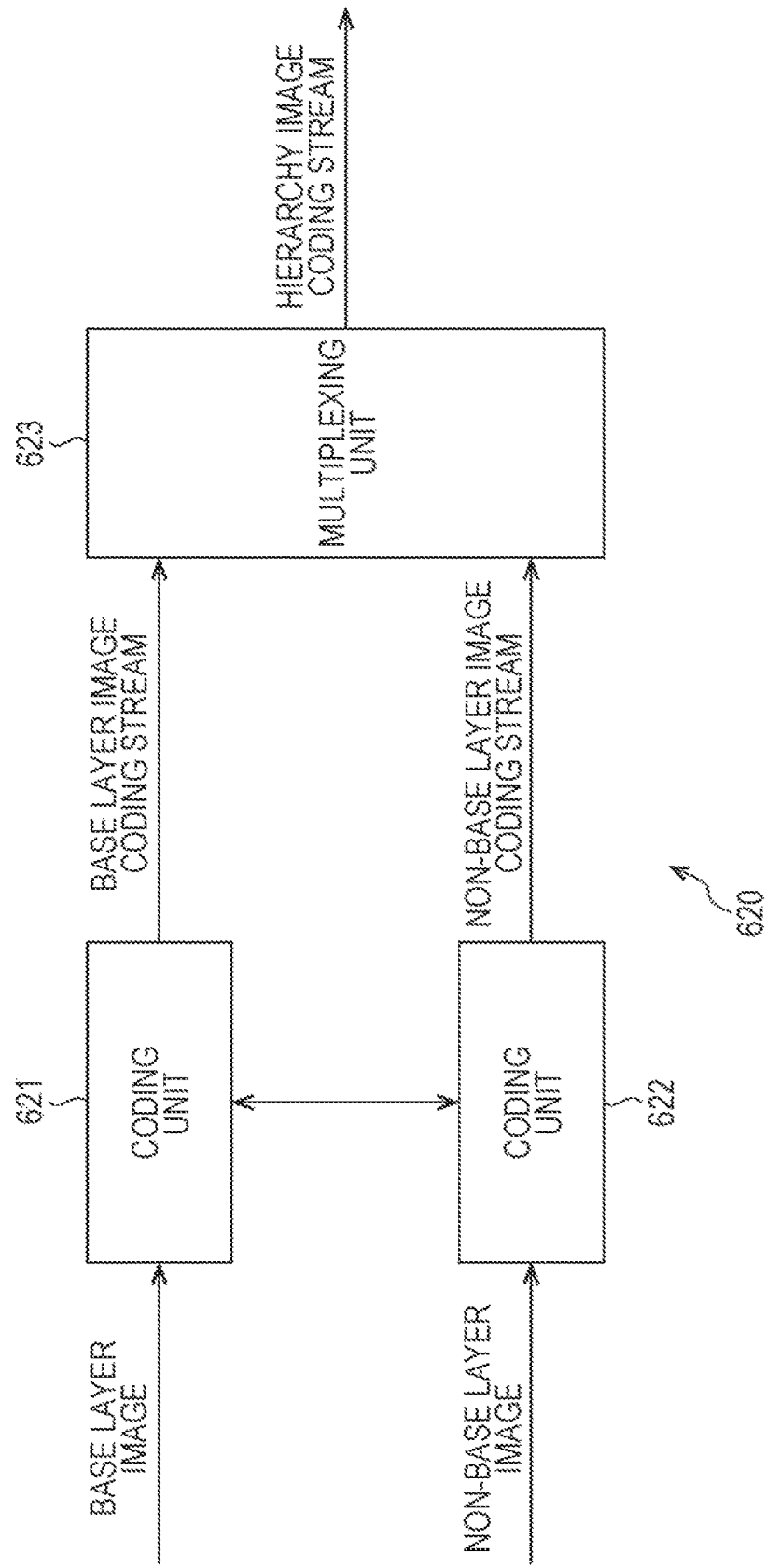
FIG. 29 is a diagram illustrating an exemplary structure of a hierarchy image coding device to which the present disclosure is applied.

FIG. 29 is a diagram illustrating a hierarchy image coding device for performing the hierarchy image coding. As illustrated in FIG. 29, a hierarchy image coding device 620 has a coding unit 621, a coding unit 622, and a multiplexing unit 623.

The coding unit 621 codes a base layer image thereby to generate a base layer image coding stream. The coding unit 622 codes a non-base layer image thereby to generate a non-base layer image coding stream. The multiplexing unit 623 multiplexes the base layer image coding stream generated by the coding unit 621 and the non-base layer image coding stream generated by the coding unit 622 thereby to generate a hierarchy image coding stream.

The coding device 10 (FIG. 8) can be applied to the coding unit 621 and the coding unit 622 in the hierarchy image coding device 620. That is, the code amount of the chrominance signal in an image can be controlled for coding each layer. In particular, when a signal with wide color gamut is input, rate controllability for chrominance signal can be enhanced. Further, the coding unit 621 and the coding unit 622 can control the intra-prediction filter processing by use of the same flags or parameters (such as syntax elements for inter-image processing) (or can share the flags or parameters), thereby preventing a reduction in coding efficiency.

(Hierarchy Image Decoding Device)

Figure 30:
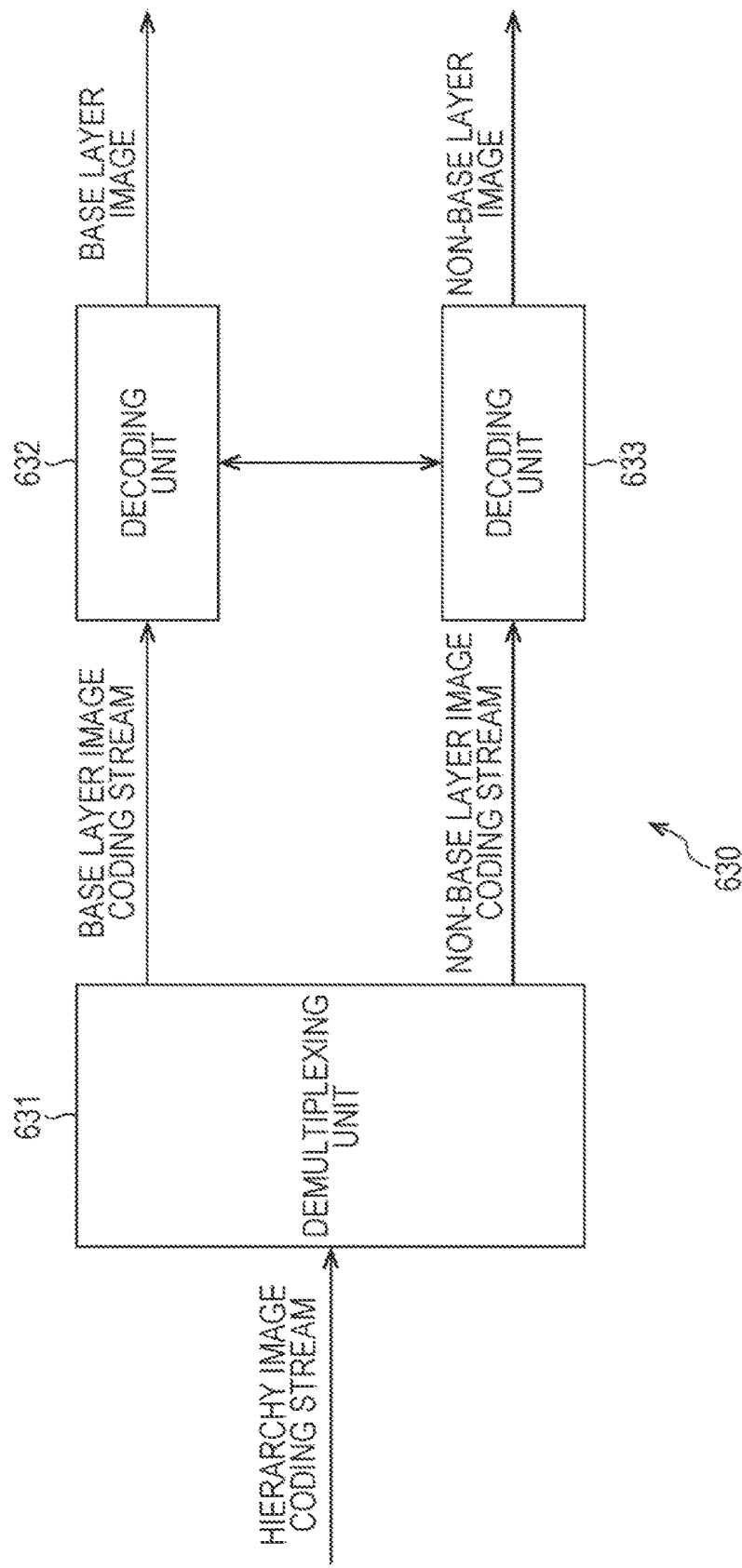
FIG. 30 is a diagram illustrating an exemplary structure of a hierarchy image decoding device to which the present disclosure is applied.

FIG. 30 is a diagram illustrating a hierarchy image decoding device for performing the hierarchy image decoding. As illustrated in FIG. 30, a hierarchy image decoding device 630 has a demultiplexing unit 631, a decoding unit 632, and a decoding unit 633.

The demultiplexing unit 631 demultiplexes the hierarchy image coding stream in which the base layer image coding stream and the non-base layer image coding stream are multiplexed thereby to extract the base layer image coding stream and the non-base layer image coding stream. The decoding unit 632 decodes the base layer image coding stream extracted by the demultiplexing unit 631 thereby to obtain the base layer image. The decoding unit 633 decodes the non-base layer image coding stream extracted by the demultiplexing unit 631 thereby to obtain the non-base layer image.

The decoding device 110 (FIG. 17) can be applied to the decoding unit 632 and the decoding unit 633 in the hierarchy image decoding device 630. That is, the code amount of the chrominance signal in an image can be controlled for decoding each layer. When a signal with wide color gamut is input, rate controllability for chrominance signal is enhanced thereby to decode a coding stream with enhanced coding efficiency. Further, the decoding unit 612 and the decoding unit 613 can perform decoding by use of the same flags or parameters (such as syntax elements for inter-image processing) (or can share the flags or parameters), thereby preventing a reduction in coding efficiency.

>Fifth Exemplary Embodiment>

(Exemplary Structure of TV Set)

Figure 31:
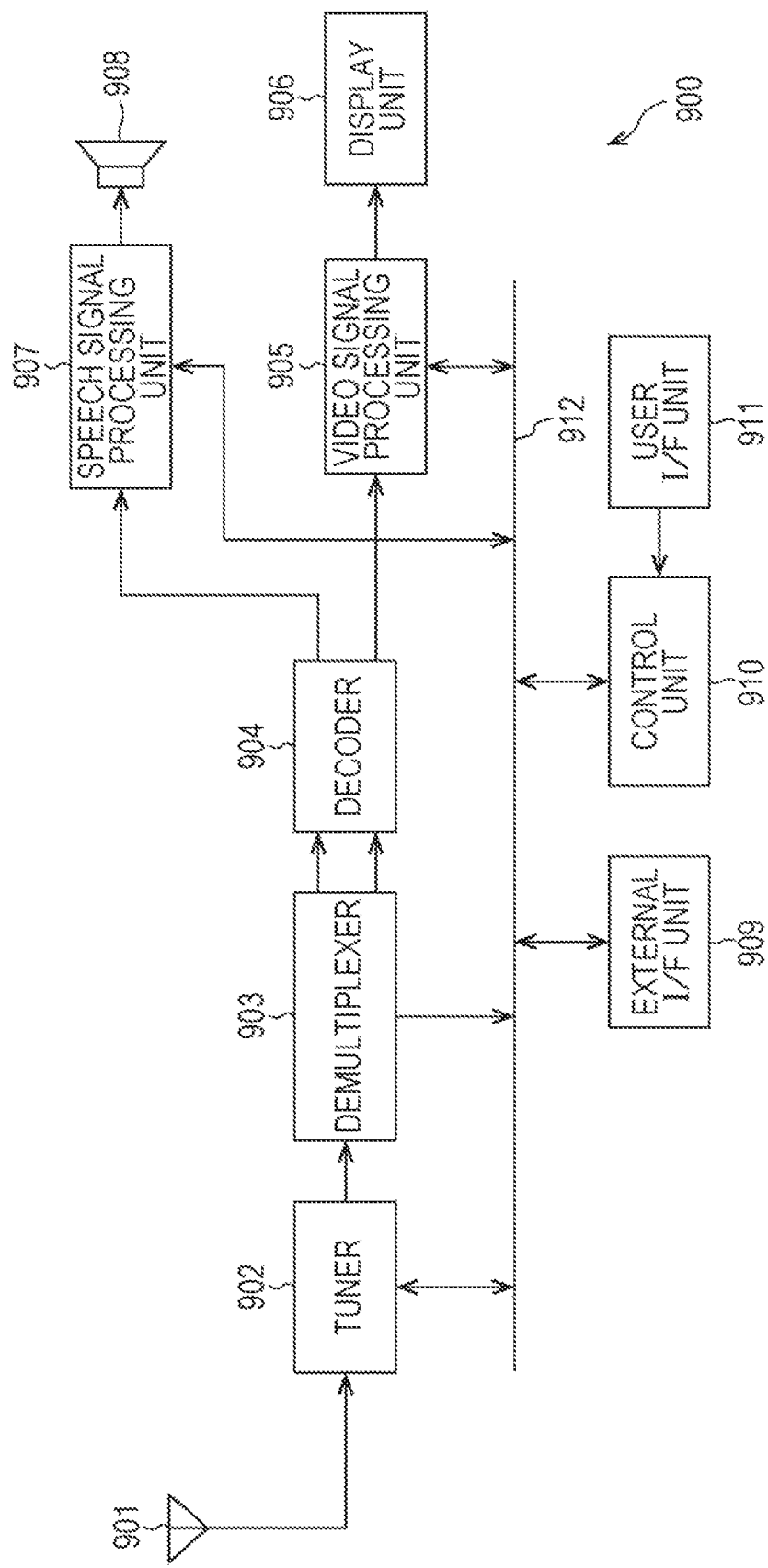
FIG. 31 is a diagram illustrating an exemplary schematic structure of a TV set to which the present disclosure is applied.

FIG. 31 illustrates an exemplary schematic structure of a TV set to which the present disclosure is applied. A TV set 900 has an antenna 901, a tuner 902, a demultiplexer 903, a decoder 904, a video signal processing unit 905, a display unit 906, a speech signal processing unit 907, a speaker 908, and an external interface unit 909. The TV set 900 further has a control unit 910, and a user interface unit 911.

The tuner 902 selects and demodulates a desired channel based on a broadcasting signal received by the antenna 901, and outputs the resultant coding bit stream to the demultiplexer 903.

The demultiplexer 903 extracts the packets of video or speech of a program to be viewed from the coding bit stream and outputs the extracted packet data to the decoder 904. Further, the demultiplexer 903 supplies the packets of the data such as electronic program guide (EPG) to the control unit 910. While scrambling is performed, descrambling is performed by the demultiplexer or the like.

The decoder 904 performs a packet decoding processing, and outputs the video data generated by the decoding processing to the video signal processing unit 905, and the speech data to the speech signal processing unit 907.

The video signal processing unit 905 performs a video processing or the like on the video data depending on noise removal or user setting. The video signal processing unit 905 generates the video data of a program to be displayed by the display unit 906, or image data by the processing based on an application supplied via a network. Further, the video signal processing unit 905 generates the video data for displaying a menu screen or the like for item selection, and superimposes it on the video data of the program. The video signal processing unit 905 generates a drive signal based on the thus-generated video data thereby to drive the display unit 906.

The display unit 906 drives a display device (such as liquid crystal display device) based on the drive signal from the video signal processing unit 905 thereby to display the video of the program.

The speech signal processing unit 907 performs a predetermined processing such as noise removal on the speech data, performs a D/A conversion processing or amplification processing on the processed speech data to be supplied to the speaker 908, thereby performing speech output.

The external interface unit 909 is an interface for connecting to an external device or network, and exchanges data such as video data or speech data.

The user interface unit 911 is connected to the control unit 910. The user interface unit 911 is configured of an operation switch, a remote control signal reception unit, or the like, and supplies an operation signal in response to a user operation to the control unit 910.

The control unit 910 is configured of central processing unit (CPU), a memory, or the like. The memory stores therein the programs executed by the CPU, various items of data required for the series of processing of the CPU, EPG data, data obtained via a network, and the like. The program stored in the memory is read and executed by the CPU at a predetermined timing such as startup of the TV set 900. The CPU executes the program so that the TV set 900 controls each unit to operate in response to a user operation.

The TV set 900 is provided with a bus 912 for connecting the tuner 902, the demultiplexer 903, the video signal processing unit 905, the speech signal processing unit 907, the external interface unit 909, and the like to the control unit 910.

In the thus-configured TV set, the decoder 904 is provided with the functions of the decoding device (decoding method) according to the present application. Thus, the code amount of the chrominance signal in an image can be controlled in the coding stream decoding processing. In particular, when a signal with wide color gamut is input, rate controllability for chrominance signal can be enhanced.

<Sixth Exemplary Embodiment>
(Exemplary Structure of Cell Phone)

Figure 32:
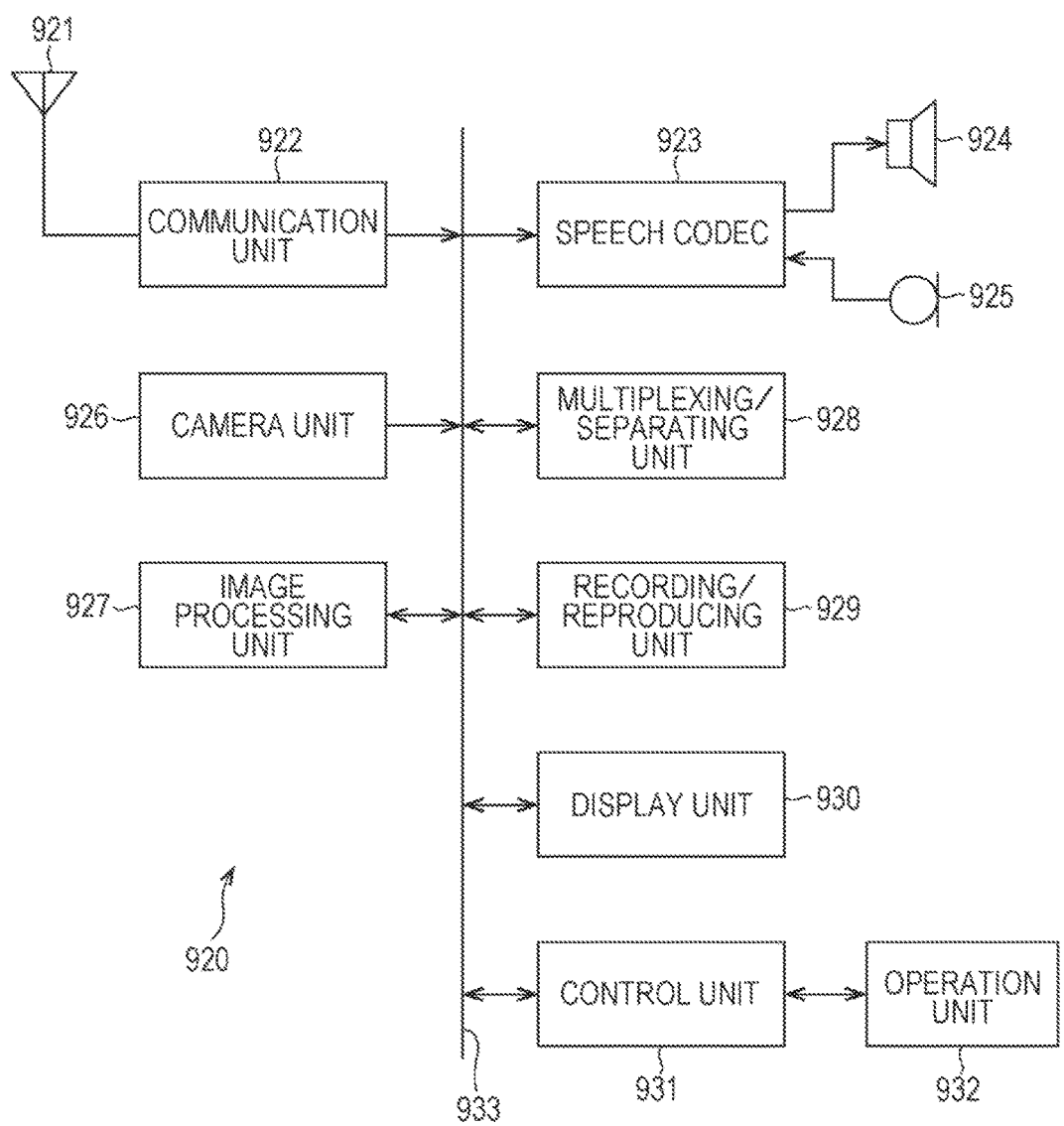
FIG. 32 is a diagram illustrating an exemplary schematic structure of a cell phone to which the present disclosure is applied.

FIG. 32 illustrates an exemplary schematic structure of a cell phone to which the present disclosure is applied. A cell phone 920 has a communication unit 922, a speech codec 923, a camera unit 926, an image processing unit 927, a multiplexing/separating unit 928, a recording/reproducing unit 929, a display unit 930, and a control unit 931. These are mutually connected via a bus 933.

Further, an antenna 921 is connected to the communication unit 922, and a speaker 924 and a microphone 925 are connected to the speech codec 923. Further, an operation unit 932 is connected to the control unit 931.

The cell phone 920 performs various operations such as exchanging speech signals, exchanging e-mails or image data, shooting images, or recording data in various modes such as speech call mode and data communication mode.

In the speech call mode, a speech signal generated by the microphone 925 is converted into speech data by the speech codec 923 or subjected to data compression to be supplied to the communication unit 922. The communication unit 922 performs a modulation processing or a frequency conversion processing on the speech data thereby to generate a transmission signal. Further, the communication unit 922 supplies the transmission signal to the antenna 921 to be transmitted to a base station (not illustrated). Further, the communication unit 922 amplifies the reception signal received by the antenna 921 or performs the frequency conversion processing and a demodulation processing thereon thereby to supply the resultant speech data to the speech codec 923. The speech codec 923 extends the speech data or converts it into an analog speech signal to be output to the speaker 924.

Further, when an e-mail is transmitted in the data communication mode, the control unit 931 receives character data input by an operation of the operation unit 932, and displays the input characters on the display unit 930. Further, the control unit 931 generates e-mail data based on a user instruction or the like via the operation unit 932 to be supplied to the communication unit 922. The communication unit 922 performs the modulation processing or the frequency conversion processing on the e-mail data, and transmits the resultant transmission signal from the antenna 921. Further, the communication unit 922 amplifies the reception signal received by the antenna 921 or performs the frequency conversion processing and the demodulation processing thereon thereby to recover the e-mail data. The e-mail data is supplied to the display unit 930 thereby to display the e-mail contents.

The cell phone 920 can store the received e-mail data in a storage medium by the recording/reproducing unit 929. The storage medium is a rewritable storage medium. For example, the storage medium is a semiconductor memory such as RAM or incorporated flash memory, or a removable medium such as hard disk, magnetic disk, magnetooptical disk, optical disk, universal serial bus (USB) memory, or memory card.

When image data is transmitted in the data communication mode, image data generated by the camera unit 926 is supplied to the image processing unit 927. The image processing unit 927 performs the coding processing on the image data thereby to generate coding data.

The multiplexing/separating unit 928 multiplexes the coding data generated by the image processing unit 927 and the speech data supplied from the speech codec 923 in a predetermined system to be supplied to the communication unit 922. The communication unit 922 performs the modulation processing or the frequency conversion processing on the multiplexed data, and transmits the resultant transmission signal from the antenna 921. Further, the communication unit 922 amplifies the reception signal received by the antenna 921 or performs the frequency conversion processing and the demodulation processing thereon thereby to recover the multiplexed data. The multiplexed data is supplied to the multiplexing/separating unit 928. The multiplexing/separating unit 928 separates the multiplexed data, and supplies the coding data to the image processing unit 927, and the speech data to the speech codec 923. The image processing unit 927 performs the decoding processing on the coding data thereby to generate the image data. The image data is supplied to the display unit 930 thereby to display the received image. The speech codec 923 converts the speech data into an analog speech signal to be supplied to the speaker 924, thereby outputting the received speech.

In the thus-configured cell phone, the image processing unit 927 is provided with the functions of the coding device and the decoding device (the coding method and the decoding method) according to the present application. Therefore, the code amount of the chrominance signal in an image can be controlled. In particular, when a signal with wide color gamut is input, rate controllability for chrominance signal can be enhanced.

<Seventh Exemplary Embodiment>

(Exemplary Structure of Recording/Reproducing Device)

Figure 33:
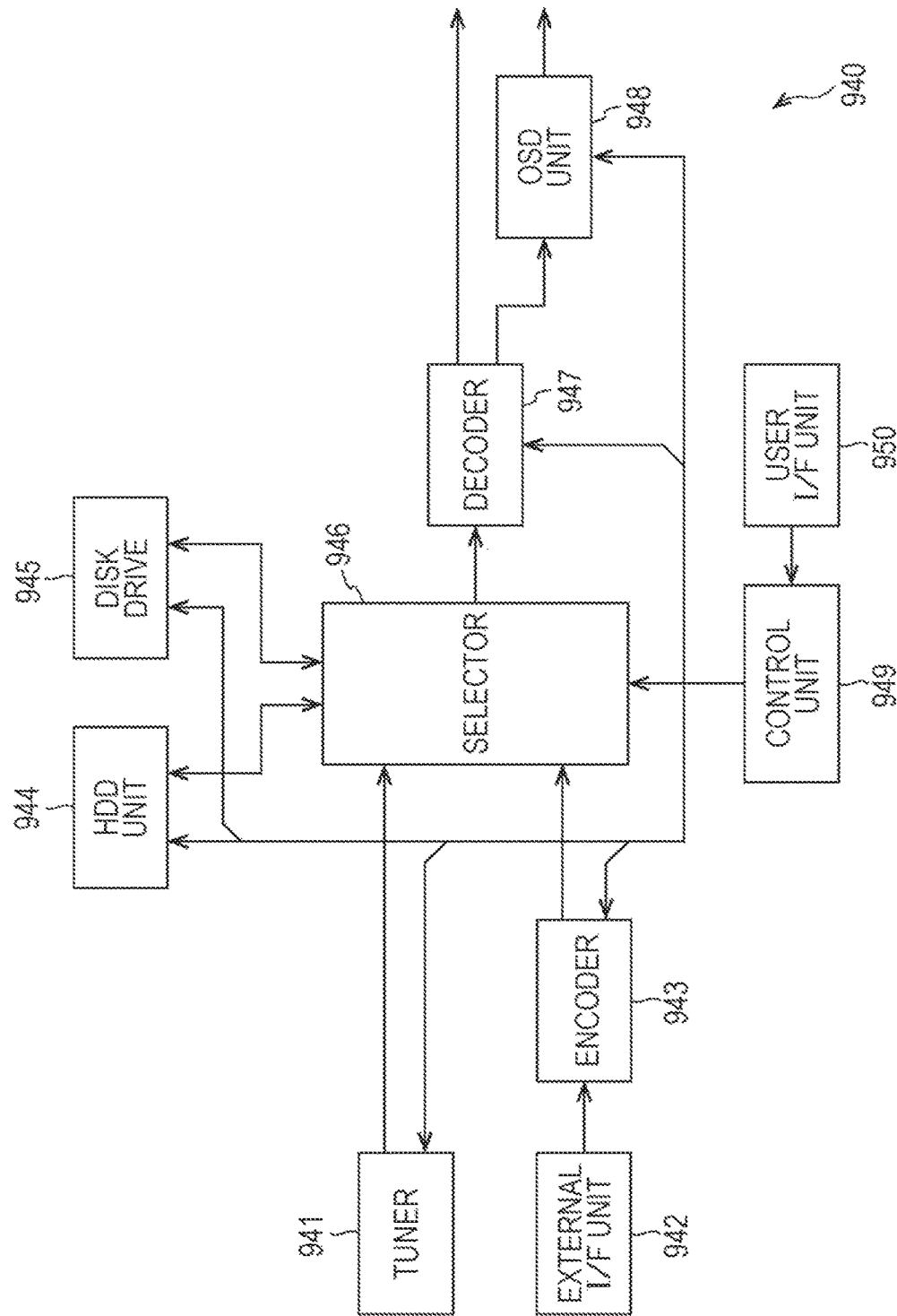
FIG. 33 is a diagram illustrating an exemplary schematic structure of a recording/reproducing device to which the present disclosure is applied.

FIG. 33 illustrates an exemplary schematic structure of a recording/reproducing device to which the present disclosure is applied. A recording/reproducing device 940 records audio data and video data of a received broadcast program, for example, in a recording medium, and supplies the recorded data to the user at a user-instructed timing. Further, the recording/reproducing device 940 can obtain audio data or video data from other device, for example, and can record it in a recording medium. Furthermore, the recording/reproducing device 940 decodes and outputs the audio data or the video data recorded in the recoding medium thereby to perform image display or speech output in a monitor device or the like.

The recording/reproducing device 940 has a tuner 941, an external interface unit 942, an encoder 943, a hard disk drive (HDD) unit 944, a disk drive 945, a selector 946, a decoder 947, an on-screen display (OSD) unit 948, a control unit 949, and a user interface unit 950.

The tuner 941 selects a desired channel based on a broadcast signal received by an antenna (not illustrated). The tuner 941 outputs a coding bit stream obtained by demodulating the reception signal of the desired channel to the selector 946.

The external interface unit 942 is configured of at least one of IEEE1394 interface, network interface unit, USB interface, and flash memory interface. The external interface unit 942 is an interface for connecting to an external device, a network, a memory card, or the like, and receives data such as video data or speech data to be recorded.

The encoder 943 codes the video data or the speech data supplied from the external interface unit 942 in a predetermined system, if not coded, and outputs a coding bit stream to the selector 946.

The HDD unit 944 records content data such as video or speech, various programs, other data, and the like in the incorporated hard disk, and reads them from the hard disk on reproduction or the like.

The disk drive 945 records and reproduces the signals on the mounted optical disk. It is an optical disk, a DVD disk (such as DVD-Video, DVD-RAM, DVD-R, DVD-RW, DVD+R or DVD+RW), or a Blu-ray (registered trademark) disk, for example.

The selector 946 selects the coding bit stream of either the tuner 941 or the encoder 943 when recording video or speech, and supplies it to either the HDD unit 944 or the disk drive 945. Further, the selector 946 supplies the coding bit stream output from the HDD unit 944 or the disk drive 945 to the decoder 947 when reproducing video or speech.

The decoder 947 performs the decoding processing on the coding bit stream. The decoder 947 supplies the video data generated by the decoding processing to the OSD unit 948. Further, the decoder 947 outputs the speech data generated by the decoding processing.

The OSD unit 948 generates the video data for displaying a menu screen or the like for item selection, and superimposes and outputs it on the video data output from the decoder 947.

The user interface unit 950 is connected to the control unit 949. The user interface unit 950 is configured of an operation switch, a remote control signal reception unit, or the like, and supplies an operation signal in response to a user operation to the control unit 949.

The control unit 949 is configured of CPU, a memory, or the like. The memory stores the programs executed by the CPU or various items of data required for the series of processing by the CPU. The program stored in the memory is read and executed by the CPU at a predetermined timing such as startup of the recording/reproducing device 940. The CPU executes the program so that the recording/reproducing device 940 controls each unit to operate depending on a user operation.

In the thus-configured recording/reproducing device, the decoder 947 is provided with the functions of the decoding device (the decoding method) according to the present application. Therefore, the code amount of the chrominance signal in an image can be controlled for deciding a coding stream. In particular, when a signal with wide color gamut is input, rate controllability for chrominance signal can be enhanced.

<Eighth Exemplary Embodiment>

(Exemplary Structure of Imaging Device)

Figure 34:
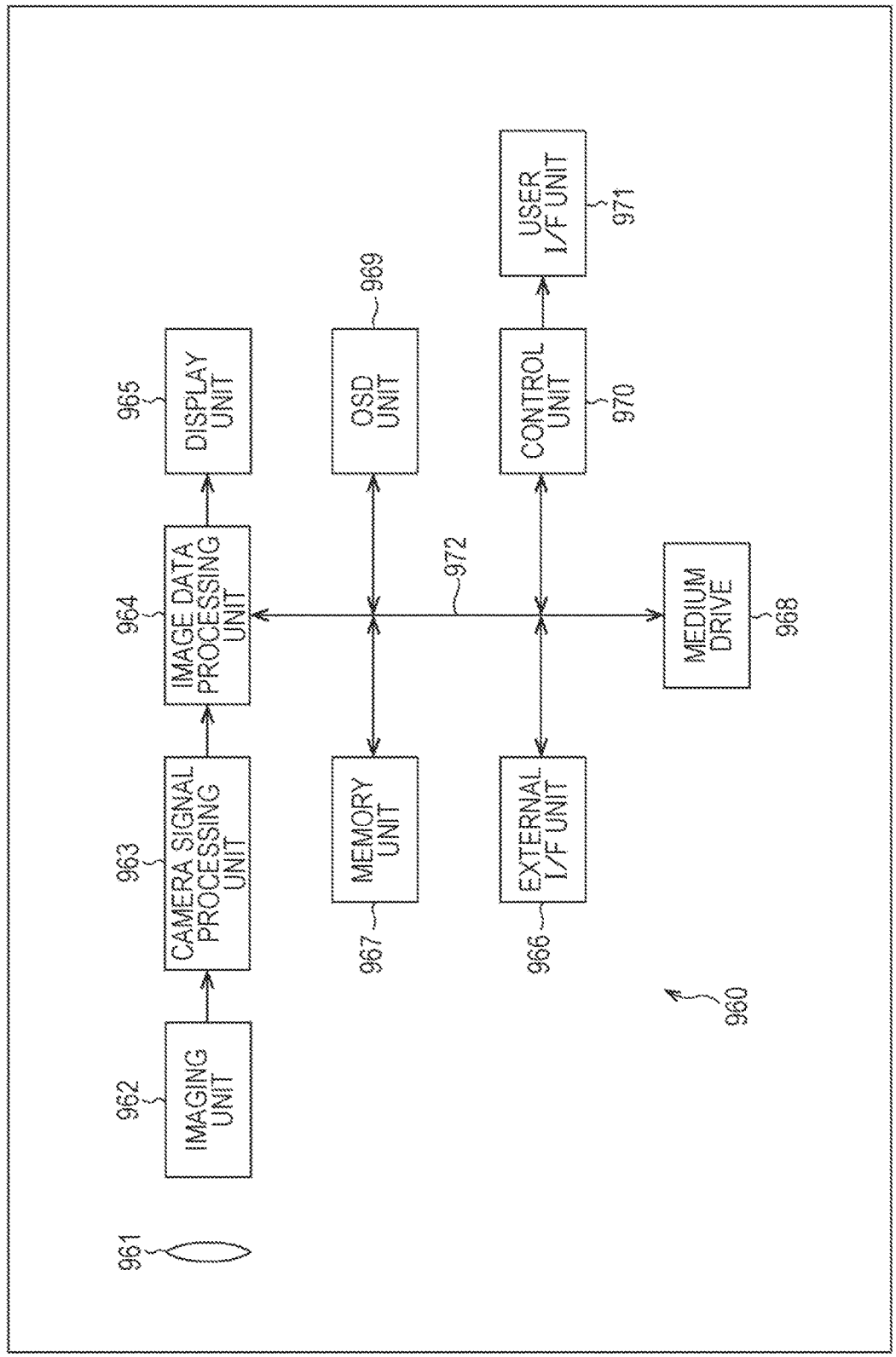
FIG. 34 is a diagram illustrating an exemplary schematic structure of an imaging device to which the present disclosure is applied.

FIG. 34 illustrates an exemplary schematic structure of an imaging device to which the present disclosure is applied. An imaging device 960 shoots a subject to display the image of the subject on a display unit or records it as image data in a recording medium.

The imaging device 960 has an optical block 961, an imaging unit 962, a camera signal processing unit 963, an image data processing unit 964, a display unit 965, an external interface unit 966, a memory unit 967, a medium drive 968, an OSD unit 969, and a control unit 970. A user interface unit 971 is connected to the control unit 970. Further, the image data processing unit 964, the external interface unit 966, the memory unit 967, the medium drive 968, the OSD unit 969, the control unit 970, and the like are mutually connected via a bus 972.

The optical block 961 is configured of a focus lens, a diaphragm mechanism, or the like. The optical block 961 forms an optical image of a subject on the imaging face of the imaging unit 962. The imaging unit 962 is configured of a CCD or CMOS image sensor, generates an electric signal depending on an optical image by photoelectric conversion and supplies it to the camera signal processing unit 963.

The camera signal processing unit 963 performs various camera signal processing such as knee correction, gamma correction, and color correction on the electric signal supplied from the imaging unit 962. The camera signal processing unit 963 supplies the image data subjected to the camera signal processing to the image data processing unit 964.

The image data processing unit 964 performs a coding processing on the image data supplied from the camera signal processing unit 963. The image data processing unit 964 supplies coding data generated by the coding processing to the external interface unit 966 or the medium drive 968. Further, the image data processing unit 964 performs a decoding processing on the coding data supplied from the external interface unit 966 or the medium drive 968. The image data processing unit 964 supplies the image data generated by the decoding processing to the display unit 965. Further, the image data processing unit 964 performs the processing of supplying the image data supplied from the camera signal processing unit 963 to the display unit 965, or superimposes the display data obtained from the OSD unit 969 on the image data to be supplied to the display unit 965.

The OSD unit 969 generates display data such as menu scree or icons made of symbols, characters or graphics, and outputs it to the image data processing unit 964.

The external interface unit 966 is configured of a USB I/O terminal or the like, for example, and is connected to a printer when printing an image. Further, a drive is connected to the external interface unit 966 as needed, a removable medium such as magnetic disk or optical disk is mounted thereon as needs, and a computer program read therefrom is installed as needed. Further, the external interface unit 966 has a network interface connected to a predetermined network such as LAN or Internet. The control unit 970 can read the coding data from the medium drive 968 in response to an instruction from the user interface unit 971, for example, and can supply it from the external interface unit 966 to other device connected via a network. Further, the control unit 970 can obtain coding data or image data supplied from other device via a network by the external interface unit 966, and can supply it to the image data processing unit 964.

The recoding medium driven by the medium drive 968 may be any rewritable removable medium such as magnetic disk, magnetooptical disk, optical disk, or semiconductor memory. The recording medium may be any type of removable medium, a tape device, a disk, or a memory card. Of course, it may be a non-contact integrated circuit (IC) card or the like.

Further, the medium drive 968 and a recording medium may be integrated to be configured in a non-portable storage medium such as incorporated hard disk drive or solid state drive (SSD).

The control unit 970 is configured of CPU. The memory unit 967 stores programs executed by the control unit 970, or various items of data required for the series of processing by the control unit 970. The program stored in the memory unit 967 is read and executed by the control unit 970 at a predetermined timing such as startup of the imaging device 960. The control unit 970 executes the programs thereby to control each unit such that the imaging device 960 operates in response to a user operation.

In the thus-configured imaging device, the image data processing unit 964 is provided with the functions of the coding device and the decoding device (the coding method and the decoding method) according to the present application. Therefore, the code amount of the chrominance signal in an image can be controlled for coding or decoding a coding stream. In particular, when a signal with wide color gamut is input, rate controllability for chrominance signal can be enhanced.

<Exemplary Applications of Scalable Coding>
(First System)

Specific exemplary use of scalable coding data subjected to the scalable coding (hierarchy coding) will be described below. The scalable coding is used for selecting data to be transmitted as in the example illustrated in FIG. 35, for example.

Figure 35:
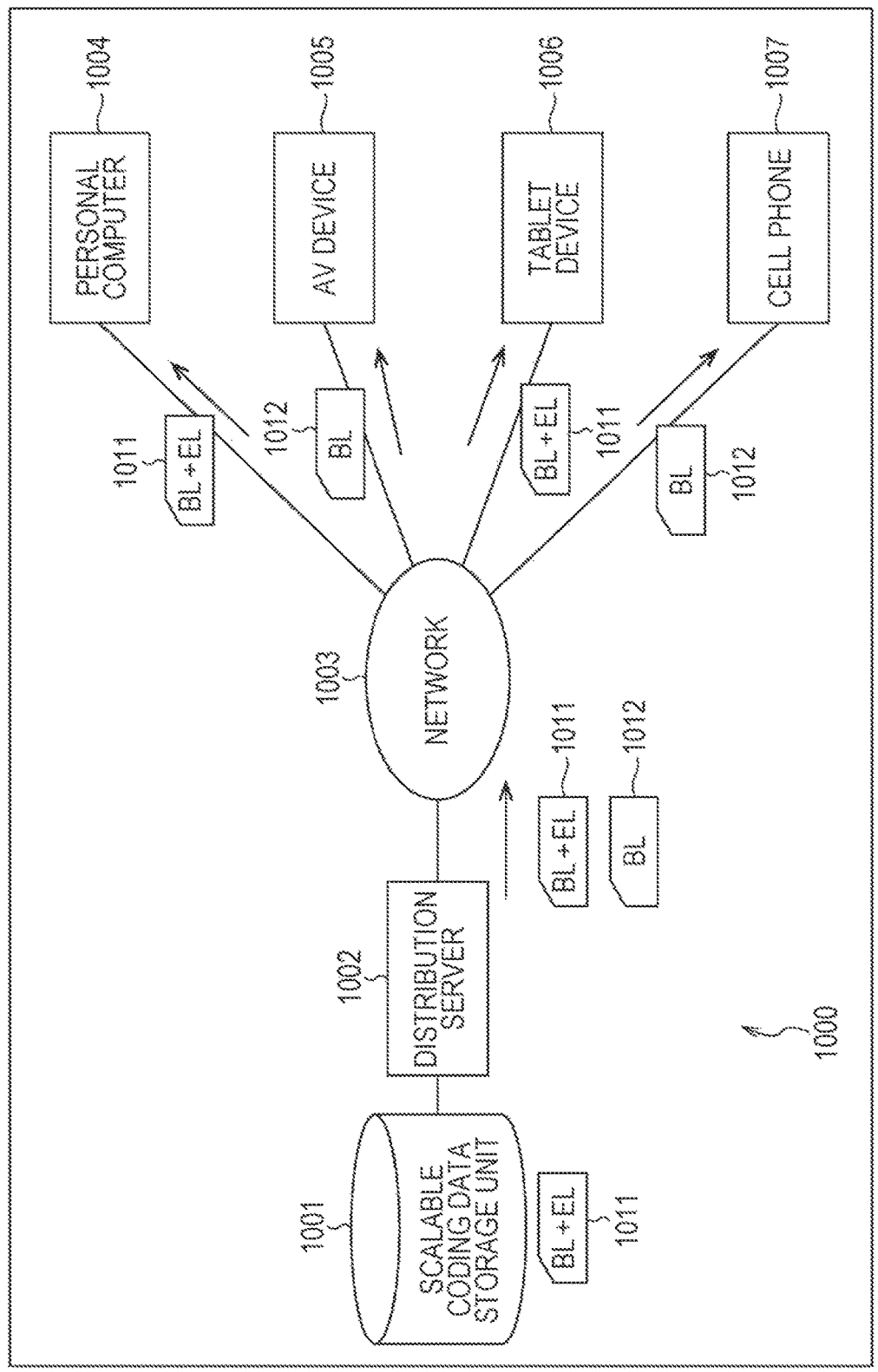
FIG. 35 is a block diagram illustrating exemplary use of scalable coding.

In a data transmission system 1000 illustrated in FIG. 35, a distribution server 1002 reads scalable coding data stored in a scalable coding data storage unit 1001, and distributes it to terminal devices such as a personal computer 1004, an AV device 1005, a tablet device 1006, and a cell phone 1007 via a network 1003.

At this time, the distribution server 1002 selects and transmits the coding data with appropriate quality depending on the capability or communication environment of a terminal device. Even when the distribution server 1002 transmits data with unnecessarily high quality, a high-quality image cannot be necessarily obtained in the terminal device, which can be a cause for delay or overflow. Further, a communication bandwidth can be unnecessarily occupied or loads on the terminal device can be unnecessarily increased. Inversely, even when the distribution server 1002 transmits data with unnecessarily low quality, an image with sufficient quality cannot be obtained in the terminal device. Therefore, the distribution server 1002 reads and transmits the scalable coding data stored in the scalable coding data storage unit 1001 as coding data with appropriate quality for the capability or communication environment of a terminal device as needed.

For example, the scalable coding data storage unit 1001 is assumed to store scalable coding data (BL+EL) 1011 subjected to scalable coding. The scalable coding data (BL+EL) 1011 is coding data including both the base layer and the enhancement layer, and is data capable of obtaining both the base layer image and the enhancement layer image when being decoded.

The distribution server 1002 selects an appropriate layer and reads the data of the layer depending on the capability or communication environment of a terminal device to which the data is to be transmitted. For example, the distribution server 1002 reads and transmits the high-quality scalable coding data (BL+EL) 1011 from the scalable coding data storage unit 1001 to the personal computer 1004 or the tablet device 1006 with high processing capability. To the contrary, for example, the distribution server 1002 extracts the data of the base layer from the scalable coding data (BL+EL) 1011, and transmits it as lower-quality scalable coding data (BL) 1012 than the scalable coding data (BL+EL) 1011, which has the same contents as the scalable coding data (BL+EL) 1011, to the AV device 1005 or the cell phone 1007 with low processing capability.

The amount of data can be easily adjusted by use of the scalable coding data in this way, thereby preventing delay or overflow from occurring, or preventing an unnecessary increase in loads on the terminal device or communication medium. Further, the scalable coding data (BL+EL) 1011 is reduced in redundancy between layers, and thus the amount of data can be further reduced than when the coding data of each layer is assumed as individual item of data. Therefore, the storage area in the scalable coding data storage unit 1001 can be more efficiently used.

Various devices can be applied to the terminal devices such as the personal computer 1004 to the cell phone 1007, and thus the hardware performance of a terminal device is different per device. Further, various applications are executed by the terminal devices, and the capability of the software is also different. Further, any communication line networks including wired, wireless or both networks such as Internet or local area network (LAN) can be applied to the network 1003 as communication medium, and the data transmission capability is different. Further, it can be changed due to other communication.

Thus, the distribution server 1002 may make communication with a terminal device as data transmission destination before starting to transmit data, and may obtain the information on the capability of the terminal device such as hardware performance of the terminal device or the performance of application (software) executed by the terminal device, as well as the information on the communication environment such as available bandwidth to the network 1003. The distribution server 1002 may select an appropriate layer based on the obtained information.

A layer may be extracted in a terminal device. For example, the personal computer 1004 may decode the transmitted scalable coding data (BL+EL) 1011 thereby to display the base layer image, or to display the enhancement layer image. Further, for example, the personal computer 1004 may extract, store, or transfer the scalable coding data (BL) 1012 of the base layer from the transmitted scalable coding data (BL+EL) 1011 to other device, or decode it thereby to display the base layer image.

Of course, any numbers of scalable coding data storage units 1001, distribution servers 1002, networks 1003, and terminal devices may be possible. Further, there has been described above the example in which the distribution server 1002 transmits data to a terminal device, but the exemplary use is not limited thereto. The data transmission system 1000 can be applied to any system for selecting and transmitting an appropriate layer depending on the capability or communication environment of a terminal device when transmitting coding data subjected to the scalable coding to the terminal device.

(Second System)

Figure 36:
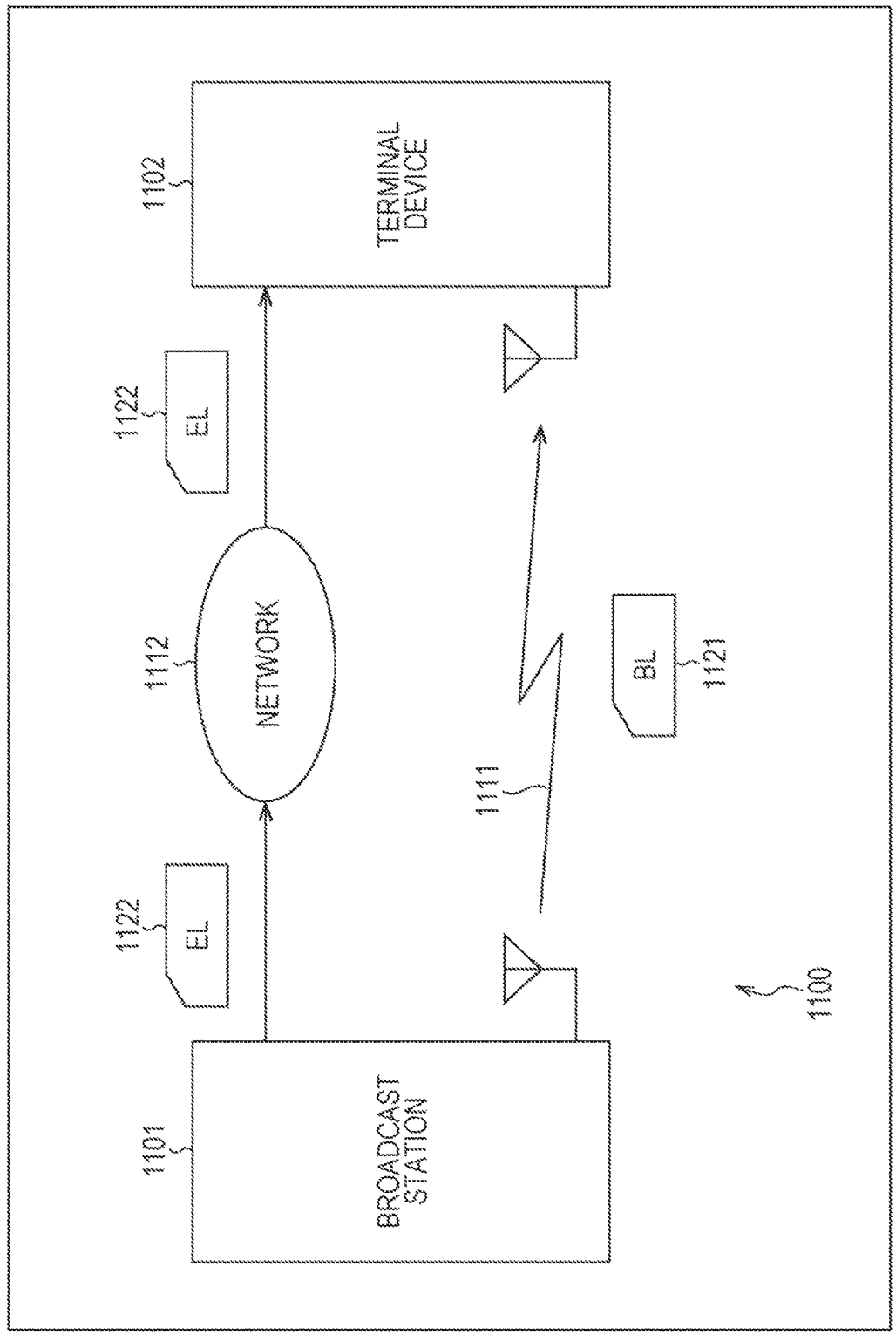
FIG. 36 is a block diagram illustrating other exemplary use of scalable coding.

The scalable coding is used for transmission via a plurality of communication mediums as in the example illustrated in FIG. 36, for example.

In a data transmission system 1100 illustrated in FIG. 36, a broadcast station 1101 transmits scalable coding data (BL) 1121 of the base layer via terrestrial broadcasting 1111. Further, the broadcast station 1101 transmits (packetizes and transmits, for example) scalable coding data (EL) 1122 of the enhancement layer via any networks 1112 including wired, wireless, or both communication networks.

A terminal device 1102 has a reception function of the terrestrial broadcasting 1111 broadcasted by the broadcast station 1101, and receives the scalable coding data (BL) 1121 of the base layer transmitted via the terrestrial broadcasting 1111. Further, the terminal device 1102 further has a communication function of making communication via the network 1112, and receives the scalable coding data (EL) 1122 of the enhancement layer transmitted via the network 1112.

The terminal device 1102 decodes the scalable coding data (BL) 1121 of the base layer obtained via the terrestrial broadcasting 1111 in response to a user instruction, for example, thereby to obtain, store or transfer the base layer image to other device.

Further, the terminal device 1102 combines the scalable coding data (BL) 1121 of the base layer obtained via the terrestrial broadcasting 1111 and the scalable coding data (EL) 1122 of the enhancement layer obtained via the network 1112 in response to a user instruction, for example, thereby to obtain scalable coding data (BL+EL), or decodes them thereby to obtain, store or transfer the enhancement layer image to other device.

As described above, the scalable coding data can be transmitted via a different communication medium per layer, for example. Therefore, it is possible to disperse loads and to prevent delay or overflow from occurring.

A communication medium to be used for transmission can be selected per layer depending on a situation. For example, the scalable coding data (BL) 1121 of the base layer with a relatively large amount of data may be transmitted via a communication medium with a large bandwidth, and the scalable coding data (EL) 1122 of the enhancement layer with a relatively small amount of data may be transmitted via a communication medium with a small bandwidth. Further, for example, a communication medium for transmitting the scalable coding data (EL) 1122 of the enhancement layer may be switched to the network 1112 or the terrestrial broadcasting 1111 depending on an available bandwidth to the network 1112. Of course, this is applicable to data of any layer.

It is possible to further prevent an increase in loads in data transmission under the control.

Of course, any number of layers may be possible, and any number of communication mediums used for transmission may be possible. Further, any number of terminal devices 1102 as data distribution destinations may be also possible. The description has been made above assuming the broadcasting from the broadcast station 1101, but the exemplary use is not limited thereto. The data transmission system 1100 can be applied to any system for dividing coding data subjected to the scalable coding into a plurality of items of data in units of layer and transmitting them via a plurality of lines.

(Third System)

Figure 37:
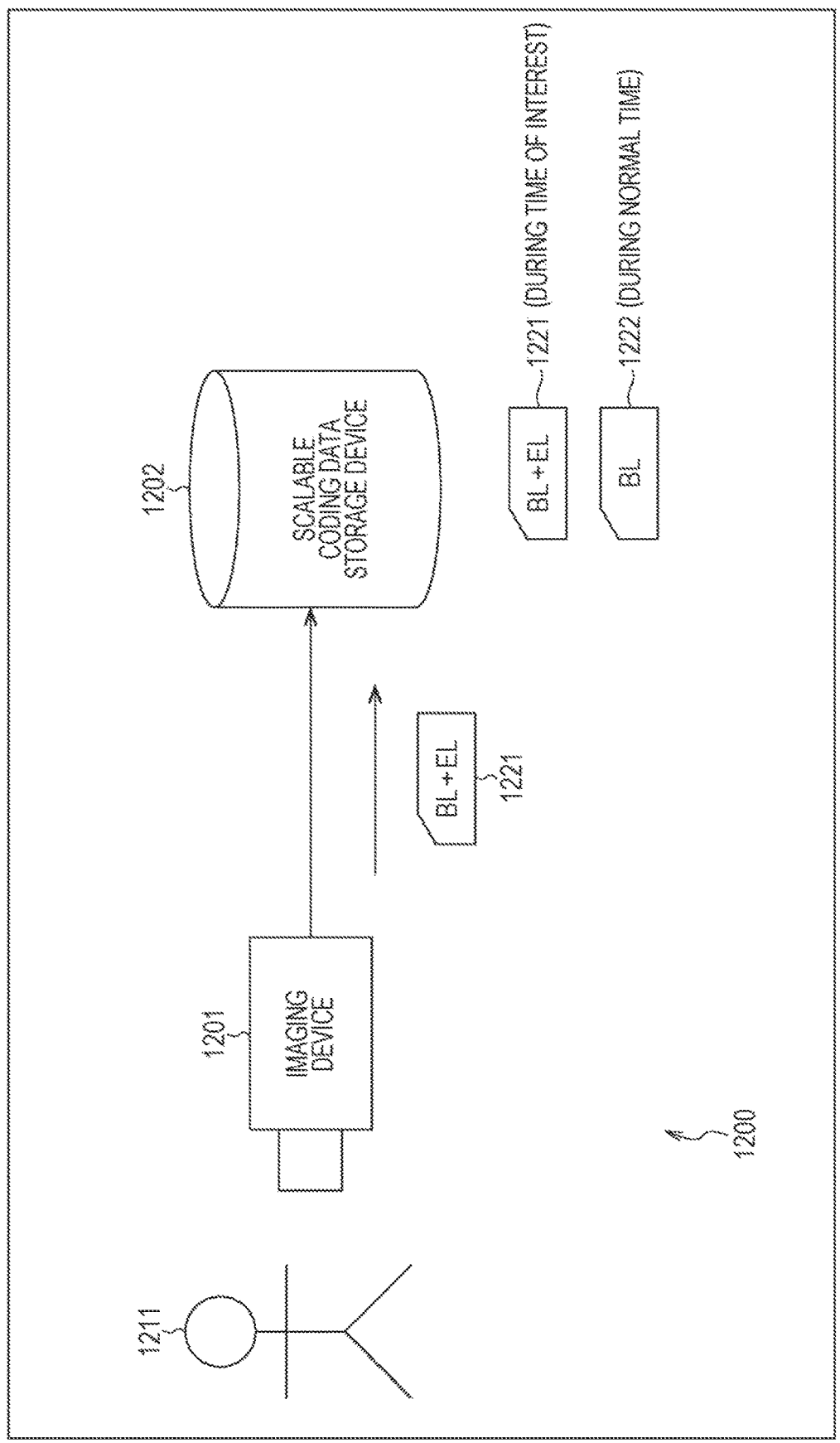
FIG. 37 is a block diagram illustrating still other exemplary use of scalable coding.

The scalable coding is used for storing coding data as in the example illustrated in FIG. 37, for example.

In an imaging system 1200 illustrated in FIG. 37, an imaging device 1201 performs scalable coding on image data obtained by shooting a subject 1211, and supplies it as scalable coding data (BL+EL) 1221 to a scalable coding data storage device 1202.

The scalable coding data storage device 1202 stores the scalable coding data (BL+EL) 1221 supplied from the imaging device 1201 at situation-dependent quality. For example, during a normal time, the scalable coding data storage device 1202 extracts the data of the base layer from the scalable coding data (BL+EL) 1221 and stores it as scalable coding data (BL) 1222 of the base layer with low quality and a small amount of data. To the contrary, for example, during a time of interest, the scalable coding data storage device 1202 stores the scalable coding data (BL+EL) 1221 with high quality and a large amount of data as it is.

By doing so, the scalable coding data storage device 1202 can store the image at high quality as needed, thereby preventing an increase in data and enhancing use efficiency in the storage area while preventing a reduction in value of the image due to deteriorated image quality.

For example, the imaging device 1201 is assumed as a monitoring camera. When an object to be monitored (such as intruder) is not shot in a shot image (during a normal time), the contents of the shot image are less likely to be important, and thus a reduction in data is prior and the image data (scalable coding data) is stored at low quality. To the contrary, when an object to be monitored is shot as the subject 1211 in a shot image (during a time of interest), the contents of the shot image are likely to be important, and thus the image quality is prior and the image data (scalable coding data) is stored at high quality.

A normal time or a time of interest may be determined by the scalable coding data storage device 1202 analyzing an image, for example. Further, it may be determined by the imaging device 1201 and a determination result may be transmitted to the scalable coding data storage device 1202.

A determination reference for a normal time and a time of interest is optional, and the contents of an image as determination reference are optional. Of course, the conditions other than the contents of an image may be assumed as determination reference. For example, the time may be switched depending on magnitude or waveform of recorded speech, may be switched per predetermined time, or may be switched in response to an external instruction such as user instruction.

There has been described above the example in which two states of a normal time and a time of interest are switched, but any number of states may be possible, and three or more states such as normal time, time of slight interest, time of interest, and time of strong interest may be switched, for example. The upper limit number of states to be switched depends on the number of layers of the scalable coding data.

Further, the imaging device 1201 may determine the number of layers of the scalable coding depending on a state. For example, during a normal time, the imaging device 1201 may generate the scalable coding data (BL) 1222 of the base layer with low quality and a small amount of data and supply it to the scalable coding data storage device 1202.

Further, for example, during a time of interest, the imaging device 1201 may generate the scalable coding data (BL+EL) 1221 of the base layer with high quality and a large amount of data and supply it to the scalable coding data storage device 1202.

The description has been made above by way of a monitoring camera, but the imaging system 1200 is arbitrarily used and is not limited to a monitoring camera.

<Ninth Exemplary Embodiment>

(Other Exemplary Embodiments)

The devices or systems to which the present disclosure is applied have been described above by way of example, but the present disclosure is not limited thereto and may be accomplished in all the structures employed in the devices configuring such devices or systems, such as processors as system large scale integration (LSI), modules using a plurality of processors, units using a plurality of models, sets of units added with other functions (partial structure in the device).

(Exemplary Structure of Video Set)

Figure 38:
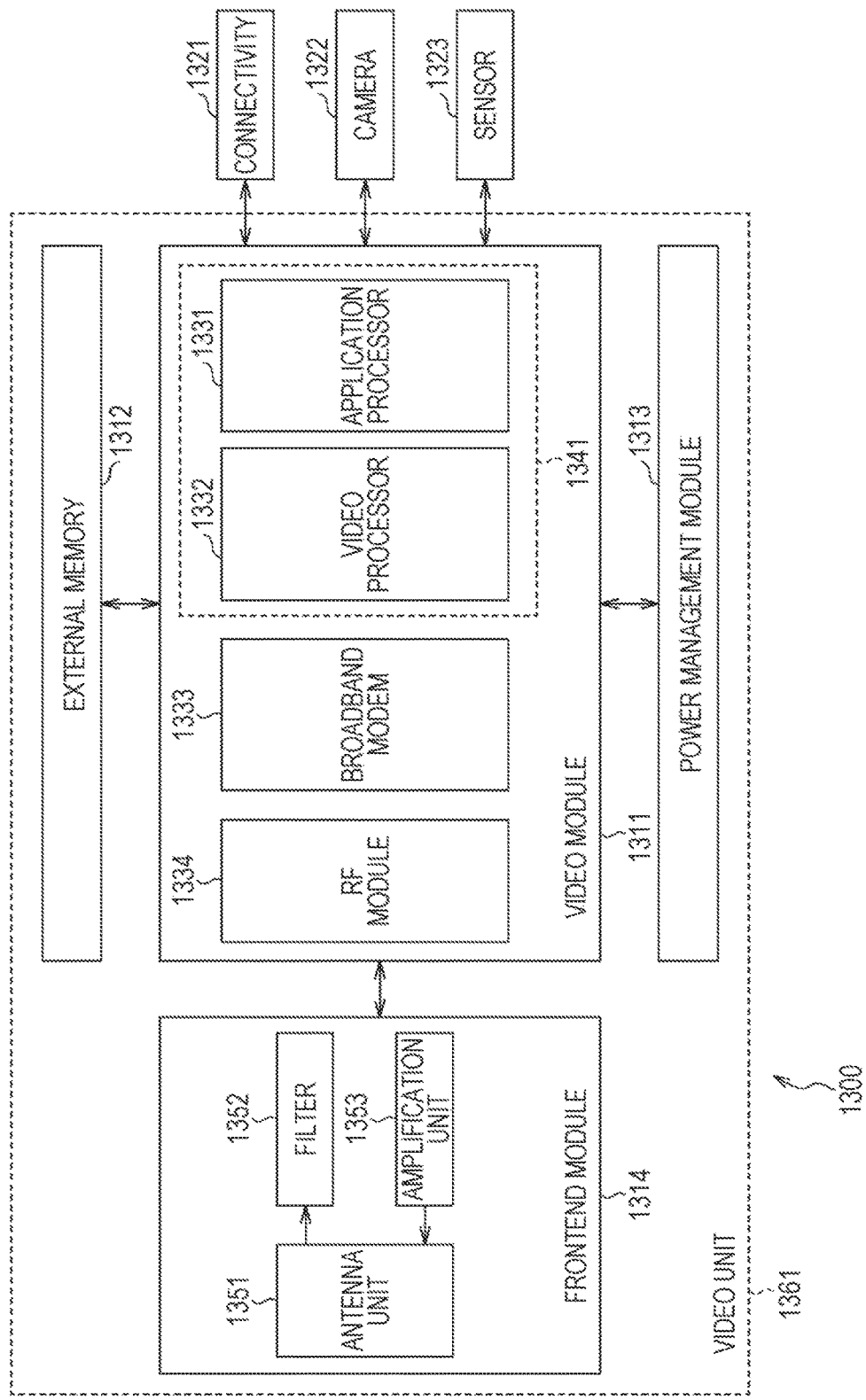
FIG. 38 illustrates an exemplary schematic structure of a video set to which the present disclosure is applied.

An example in which the present disclosure is accomplished as a set will be described with reference to FIG. 38. FIG. 38 illustrates an exemplary schematic structure of a video set to which the present disclosure is applied.

In recent years, multifunctional electronic devices have been increased, and when some components thereof are sold or provided in their development or manufacture, a structure having one function is accomplished, and additionally a plurality of components having associated functions are combined to be accomplished as a set of functions in more cases.

A video set 1300 illustrated in FIG. 38 is configured to be multifunctional, and is such that a device having the functions of (either one or both of) coding and decoding an image is combined with a device having other functions associated with the functions.

As illustrated in FIG. 38, the video set 1300 has a group of modules such as a video module 1311, an external memory 1312, a power management module 1313, and a frontend module 1314, and devices having the associated functions such as connectivity 1321, a camera 1322, and a sensor 1323.

A module is a component in which some mutually-associated component functions are collected to have a collective function. A specific physical configuration is optional, and there is assumed such that a plurality of processors having the respective functions, electronic circuit devices such as resistors or capacitors, and other devices are arranged and integrated on a wiring board or the like. Further, there is assumed such that other modules or processors are combined with a module thereby to be a new module.

In the example of FIG. 38, the video module 1311 is a combination of the components having the functions for the image processing, which has an application processor, a video processor, a broadband modem 1333, and a RF module 1334.

A processor is such that a component having a predetermined function is integrated on a semiconductor chip by system on a chip (SoC), and is called system large scale integration (LSI) or the like. The component having a predetermined function may be a logic circuit (hardware configuration), may be CPU, ROM, RAM and a program (software configuration) executed by them, or may be a combination of both. For example, the processor may have the logic circuit as well as CPU, ROM, RAM and the like, and some functions may be realized in a logic circuit (hardware configuration) while other functions may be realized by the programs (software configuration) executed by the CPU.

The application processor 1331 of FIG. 38 is a processor for executing the image processing application. The application executed by the application processor 1331 can perform a computation processing for realizing the predetermined function, and additionally control the components inside and outside the video module 1311, such as the video processor 1332, as needed.

The video processor 1332 is a processor having the functions of (either one or both of) coding and decoding an image.

The broadband modem 1333 is a processor (or module) for performing a processing for (either one or both of) wired and wireless wide band communications made via a wide band line such as Internet or public phone line network. For example, the broadband modem 1333 converts data (digital signal) to be transmitted into an analog signal by digital modulation or the like, or demodulates and converts a received analog signal into data (digital signal). For example, the broadband modem 1333 can perform digital modulation and demodulation on any information such as image data processed by the video processor 1332, stream of coded image data, application program or setting data.

The RF module 1334 is a module for performing frequency conversion, modulation/demodulation, amplification, filter processing, and the like on a radio frequency (RF) signal exchanged via an antenna. For example, the RF module 1334 performs frequency conversion or the like on a baseband signal generated by the broadband modem 1333 thereby to generate a RF signal. Further, for example, the RF module 1334 performs frequency conversion or the like on a RF signal received via the frontend module 1314 thereby to generate a baseband signal.

As indicated in a dotted line 1341 in FIG. 38, the application processor 1331 and the video processor 1332 may be integrated to be configured as one processor.

The external memory 1312 is a module having a storage device used by the video module 1311, which is provided outside the video module 1311. The storage device for the external memory 1312 may be realized by any physical configuration, but is desirably realized in a relatively-low cost semiconductor memory with a large capacity such as dynamic random access memory (DRAM) since it is generally used for storing a large capacity of data such as image data in units of frame in many cases.

The power management module 1313 manages and controls power supplying to the video module 1311 (each component in the video module 1311).

The frontend module 1314 is a module for providing a frontend function (circuit at the exchange end on the antenna side) for the RF module 1334. As illustrated in FIG. 38, the frontend module 1314 has an antenna unit 1351, a filter 1352, and an amplification unit 1353, for example.

The antenna unit 1351 has an antenna for exchanging wireless signals, and its surrounding components. The antenna unit 1351 transmits a signal supplied from the amplification unit 1353 as wireless signal, and supplies a received wireless signal as electric signal (RF signal) to the filter 1352. The filter 1352 performs a filter processing or the like on the RF signal received via the antenna unit 1351, and supplies the processed RF signal to the RF module 1334. The amplification unit 1353 amplifies the RF signal supplied from the RF module 1334, and supplies it to the antenna unit 1351.

The connectivity 1321 is a module having the function for external connection. The physical configuration of the connectivity 1321 is optional. For example, the connectivity 1321 has a configuration having the communication function other than communication standard to which the broadband modem 1333 corresponds, an external I/O terminal, and the like.

For example, the connectivity 1321 may have a module having the communication function conforming to wireless communication standard such as Bluetooth (registered trademark), IEEE 802.11 (such as Wireless Fidelity (Wi-Fi, registered trademark)), near field communication (NFC), and infrared data association (IrDA), an antenna for exchanging signals conforming to the standard, and the like. Further, for example, the connectivity 1321 may have a module having the communication function conforming to wired communication standard such as universal serial bus (USB) and High-Definition Multimedia Interface (registered trademark) (HDMI), or a terminal conforming to the standard. Furthermore, for example, the connectivity 1321 may have other data (signal) transmission function such as analog I/O terminal.

The connectivity 1321 may include a device of data (signal) transmission destination. For example, the connectivity 1321 may have a drive for reading or writing data from or into a recording medium such as magnetic disk, optical, disk, magnetooptical disk, or semiconductor memory (including not only a removable medium drive but also hard disk, solid state drive (SSD), and network attached storage (NAS)). Further, the connectivity 1321 may have a device for outputting images or speech (such as monitor or speaker).

The camera 1322 is a module having the function of imaging a subject and obtaining image data of the subject. The image data obtained by the imaging of the camera 1322 is supplied to the video processor 1332 to be coded, for example.

The sensor 1323 is a module having any sensor function such as speech sensor, ultrasonic sensor, optical sensor, illumination sensor, infrared sensor, image sensor, rotation sensor, angle sensor, angular velocity sensor, velocity sensor, acceleration sensor, tilt sensor, magnetic identification sensor, collision sensor, or temperature sensor. Data detected by the sensor 1323 is supplied to the application processor 1331 to be used by the application or the like.

The components described above as modules may be realized as processors, or the components described as processors may be realized as modules.

In the thus-configured video set 1300, the present disclosure can be applied to the video processor 1332 as described below. Thus, the video set 1300 can be accomplished as a set to which the present disclosure is applied.

(Exemplary Structure of Video Processor)

Figure 39:
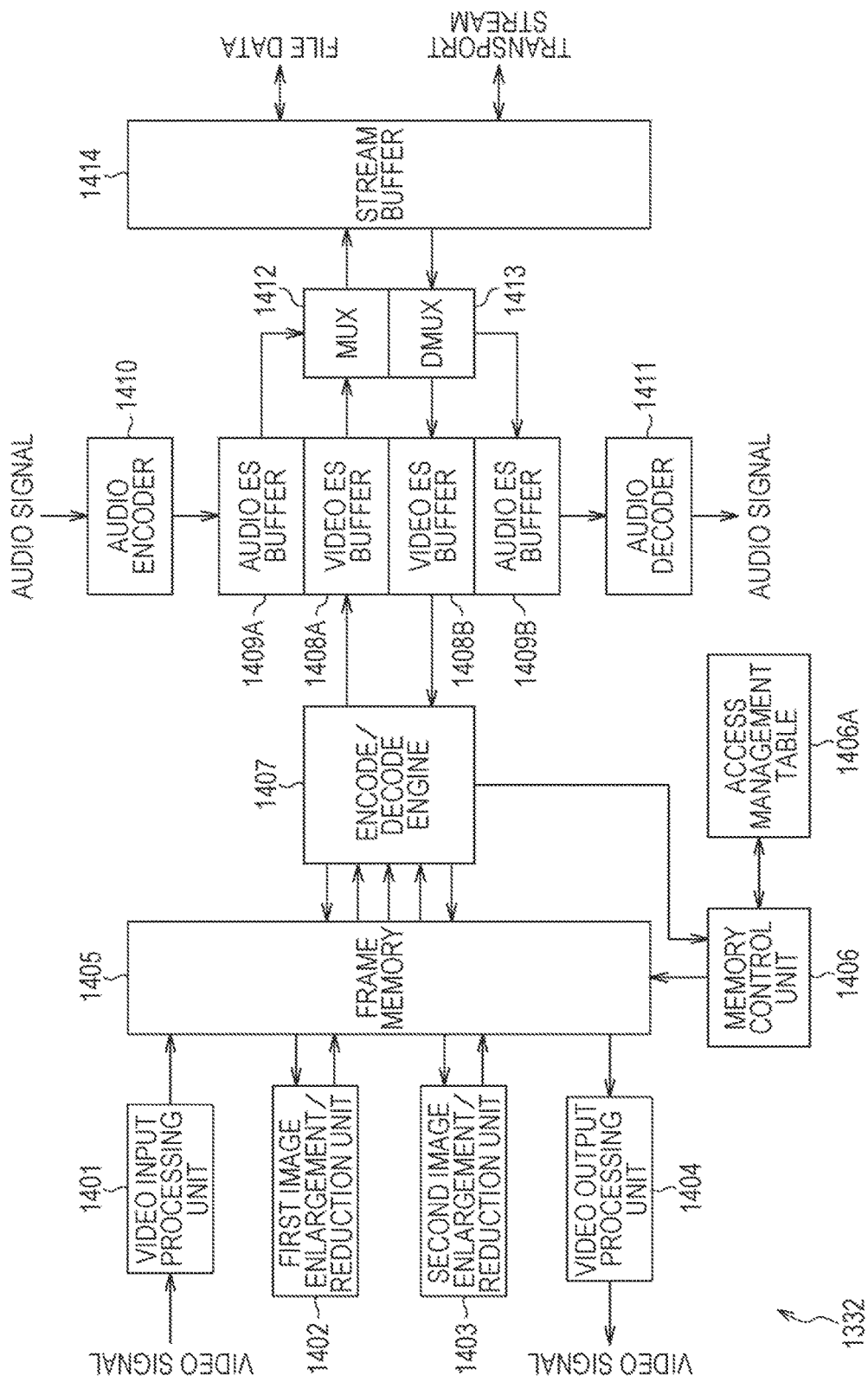
FIG. 39 illustrates an exemplary schematic structure of a video processor to which the present disclosure is applied.

FIG. 39 illustrates an exemplary schematic structure of the video processor 1332 (FIG. 38) to which the present disclosure is applied.

In the example of FIG. 39, the video processor 1332 has a function of receiving an input video signal and audio signal and coding them in a predetermined system, and a function of decoding coded video data and audio data and reproducing and outputting a video signal and an audio signal.

As illustrated in FIG. 39, the video processor 1332 has a video input processing unit 1401, a first image enlargement/reduction unit 1402, a second image enlargement/reduction unit 1403, a video output processing unit 1404, a frame memory 1405, and a memory control unit 1406. The video processor 1332 further has an encode/decode engine 1407, video elementary stream (ES) buffers 1408A and 1408B, and audio ES buffers 1409A and 1409B. The video processor 1332 further has an audio encoder 1410, an audio decoder 1411, a multiplexing unit (Multiplexer (MUX)) 1412, a demultiplexing unit (Demultiplexer (DMUX)) 1413, and a stream buffer 1414.

The video input processing unit 1401 obtains a video signal input by the connectivity 1321 (FIG. 38) or the like, for example, and converts it into digital image data. The first image enlargement/reduction unit 1402 performs format conversion or image enlargement/reduction processing on the image data. The second image enlargement/reduction unit 1403 performs an image enlargement/reduction processing on the image data depending on a format of an output destination via the video output processing unit 1404, or performs the format conversion or the image enlargement/reduction processing similarly to the first image enlargement/reduction unit 1402. The video output processing unit 1404 performs format conversion on the image data or converts it into an analog signal, and outputs it as reproduced video signal to the connectivity 1321 (FIG. 38) or the like, for example.

The frame memory 1405 is a memory for image data shared among the video input processing unit 1401, the first image enlargement/reduction unit 1402, the second image enlargement/reduction unit 1403, the video output processing unit 1404, and the encode/decode engine 1407. The frame memory 1405 is realized as a semiconductor memory such as DRAM.

The memory control unit 1406 controls to write/read into/from the frame memory 1405 according to an access schedule to the frame memory 1405 written in an access management table 1406A in response to a synchronization signal from the encode/decode engine 1407. The access management table 1406A is updated by the memory control unit 1406 depending on the series of processing performed by the encode/decode engine 1407, the first image enlargement/reduction unit 1402, the second image enlargement/reduction unit 1403, and the like.

The encode/decode engine 1407 performs an encode processing on the image data, and perform a decode processing on a video stream as coded image data. For example, the encode/decode engine 1407 codes the image read from the frame memory 1405, and sequentially writes it as video stream into the video ES buffer 1408A. Further, for example, the video streams are sequentially read and decoded from the video ES buffer 1408B and are sequentially written as image data into the frame memory 1405. The encode/decode engine 1407 uses the frame memory 1405 as working area for the coding or decoding. Further, the encode/decode engine 1407 outputs a synchronization signal to the memory control unit 1406 at a timing to start a processing per macroblock, for example.

The video ES buffer 1408A buffers the video stream generated by the encode/decode engine 1407 and supplies it to the multiplexing unit (MUX) 1412. The video ES buffer 1408B buffers the video stream supplied from the demultiplexing unit (DMUX) 1413 and supplies it to the encode/decode engine 1407.

The audio ES buffer 1409A buffers the audio stream generated by the audio encoder 1410, and supplies it to the multiplexing unit (MUX) 1412. The audio ES buffer 1409B buffers the audio stream supplied from the demultiplexing unit (DMUX) 1413 and supplies it to the audio decoder 1411.

The audio encoder 1410 performs digital conversion on the audio signal input from the connectivity 1321 (FIG. 38) or the like, and codes it in a predetermined system such as MPEG audio system or AudioCode number 3 (AC3) system. The audio encoder 1410 sequentially writes the audio stream as coded audio signal into the audio ES buffer 1409A. The audio decoder 1411 decodes the audio stream supplied from the audio ES buffer 1409B, converts it into an analog signal, for example, and supplies the analog signal as reproduced audio signal to the connectivity 1321 (FIG. 38) or the like, for example.

The multiplexing unit (MUX) 1412 multiplexes the video stream and the audio stream. The multiplexing method (or a format of the bit stream generated by the multiplexing) is optional. Further, at the time of the multiplexing, the multiplexing unit (MUX) 1412 can add predetermined header information or the like to the bit stream. That is, the multiplexing unit (MUX) 1412 can convert the format of the stream by the multiplexing. For example, the multiplexing unit (MUX) 1412 multiplexes the video stream and the audio stream thereby to be converted into a transport stream as bit stream of transfer format. Further, for example, the multiplexing unit (MUX) 1412 multiplexes the video stream and the audio stream thereby to be converted into data of recording file format (file data).

The demultiplexing unit (DMUX) 1413 demultiplexes the bit stream in which the video stream and the audio stream are multiplexed in a method corresponding to the multiplexing by the multiplexing unit (MUX) 1412. That is, the demultiplexing unit (DMUX) 1413 extracts the video stream and the audio stream from the bit stream read from the stream buffer 1414 (separates into the video stream and the audio stream). That is, the demultiplexing unit (DMUX) 1413 can convert the format of the stream by the demultiplexing (inverse conversion to the conversion by the multiplexing unit (MUX) 1412). For example, the demultiplexing unit (DMUX) 1413 obtains and demultiplexes the transport stream supplied from the connectivity 1321 or the broadband modem 1333 (both in FIG. 38) via the stream buffer 1414 thereby to be converted into the video stream and the audio stream. Further, for example, the demultiplexing unit (DMUX) 1413 can obtain and demultiplex the file data read from various recording mediums by the connectivity 1321 (FIG. 38) via the stream buffer 1414 thereby to be converted into the video stream and the audio stream.

The stream buffer 1414 buffers the bit stream. For example, the stream buffer 1414 buffers the transport stream supplied from the multiplexing unit (MUX) 1412, and supplies it to the connectivity 1321 or the broadband modem 1333 (both in FIG. 38) at a predetermined timing or in response to an external request.

Further, for example, the stream buffer 1414 buffers the file data supplied from the multiplexing unit (MUX) 1412, and supplies it to the connectivity 1321 (FIG. 38) or the like at a predetermined timing or in response to an external request to be recoded in various recording mediums.

Further, the stream buffer 1414 buffers the transport stream obtained via the connectivity 1321 or the broadband modem 1333 (both in FIG. 38), and supplies it to the demultiplexing unit (DMUX) 1413 at a predetermined timing or in response to an external request.

Further, the stream buffer 1414 buffers the file data read from various recording mediums in the connectivity 1321 (FIG. 38) or the like, and supplies it to the demultiplexing unit (DMUX) 1413 at a predetermined timing or in response to an external request.

The operations of the thus-configured video processor 1332 will be described below. For example, a video signal input from the connectivity 1321 (FIG. 38) or the like into the video processor 1332 is converted into digital image data in a predetermined system such as 4:2:2Y/Cb/Cr system by the video input processing unit 1401, and is sequentially written into the frame memory 1405. The digital image data is read by the first image enlargement/reduction unit 1402 or the second image enlargement/reduction unit 1403, and is subjected to the format conversion into a predetermined system such as 4:2:0Y/Cb/Cr system and the enlargement/reduction processing to be written into the frame memory 1405 again. The image data is coded by the encode/decode engine 1407 and written as video stream into the video ES buffer 1408A.

Further, an audio signal input from the connectivity 1321 (FIG. 38) or the like into the video processor 1332 is coded by the audio encoder 1410 and written as audio stream into the audio ES buffer 1409A.

The video stream in the video ES buffer 1408A and the audio stream in the audio ES buffer 1409A are read and multiplexed by the multiplexing unit (MUX) 1412 to be converted into a transport stream or file data. The transport stream generated by the multiplexing unit (MUX) 1412 is buffered by the stream buffer 1414 and then output to an external network via the connectivity 1321 or the broadband modem 1333 (both in FIG. 38). Further, the file data generated by the multiplexing unit (MUX) 1412 is buffered by the stream buffer 1414 and then output to the connectivity 1321 (FIG. 38) or the like, for example, to be recorded in various recording mediums.

Further, the transport stream input from the external network into the video processor 1332 via the connectivity 1321 or the broadband modem 1333 (both in FIG. 38), for example, is buffered by the stream buffer 1414 and then demultiplexed by the demultiplexing unit (DMUX) 1413. Further, the file data read from various recording mediums by the connectivity 1321 (FIG. 38) or the like, for example, and input into the video processor 1332 is buffered by the stream buffer 1414 and then demultiplexed by the demultiplexing (DMUX) 1413. That is, the transport stream or the file data input into the video processor 1332 is separated into the video stream and the audio stream by the demultiplexing unit (DMUX) 1413.

The audio stream is supplied to the audio decoder 1411 via the audio ES buffer 1409B and decoded thereby to reproduce the audio signal. The video stream is written into the video ES buffer 1408B, and is then sequentially read and decoded by the encode/decode engine 1407 to be written into the frame memory 1405. The decoded image data is subjected to the enlargement/reduction processing by the second image enlargement/reduction unit 1403 to be written into the frame memory 1405. The decoded image data is then read by the video output processing unit 1404, is subjected to format conversion into a predetermined system such as 4:2:2Y/Cb/Cr, and is further converted into an analog signal thereby to reproduce and output the video signal When the present disclosure is applied to the thus-configured video processor 1332, the present disclosure according to each exemplary embodiment described above may be applied to the encode/decode engine 1407. That is, for example, the encode/decode engine 1407 may have the functions of the coding device or the decoding device according to the first exemplary embodiment. By doing so, the video processor 1332 can obtain the similar effects to the above effects described with reference to FIG. 1 to FIG. 20.

The present disclosure (or the functions of the image coding device or the image decoding device according to each exemplary embodiment described above) may be realized in hardware such as logic circuit, in software such as incorporated program, or in both of them in the encode/decode engine 1407.

(Other Exemplary Structure of Video Processor)

Figure 40:
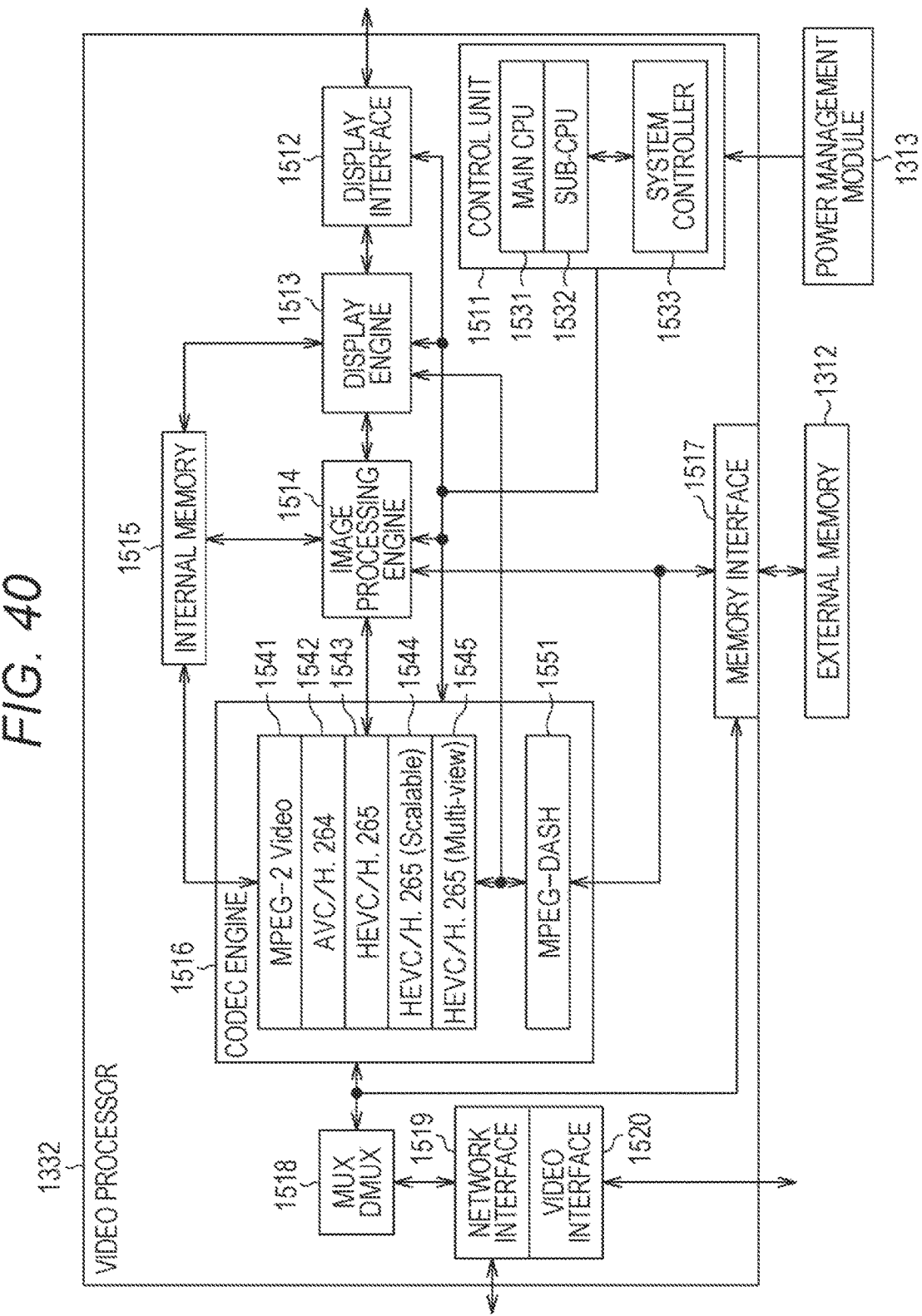
FIG. 40 illustrates other exemplary schematic structure of the video processor to which the present disclosure is applied.

FIG. 40 illustrates other exemplary schematic structure of the video processor 1332 (FIG. 38) to which the present disclosure is applied. In the example of FIG. 40, the video processor 1332 has the function of coding and decoding video data in a predetermined system.

More specifically, as illustrated in FIG. 40, the video processor 1332 has a control unit 1511, a display interface 1512, a display engine 1513, an image processing engine 1514, and an internal memory 1515. The video processor 1332 further has a codec engine 1516, a memory interface 1517, a multiplexing/demultiplexing unit (MUX DMUX) 1518, a network interface 1519, and a video interface 1520.

The control unit 1511 controls the operations of each processing unit in the video processor 1332 such as the display interface 1512, the display engine 1513, the image processing engine 1514, and the codec engine 1516.

As illustrated in FIG. 40, the control unit 1511 has a main CPU 1531, a sub-CPU 1532, and a system controller 1533. The main CPU 1531 executes a program or the like for controlling the operations of each processing unit in the video processor 1332. The main CPU 1531 generates a control signal according to the program or the like, and supplies it to each processing unit (or controls the operations of each processing unit). The sub-CPU 1532 plays an auxiliary role for the main CPU 1531. For example, the sub-CPU 1532 executes a child process or sub-routine of the program or the like executed by the main CPU 1531. The system controller 1533 controls the operations of the main CPU 1531 and the sub-CPU 1532, such as designating the programs to be executed by the main CPU 1531 and the sub-CPU 1532.

The display interface 1512 outputs image data to the connectivity 1321 (FIG. 38) or the like under control of the control unit 1511. For example, the display interface 1512 converts the digital image data into an analog signal, and outputs it as reproduced video signal or as the digital image data to a monitor device or the like of the connectivity 1321 (FIG. 38).

The display engine 1513 performs various conversion processing such as format conversion, size conversion, and color gamut conversion on the image data under control of the control unit 1511 in order to match with the hardware specification of the monitor device or the like for displaying the image.

The image processing engine 1514 performs a predetermined image processing such as filter processing for improvement in image quality on the image data under control of the control unit 1511.

The internal memory 1515 is a memory provided inside the video processor 1332, which is shared among the display engine 1513, the image processing engine 1514, and the codec engine 1516. The internal memory 1515 is used for exchanging data among the display engine 1513, the image processing engine 1514, and the codec engine 1516, for example. For example, the internal memory 1515 stores data supplied from the display engine 1513, the image processing engine 1514, or the codec engine 1516, and supplies the data to the display engine 1513, the image processing engine 1514, or the codec engine 1516 as needed (in response to a request, for example). The internal memory 1515 may be realized by any storage device, and is desirably realized by a semiconductor memory with a relatively smaller capacity (than the external memory 1312, for example) and high response speed, such as static random access memory (SRAM), since it is generally used for storing a small capacity of data such as image data in units of block or parameters in many cases.

The codec engine 1516 performs a processing of coding or decoding the image data. The coding/decoding system to which the codec engine 1516 corresponds is optional, and one or more systems may be employed. For example, the codec engine 1516 may include the codec function in a plurality of coding/decoding systems, and may code image data or decode coded data in a system selected from among them.

In the example illustrated in FIG. 40, the codec engine 1516 has the function blocks for codec processing, such as MPEG-2 Video 1541, AVC/H.264 1542, HEVC/H.265 1543, HEVC/H.265 (Scalable) 1544, HEVC/H.265 (Multi-view) 1545, and MPEG-DASH 1551.

The MPEG-2 Video 1541 is a function block for coding or decoding image data in the MPEG-2 system. The AVC/H.264 1542 is a function block for coding or decoding image data in the AVC system. The HEVC/H.265 1543 is a function block for coding or decoding image data in the HEVC system. The HEVC/H.265 (Scalable) 1544 is a function block for performing scalable coding or scalable decoding on image data in the HEVC system. The HEVC/H.265 (Multi-view) 1545 is a function block for performing multi-view coding or multi-view decoding on image data in the HEVC system.

The MPEG-DASH 1551 is a function block for exchanging image data in the MPEG-Dynamic Adaptive Streaming over HTTP (MPEG-DASH) system. MPEG-DASH is a technique for streaming a video by use of HyperText Transfer Protocol (HTTP), and is characterized by selecting and transmitting an appropriate item of coding data from among a plurality of items of previously-prepared coding data having mutually different resolutions in units of segment. The MPEG-DASH 1551 generates a stream conforming to the standard or conducts transmission control on the stream, and uses the MPEG-2 Video 1541 to the HEVC/H.265 (Multi-view) 1545 for coding or decoding image data.

The memory interface 1517 is an interface for the external memory 1312. Data supplied from the image processing engine 1514 or the codec -engine 1516 is supplied to the external memory 1312 via the memory interface 1517. Further, data read from the external memory 1312 is supplied to the video processor 1332 (the image processing engine 1514 or the codec engine 1516) via the memory interface 1517.

The multiplexing/demultiplexing unit (MUX DMUX) 1518 multiplexes or demultiplexes various items of data for images such as coding data bit stream, image data, and video signal. Any multiplexing/demultiplexing method is possible. For example, in multiplexing, the multiplexing/demultiplexing unit (MUX DMUX) 1518 can not only put a plurality of items of data into one item of data but also add predetermined header information or the like to the data. In demultiplexing, the multiplexing/demultiplexing unit (MUX DMUX) 1518 can not only divide one item of data into a plurality of items of data but also add predetermined header information or the like to each item of divided data. That is, the multiplexing/demultiplexing unit (MUX DMUX) 1518 can convert a data format by multiplexing/demultiplexing. For example, the multiplexing/demultiplexing unit (MUX DMUX) 1518 multiplexes bit streams to be converted into a transport stream as bit stream for transfer format, or data (file data) for recording file format. Of course, inverse conversion is also possible by demultiplexing.

The network interface 1519 is an interface for the broadband modem 1333 or the connectivity 1321 (both in FIG. 38), for example. The video interface 1520 is an interface for the connectivity 1321 or the camera 1322 (both in FIG. 38), for example.

The operations of the video processor 1332 will be described below by way of example. For example, when a transport stream is received from an external network via the connectivity 1321 or the broadband modem 1333 (both in FIG. 38), the transport stream is supplied to the multiplexing/demultiplexing unit (MUX DMUX) 1518 via the network interface 1519 to be demultiplexed, and is decoded by the codec engine 1516. The image data obtained by the coding of the codec engine 1516 is subjected to a predetermined image processing by the image processing engine 1514, for example, is subjected to predetermined conversion by the display engine 1513, and is supplied to the connectivity 1321 (FIG. 38) or the like via the display interface 1512 to display the image on the monitor. Further, for example, the image data obtained by the decoding of the codec engine 1516 is coded by the codec engine 1516 again, is multiplexed and converted into file data by the multiplexing/demultiplexing unit (MUX DMUX) 1518, and is output to the connectivity 1321 (FIG. 38) or the like via the video interface 1520 to be recorded in various recording mediums.

Further, for example, the file data of the coding data as coded image data, which is read from a recording medium (not illustrated) by the connectivity 1321 (FIG. 38) or the like, is supplied to the multiplexing/demultiplexing unit (MUX DMUX) 1518 via the video interface 1520 to be demultiplexed, and is decoded by the codec engine 1516. The image data obtained by the decoding of the codec engine 1516 is subjected to a predetermined image processing by the image processing engine 1514, is subjected to predetermined conversion by the display engine 1513, and is supplied to the connectivity 1321 (FIG. 38) or the like via the display interface 1512 to display the image on the monitor. Further, for example, the image data obtained by the decoding of the codec engine 1516 is coded by the codec engine 1516 again, is multiplexed by the multiplexing/demultiplexing unit (MUX DMUX) 1518 to be converted into a transport stream, and is supplied to the connectivity 1321 or the broadband modem 1333 (both in FIG. 38) via the network interface 1519 to be transmitted to other device (not illustrated).

Image data or other data is exchanged among the respective processing units in the video processor 1332 by use of the internal memory 1515 or the external memory 1312, for example. The power management module 1313 controls power supplying to the control unit 1511, for example.

When the present disclosure is applied to the thus-configured video processor 1332, the present disclosure according to each exemplary embodiment described above may be applied to the codec engine 1516. That is, for example, the codec engine 1516 may have the function blocks for realizing the coding device or the decoding device according to the first exemplary embodiment. Further, for example, by the codec engine 1516 doing so, the video processor 1332 can obtain the similar effects to the above effects described with reference to FIG. 1 to FIG. 20.

In the codec engine 1516, the present disclosure (or the functions of the image coding device or the image decoding device according to each exemplary embodiment described above) may be realized in hardware such as logic circuit, in software such as incorporated program, or in both of them.

Two exemplary structures of the video processor 1332 have been described above, but the structure of the video processor 1332 is arbitrary, and may be other than the two examples described above. Further, the video processor 1332 may be configured in one semiconductor chip or may be configured in a plurality of semiconductor chips. For example, the video processor 1332 may be assumed as a 3D laminated LSI in which a plurality of semiconductors are laminated. Further, the video processor 1332 may be realized in a plurality of LSIs.

(Exemplary Applications to Device)

The video set 1300 can be incorporated into various devices for processing image data. For example, the video set 1300 can be incorporated into the TV set 900 (FIG. 31), the cell phone 920 (FIG. 32), the recording/reproducing device 940 (FIG. 33), the imaging device 960 (FIG. 34), and the like. The video set 1300 is incorporated into a device so that the device can obtain the similar effects to the above effects described with reference to FIG. 1 to FIG. 20.

Further, the video set 1300 may be incorporated into the terminal devices such as the personal computer 1004, the AV device 1005, the tablet device 1006, and the cell phone 1007 in the data transmission system 1000 in FIG. 35, the broadcast station 1101 and the terminal device 1102 in the data transmission system 1100 in FIG. 36, and the imaging device 1201 and the scalable coding data storage device 1202 in the imaging system 1200 in FIG. 37, for example. The video set 1300 is incorporated into a device so that the device can obtain the similar effects to the above effects described with reference to FIG. 1 to FIG. 20.

Even part of each structure of the video set 1300 including the video processor 1332 can be accomplished as a structure to which the present disclosure is applied. For example, only the video processor 1332 can be accomplished as a video processor to which the present disclosure is applied. For example, as described above, the processor indicated in the dotted line 1341 or the video module 1311 can be accomplished as a processor or module to which the present disclosure is applied. Furthermore, for example, the video module 1311, the external memory 1312, the power management module 1313, and the frontend module 1314 can be combined to be accomplished as a video unit 1361 to which the present disclosure is applied. Any structure can obtain the similar effects to the above effects described with reference to FIG. 1 to FIG. 20.

That is, any structure including the video processor 1332 can be incorporated into various devices for processing image data similarly to the video set 1300. For example, the video processor 1332, the processor indicated in the dotted line 1341, the video module 1311, or the video unit 1361 can be incorporated into the TV set 900 (FIG. 31), the cell phone 920 (FIG. 32), the recording/reproducing device 940 (FIG. 33), the imaging device 960 (FIG. 34), the terminal devices such as the personal computer 1004, the AV device 1005, the tablet device 1006, and the cell phone 1007 in the data transmission system 1000 in FIG. 35, the broadcast station 1101 and the terminal device 1102 in the data transmission system 1100 in FIG. 36, and the imaging device 1201 and the scalable coding data storage device 1202 in the imaging system 1200 in FIG. 37. Any structure to which the present disclosure is applied is incorporated into a device so that the device can obtain the similar effects to the above effects described with reference to FIG. 1 to FIG. 20 similarly to the video set 1300.

There have been described the examples, in the present specification, in which various items of information such as deltaQP, $\Delta QP_C$, and ChromaQPOffset are multiplexed on coding data to be transmitted from the coding side to the decoding side. However, a method for transmitting the information is not limited to the examples. For example, the information may be transmitted or recorded as individual item of data associated with the coding data without being multiplexed on the coding data. Herein, "associating" indicates linking an image (which may be part of an image such as slice or block) included in a bit stream with information corresponding to the image at the time of the decoding. That is, the information may be transmitted via a different transmission path from the coding data. Further, the information may be recoded in a different recording medium from the coding data (or a different recording area in the same recoding medium). Furthermore, the information and the coding data may be associated in any unit such as frames, frame, or part of a frame.

In the present specification, the system indicates a set of components (such as devices and modules (parts)), and all the components do not need to be present in the same casing. Therefore, a system may be a plurality of devices housed in different casings and connected via a network, and one device in which a plurality of modules are housed in one casing.

The effects described in the present specification are exemplary and not restrictive, and other effects may be possible.

The exemplary embodiments in the present disclosure are not limited to the above exemplary embodiments, and can be variously changed without departing from the spirit of the present disclosure.

For example, the present disclosure can be applied to a coding device or a decoding device in a coding system capable of performing transform skip other than the HEVC system.

Further, the present disclosure can be applied to a coding device or a decoding device used for receiving a coding stream via network medium such as satellite broadcasting, cable TV, Internet or cell phone, or processing it in a storage medium such as optical disk, magnetic disk, or flash memory.

Furthermore, the present disclosure can employ a cloud computing structure for distributing one function among a plurality of devices via a network and performing cooperative processing.

Each step described in the above flowcharts can be performed in one device, or distributed and performed in a plurality of devices.

Further, when a plurality of series of processing are included in one step, the series of processing included in one step can be performed in one device, or distributed or performed in a plurality of devise.

The preferred exemplary embodiments of the present disclosure have been described above in detail with reference to the accompanying drawings, but the present disclosure is not limited to the examples. Various modifications or corrections can be made within the technical scope described in Claims by those skilled in the art, and are assumed to be encompassed within the technical scope of the present disclosure.

The present technique may also take configurations as below.

(1) An image coding device including:
 a chrominance signal quantization determination unit for determining a chrominance signal quantization parameter with a higher quantization accuracy than a luminance signal quantization parameter in an image;
 a quantization unit for quantizing the image by use of the luminance signal quantization parameter and the chrominance signal quantization parameter determined by the chrominance signal quantization determination unit; and
 a coding unit for coding the image quantized by the quantization unit thereby to generate a coding stream.

(2) The image coding device according to (1),
 wherein the chrominance signal quantization determination unit determines the chrominance signal quantization parameter such that when the chrominance signal quantization parameter increases by 12, it is quantized twice as coarsely as the luminance signal quantization parameter.

(3) The image coding device according to (1) or (2), further including:
 a transmission unit for transmitting the coding stream generated by the coding unit, a parameter deltaQP for the luminance signal, and a parameter $\Delta QP_C$ for the chrominance signal in a coding unit with predefined magnitude.

(4) The image coding device according to (3),
 wherein $\Delta QP_C$ is calculated in coding unit.

(5) The image coding device according to (3) or (4),
 wherein the value of $\Delta QP_C$ is 0 or 1.

(6) The image coding device according to any of (3) to (5),
 wherein a color space is YCbCr, and
 the transmission unit transmits the independent values of $\Delta QP_C$ for the Cb signal and the Cr signal.

(7) The image coding device according to any of (3) to (6),
 wherein assuming a quantization parameter $QP_Y$ for the luminance signal, a quantization parameter $QP_C$ for the chrominance signal, a quantization parameter offset offset for the chrominance signal, and a defined relational equation YtoC between the luminance signal quantization parameter and the chrominance signal quantization parameter, $QP_C$ is calculated as:

$$QP_C = 2 * YtoC(QP_Y + \text{offset}) + \Delta QP_C \quad \text{[Mathematical Formula 8]}$$

(8) The image coding device according to any of (3) to (6),
 wherein assuming a quantization parameter $QP_Y$ for the luminance signal, a quantization parameter $QP_C$ for the chrominance signal, a quantization parameter offset offset for the chrominance signal, a defined relational equation YtoC between the luminance signal quantization parameter and the chrominance signal quantization parameter, and an integer n of 2 or more, $QP_C$ is calculated as:

$$QP_C = n * YtoC(QP_Y + \text{offset}) + \Delta QP_C \quad \text{[Mathematical Formula 9]}$$

where the value of $\Delta QPC$ is 0, 1, 2 . . . , n−1.

(9) The image coding device according to any of (1) to (5), (7), and (8),
wherein a color space is YDzDx.
(10) The image coding device according to any of (1) to (9),
wherein the chrominance signal quantization determination unit determines a chrominance signal quantization parameter separately from a luminance signal quantization parameter in an image of an enhancement layer with an input signal with wide color gamut when performing a scalability coding processing based on color gamut scalability.
(11) The image coding device according to (10),
wherein a chrominance signal quantization parameter offset transmitted together with a coding stream as coded image in the enhancement layer takes a negative value.
(12) The image coding device according to any of (1) to (11),
wherein when a predetermined flag is 0 in syntax transmitted together with a coding stream as coded image, the chrominance signal quantization parameter determined by the chrominance signal quantization determination unit is transmitted together with a coded coding stream.
(13) An image coding method,
wherein an image coding device:
determines a chrominance signal quantization parameter with a higher quantization accuracy than a luminance signal quantization parameter in an image,
quantizes the image by use of the luminance signal quantization parameter and the determined chrominance signal quantization parameter, and
codes the quantized image thereby to generate a coding stream.
(14) An image decoding device including:
a decoding unit for decoding a coding stream thereby to generate an image
a chrominance signal quantization determination unit for determining a chrominance signal quantization parameter with a higher quantization accuracy than a luminance signal quantization parameter in the image generated by the decoding unit; and
an inverse quantization unit for inversely quantizing the image generated by the decoding unit by use of the luminance signal quantization parameter and the chrominance signal quantization parameter determined by the chrominance signal quantization determination unit.
(15) The image decoding device according to (14),
wherein the chrominance signal quantization determination unit determines the chrominance signal quantization parameter such that when the chrominance signal quantization parameter increases by 12, it is quantized twice as coarsely as the luminance signal quantization parameter.
(16) The image decoding device according to (15), further including:
a reception unit for receiving the coding stream, a parameter deltaQP for the luminance signal, and a parameter $\Delta QP_C$ for the chrominance signal in coding unit with predefined magnitude.
(17) The image decoding device according to (16),
wherein $\Delta QP_C$ is calculated in coding unit.
(18) The image decoding device according to (16) or (17),
wherein the value of $\Delta QP_C$ is 0 or 1.
(19) The image decoding device according to any of (16) to (18),
wherein a color space is YCbCr, and
the reception unit receives the independent values of $\Delta QP_C$ for the Cb signal and the Cr signal.
(20) An image decoding method,
wherein an image decoding device:
decodes a coding stream thereby to generate an image,
determines a chrominance signal quantization parameter with a higher quantization accuracy than a luminance signal quantization parameter in the generated image, and
inversely quantizes the generated image by use of the luminance signal quantization parameter and the determined chrominance signal quantization parameter.

REFERENCE SIGNS LIST

10 Coding device
12 Coding unit
13 Transmission unit
35 Quantization unit
36 Coding unit
38 Inverse quantization unit
49 Rate control unit
50 Chrominance signal quantization unit
51 Chrominance signal inverse quantization unit
110 Decoding device
132 Lossless decoding unit
133 Inverse quantization unit
146 Chrominance signal inverse quantization unit

The invention claimed is:
1. An image coding device, comprising:
one or more processor configured to:
determine a chrominance signal quantization parameter ($QP_c$) based on a parameter $\Delta QP_c$ for a chrominance signal, a luminance signal quantization parameter ($QP_y$), a defined relational equation YtoC between the luminance signal quantization parameter and the chrominance signal quantization parameter, and an offset for the chrominance signal,
wherein a quantization accuracy of the determined chrominance signal quantization parameter is higher than the luminance signal quantization parameter in an image;
quantize the image based on the luminance signal quantization parameter and the determined chrominance signal quantization parameter; and
code the quantized image to generate a coding stream.
2. The image coding device according to claim 1,
wherein the one or more processors are further configured to determine the chrominance signal quantization parameter, wherein the chrominance signal quantization parameter is quantized twice the luminance signal quantization parameter, based on the chrominance signal quantization parameter that exceeds 12.
3. The image coding device according to claim 2, wherein the one or more processors are further configured to:
transmit the generated coding stream, a parameter deltaQP for a luminance signal, and the parameter $\Delta QP_c$ for the chrominance signal a set magnitude.
4. The image coding device according to claim 3, wherein the one or more processors are further configured to calculate the parameter $\Delta QP_c$.
5. The image coding device according to claim 3, wherein a value of the parameter $\Delta QP_c$ is one of 0 or 1.
6. The image coding device according to claim 3,
wherein a color space is YCbCr, and
the one or more processors are further configured to transmit independent values of the parameter $\Delta QP_c$ for a Cb signal and a Cr signal.

7. The image coding device according to claim 3, wherein the chrominance signal quantization parameter QPc is calculated as:

$QP_c = 2*YtoC(QP_y + \text{offset}) + \Delta QP_c$.

8. The image coding device according to claim 3, wherein n is an integer of value 2 or more, and the $QP_C$ is calculated as:

$QP_C = n*YtoC(QP_Y + \text{offset}) + \Delta QP_C$ where a value of the parameter $\Delta QP_C$ is 0, 1, 2 . . . , n−1.

9. The image coding device according to claim 1, wherein a color space is YDzDx.

10. The image coding device according to claim 1, wherein the one or more processors are further configured to determine the chrominance signal quantization parameter separately from the luminance signal quantization parameter in the image of an enhancement layer, wherein the enhancement layer receives an input image signal with a wide color gamut based on execution of a scalability coding process according to color gamut scalability.

11. The image coding device according to claim 10, wherein the one or more processors are further configured to transmit the offset for the chrominance signal quantization parameter with the coding stream as a coded image in the enhancement layer, wherein the offset corresponds to a negative value.

12. The image coding device according to claim 1, wherein the one or more processors are further configured to:
transmit a flag in syntax with the coding stream as a coded image,
transmit the chrominance signal quantization parameter with a coded coding stream based on a value of the flag that is set as 0 in the syntax.

13. An image coding method, comprising:
in an image coding device:
determining a chrominance signal quantization parameter ($QP_C$) based on a parameter $\Delta QP_C$ for a chrominance signal, a luminance signal quantization parameter ($QP_y$), a defined relational equation YtoC between the luminance signal quantization parameter and the chrominance signal quantization parameter, and an offset for the chrominance signal,
wherein a quantization accuracy of the determined chrominance signal quantization parameter is higher than the luminance signal quantization parameter in an image,
quantizing the image based on the luminance signal quantization parameter and the determined chrominance signal quantization parameter, and
coding the quantized image to generate a coding stream.

14. An image decoding device, comprising:
one or more processors configured to:
decode a coding stream to generate an image;
determine a chrominance signal quantization parameter ($QP_C$) based on a parameter $\Delta QP_C$ for a chrominance signal, a luminance signal quantization parameter ($QP_Y$), a defined relational equation YtoC between the luminance signal quantization parameter and the chrominance signal quantization parameter, and an offset for the chrominance signal,
wherein a quantization accuracy of the determined chrominance signal quantization parameter is higher than the luminance signal quantization parameter in the generated image; and
inversely quantize the image based on the luminance signal quantization parameter and the determined chrominance signal quantization parameter.

15. The image decoding device according to claim 14, wherein the one or more processors are further configured to determine the chrominance signal quantization parameter, wherein the chrominance signal quantization parameter is quantized twice the luminance signal quantization parameter, based on the chrominance signal quantization parameter that exceeds 12.

16. The image decoding device according to claim 15, wherein the one or more processors are further configured to:
receive the coding stream, a parameter deltaQP for a luminance signal, and the parameter $\Delta QP_C$ for the chrominance signal with a set magnitude.

17. The image decoding device according to claim 16, wherein the one or more processors are further configured to calculate the parameter $\Delta QP_C$.

18. The image decoding device according to claim 16, wherein a value of the parameter $\Delta QP_C$ is one of 0 or 1.

19. The image decoding device according to claim 16, wherein a color space is YCbCr, and
the one or more processors are further configured to receive independent values of the parameter $\Delta QP_C$ for a Cb signal and a Cr signal.

20. An image decoding method, comprising:
in an image decoding device:
decoding a coding stream to generate an image,
determining a chrominance signal quantization parameter ($QP_C$) based on a parameter $\Delta QP_C$ for a chrominance signal, a luminance signal quantization parameter ($QP_Y$), a defined relational equation YtoC between the luminance signal quantization parameter and the chrominance signal quantization parameter, and an offset for the chrominance signal,
wherein a quantization accuracy of the determined chrominance signal quantization parameter is higher than the luminance signal quantization parameter in the generated image, and
inversely quantizing the generated image based on the luminance signal quantization parameter and the determined chrominance signal quantization parameter.

* * * * *